(12) United States Patent
Yang

(10) Patent No.: US 8,008,823 B2
(45) Date of Patent: Aug. 30, 2011

(54) ELECTRIC MACHINERY OF MAGNETIC POLE OR MAGNETIC CIRCUIT WRAPPED PM MAGNETIC POLE

(76) Inventor: Tai-Her Yang, Dzan-Hwa (TW)

( * ) Notice: Subject to any disclaimer, the term of this patent is extended or adjusted under 35 U.S.C. 154(b) by 322 days.

(21) Appl. No.: 12/000,692

(22) Filed: Dec. 17, 2007

(65) Prior Publication Data

US 2009/0152957 A1    Jun. 18, 2009

(51) Int. Cl.
*H02K 21/26* (2006.01)

(52) U.S. Cl. .............................. 310/154.11; 310/154.35

(58) Field of Classification Search .................. 310/181, 310/112–114, 154.11, 154.08, 154.13, 154.19, 310/154.26, 154.31, 154.35–154.38, 154.47
See application file for complete search history.

(56) References Cited

U.S. PATENT DOCUMENTS

| | | | | |
|---|---|---|---|---|
| 2,968,755 A * | 1/1961 | Baermann | ............... | 318/400.41 |
| 4,110,645 A * | 8/1978 | Hendershot, Jr. | ........ | 310/154.07 |
| 4,516,046 A * | 5/1985 | Mercier | .................... | 310/154.11 |
| 4,673,852 A * | 6/1987 | Geiger | .......................... | 388/823 |
| 5,920,139 A * | 7/1999 | Fujiwara et al. | ......... | 310/154.11 |
| 6,262,508 B1 * | 7/2001 | Shibayama et al. | .......... | 310/181 |
| 6,756,870 B2 * | 6/2004 | Kuwahara | ..................... | 335/224 |
| 6,777,842 B2 * | 8/2004 | Horst | ....................... | 310/154.11 |
| 6,784,585 B2 * | 8/2004 | Shah et al. | .................... | 310/181 |
| 7,414,343 B2 * | 8/2008 | Arita et al. | .................... | 310/181 |
| 7,501,733 B2 * | 3/2009 | Takeuchi | ................ | 310/156.35 |

* cited by examiner

*Primary Examiner* — Dang D Le
(74) *Attorney, Agent, or Firm* — Bacon & Thomas, PLLC

(57) ABSTRACT

An electric machinery provided with a PM magnetic pole wrapped by a permeable polar face and a magnetic circuit from an individual magnetic pole provides an innovative design of having disposed the PM magnetic pole wrapped between the permeable polar face and the magnetic circuit from the individual magnetic pole to prevent PM magnetic pole from falling off and avoid PM magnetic pole magnetic force from being weakened by inverse excitation during the operation.

25 Claims, 47 Drawing Sheets

ELECTRIC MACHINERY OF MAGNETIC POLE OR MAGNETIC CIRCUIT WRAPPED PM MAGNETIC POLE

BACKGROUND OF THE INVENTION (a) Field of the Invention

The present invention is related to an electric machinery with a permanent magnet magnetic pole wrapped by a magnetic pole or a magnetic circuit of an individual magnetic pole, and more particularly, to a permanent magnet (PM) magnetic pole wrapped between the individual magnetic pole and the magnetic circuit that is disposed in various types of electric machinery of the prior art.

(b) Description of the Prior Art

Whereas a conventional AC or DC revolution or linear electric machinery either of commutator, brush, brushless, ring-brush, synchronous, asynchronous, internal revolving, external revolving, revolving with an electric magnetic structure at middle, double-acting, triple-acting, multi-layer, multi-ring, linear, DC brushless, or inverter electric machinery, or an electric machinery functioning as a generator or as a motor or as both a generator and a motor, coupling transmission device, as an EME vortex coupling transmission device, or an EME vortex braking device, is usually provided with a magnetic pole structure to produce EM effect operation.

A magnetic pole structure of the prior art is comprised of:
  a conducted winding exciting magnetic pole having on its polar face disposed with a PM magnetic pole indicate cumulative or differential; or
  a magnetic pole structure of DC or AC electrically conducted winding excitation; or
  a PM magnetic pole structure.

As illustrated in FIG. 1 of the accompanying drawings for a schematic view showing a structure of a conventional PM magnetic pole, the structure features an advantage of not requiring a magnetic field exciting current but is found with a flaw of having its magnetic power to be weakened by inverse excitation in the course of the operation of an electric machinery.

SUMMARY OF THE INVENTION

The primary purpose of the present invention is to provide an electric machinery that has its PM magnetic pole wrapped by a magnetic pole or a magnetic circuit of an individual magnetic pole, and more particularly, to a permanent magnet (PM) magnetic pole wrapped between the individual magnetic pole and the magnetic circuit that is disposed in various types of electric machinery of the prior art.

The electric machinery may be disposed in a way that polarities of two abutted PM magnetic poles respectively wrapped by an individual magnetic pole and a magnetic circuit are identical with or opposite to each other.

In the electric machinery with PM magnetic pole wrapped by a magnetic pole or a magnetic circuit, the PM magnetic pole is prevented from having its magnetic power weakened by inverse excitation during the operation of the electric machinery due to an innovative design of having a PM magnetic pole wrapped by an individual magnetic pole and a magnetic circuit.

LISTING OF COMPONENT AND CORRESPONDING LABEL

Figure 1:
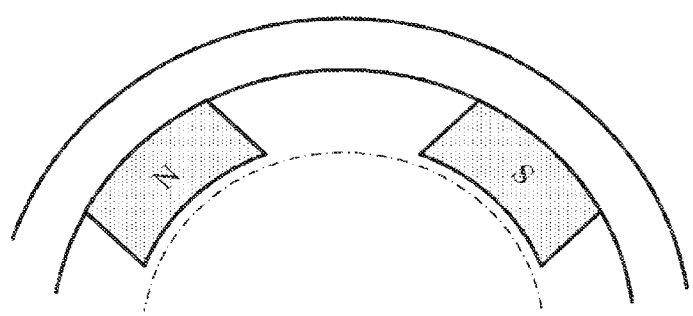
FIG. 1 is a schematic view showing a structure of a conventional PM magnetic pole.

101: magnetic pole
102: magnetic circuit
103: PM magnetic pole
104: neck portion of a magnetic circuit of magnetic pole
11: inner layer electric machinery structure of cylinder electric machinery
12: outer layer electric machinery structure of cylinder electric machinery
21: inner ring electric machinery structure of coaxial 3-ring type electric machinery
22: mid ring electric machinery structure of coaxial 3-ring type electric machinery
23: outer ring electric machinery structure of coaxial 3-ring type electric machinery
31: inner layer plate electric machinery structure of coaxial double layer type plate electric machinery
32: outer layer plate electric machinery structure of coaxial double layer type plate electric machinery
41: inner layer plate electric machinery structure of coaxial 3-layer type plate electric machinery
42: mid layer plate electric machinery structure of coaxial 3-layer type plate electric machinery
43: outer layer plate electric machinery structure of coaxial 3-layer type plate electric machinery
51: inner layer linear electric machinery structure of double layer type linear electric machinery
52: outer layer linear electric machinery structure of double layer type linear electric machinery
61: inner layer linear electric machinery structure of 3-layer type linear electric machinery
62: mid layer linear electric machinery structure of 3-layer type linear electric machinery
63: outer layer linear electric machinery structure of 3-layer type linear electric machinery
1011, 1012, 1013, 1014: protective cap

DETAILED DESCRIPTION OF THE PREFERRED EMBODIMENTS

Figure 2:
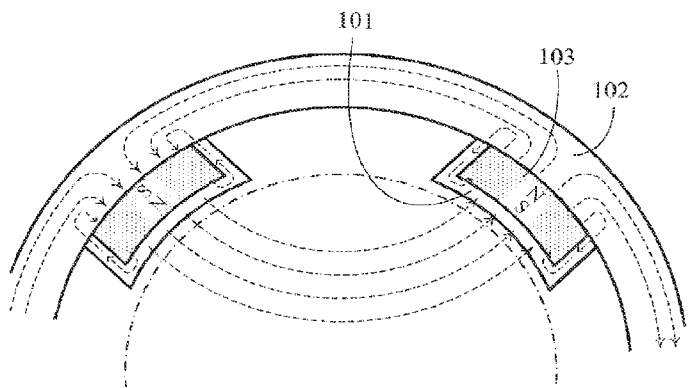
FIG. 2 is a schematic view showing a structure of the present invention applied in a PM magnetic pole wrapped between an individual magnetic pole and a magnetic circuit.

FIG. 2 is a schematic view showing a structure of the present invention applied in a PM magnetic pole wrapped by a magnetic pole or a magnetic circuit;

As illustrated in FIG. 2, the present invention discloses an electric machinery provided with a PM magnetic pole wrapped by a magnetic pole or a magnetic circuit, which is related to a PM magnetic pole wrapped by an individual magnetic pole and a magnetic circuit connected with an individual magnetic pole disposed in various types of electric machinery of the prior art;

The electric machinery provided with the PM magnetic pole wrapped by a magnetic pole or a magnetic circuit of the present invention, whereof ways to wrap the PM magnetic pole 103 is to form one or more than one side of the magnetic circuits made of permeable material between two magnetic poles of different polarities of the PM magnetic pole 103 after the combination of the magnetic pole 101 and the magnetic circuit 102, whereof the magnetic circuit covering across the two magnetic poles of different polarities on the PM magnetic poles constitutes a permeable magnetic circuit on at least one side or wrapped overall for passing through partial magnetic line of force on the PM magnetic pole 103 while the PM magnetic pole 103 remains to form partial strength of the magnetic field on the pole-face of the magnetic pole 101, whereby the function is that when the PM magnetic pole 103 being inversely excited in the course of the operation, two magnetic poles of different polarities on the PM magnetic pole 103 keeps closed magnetic circuit to maintain its magnetic line of force so as to enhance the property to against inverse excitation.

As illustrated in FIG. 2, in the electric machinery provided with the PM magnetic pole wrapped by a magnetic pole or a magnetic circuit, a magnetic pole 101 is disposed to wrap the PM magnetic pole jointly with the magnetic circuit 102 to constitute magnetic pole; the magnetic circuit 102 and the magnetic pole 101 are comprised of a material of silicon steel sheets, steel, or iron providing good permeability and made in an integral part or a stack of multiple sheets by lamination, or made by metallurgy from the dust of permeable material; a pole-face of the magnetic pole 101 faces a structure of another electric machinery that interacts with the magnetic pole 101 to execute EME; and the pole-face of the magnetic pole 101 may be selected to indicate a convex, concave, or flat surface, or may be further disposed with a groove to indicate protrusion and indention pattern or a specific geometric form as applicable.

Figure 3:
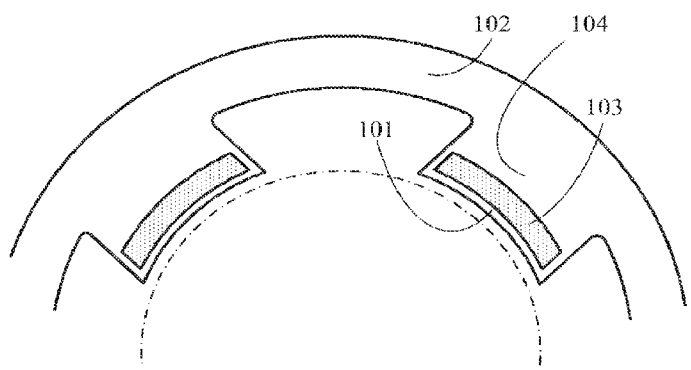
FIG. 3 is a schematic view showing a structure of the present invention applied in a PM magnetic pole wrapped between an individual magnetic pole and the neck section of the magnetic circuit from a magnetic pole.

FIG. 3 is a schematic view showing a structure of the present invention applied in a PM magnetic pole wrapped by an individual magnetic pole and the neck section of a magnetic circuit from a magnetic pole.

As illustrated in FIG. 3, in the electric machinery provided with the PM magnetic pole wrapped by a magnetic pole or a magnetic circuit from an individual magnetic pole, the individual magnetic pole can be further constituted by using the neck section of the magnetic circuit 104 on the magnetic pole and the magnetic pole 101 to jointly wrap a PM magnetic pole 103; the magnetic circuit 102, the neck section of the magnetic circuit 104 on the magnetic pole, and the magnetic pole 101 are comprised of a material of silicon steel sheets, steel, or iron providing good permeability and made in an integral part or a stack of multiple sheets by lamination, or made by metallurgy from the dust of permeable material; a pole-face of the magnetic pole 101 faces a structure of another electric machinery that interacts with the magnetic pole 101 to execute EME; and the pole-face of the magnetic pole 101 may be selected to indicate a convex, concave, or flat surface, or may be further disposed with a groove to indicate protrusion and indention pattern or a specific geometric form as applicable.

The electric machinery provided with a PM magnetic pole wrapped by the magnetic pole or the magnetic circuit may operate with a DC or AC revolution electrical machinery or a linear electric machinery including commutator brush, brushless, ring brush, synchronous, asynchronous, internal revolving, external revolving, revolving with an electric machinery structure at middle, double-acting, triple-acting, multi-layer, multi-ring, linear, DC brushless, or inverter electric machinery, or an electric machinery functioning as a generator or as a motor or as both a generator and a motor, coupling transmission device, as an EME vortex coupling transmission device, or an EME vortex braking device for functional operation.

In the electric machinery of PM magnetic pole wrapped by a magnetic pole or a magnetic circuit, the PM magnetic pole is prevented from having its magnetic power weakened by inverse excitation during the operation of the electric machinery due to an innovative design of having a PM magnetic pole 103 wrapped by a magnetic pole 101 and a magnetic circuit 102 from an individual magnetic pole.

Figure 4:
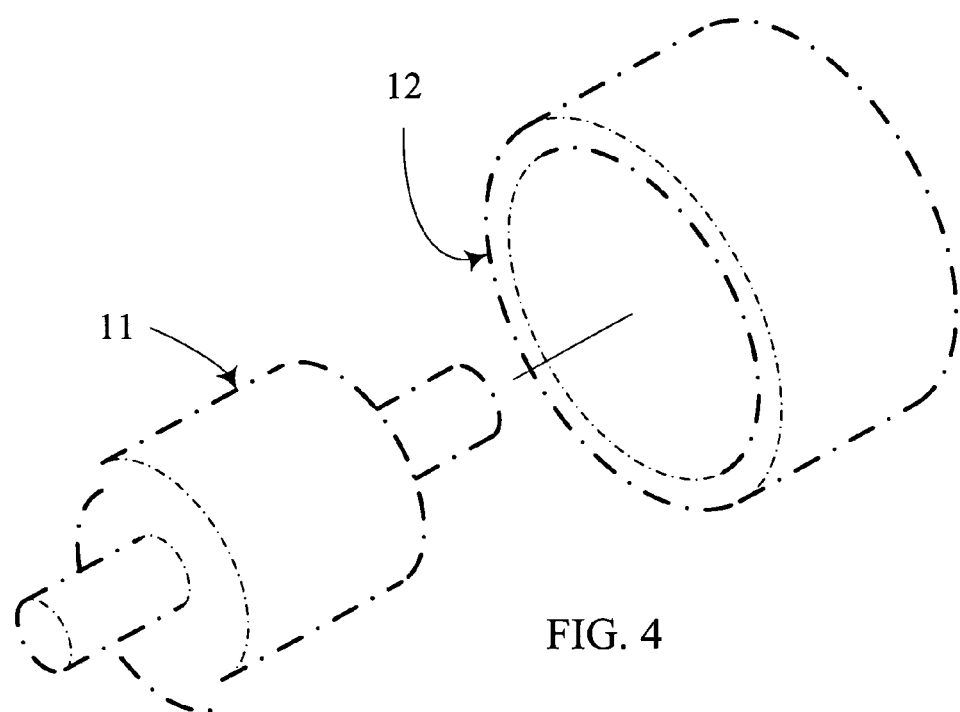
FIG. 4 is a schematic view showing a summary profile of a structure of a main unit of the present invention applied in a cylinder electric machinery without casing, bearing, locking member, cooling van, and optional conductive device.
Figure 5:
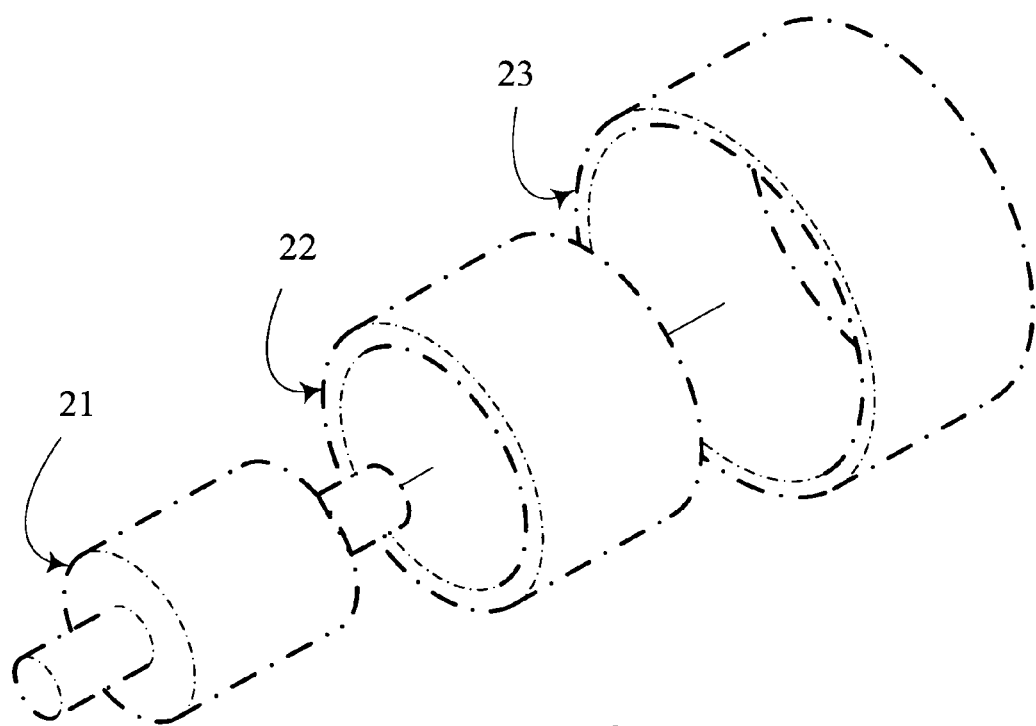
FIG. 5 is a schematic view showing a summary profile of a structure of a main unit of the present invention applied in a coaxial 3-ring type electric machinery without casing, bearing, locking member, cooling van, and optional conductive device.
Figure 6:
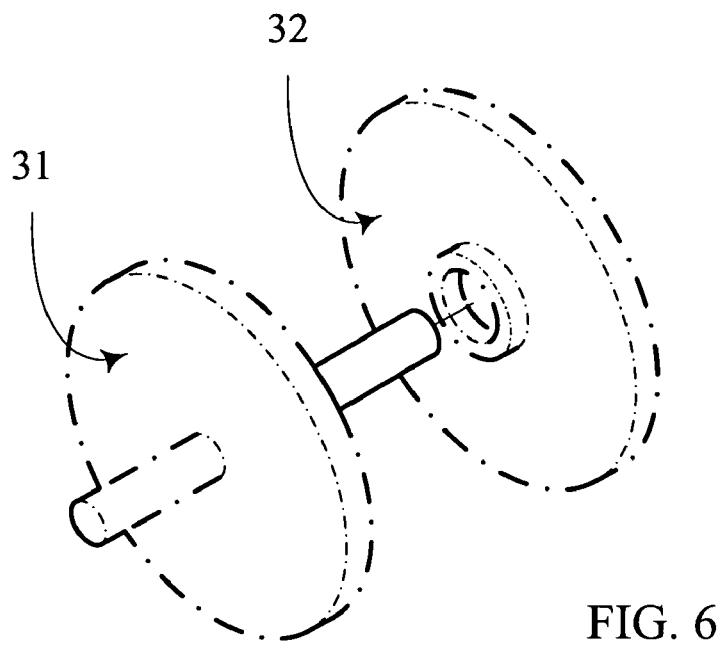
FIG. 6 is a schematic view showing a summary profile of a structure of a main unit of the present invention applied in a coaxial double layer type plate electric machinery without casing, bearing, locking member, cooling van, and optional conductive device.
Figure 7:
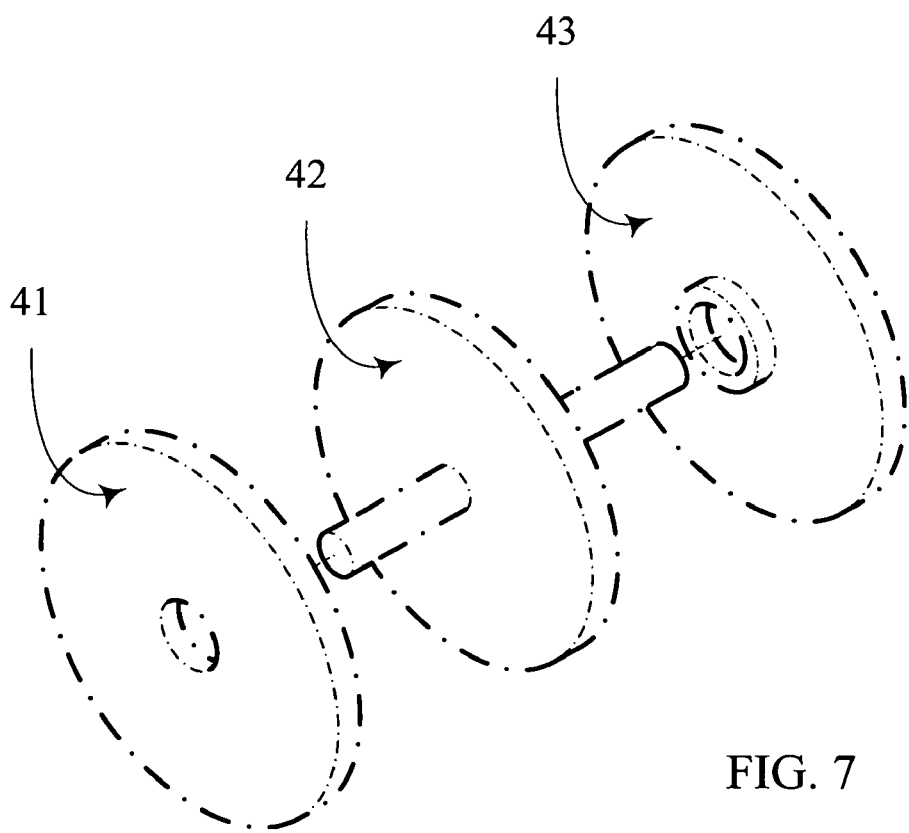
FIG. 7 is a schematic view showing a summary profile of a structure of a main unit of the present invention applied in a coaxial, 3-layer type plate electric machinery without casing, bearing, locking member, cooling van, and optional conductive device.
Figure 8:
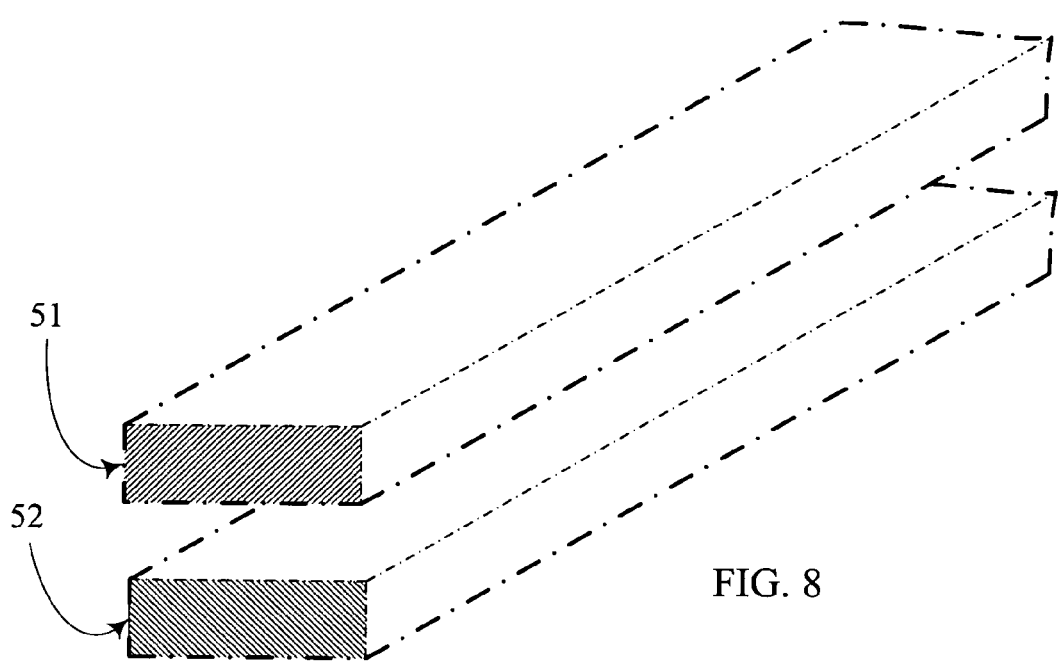
FIG. 8 is a schematic view showing a summary profile of a structure of a main unit of the present invention applied in a double layer type linear electric machinery without casing, bearing, locking member, cooling van, and optional conductive device.
Figure 9:
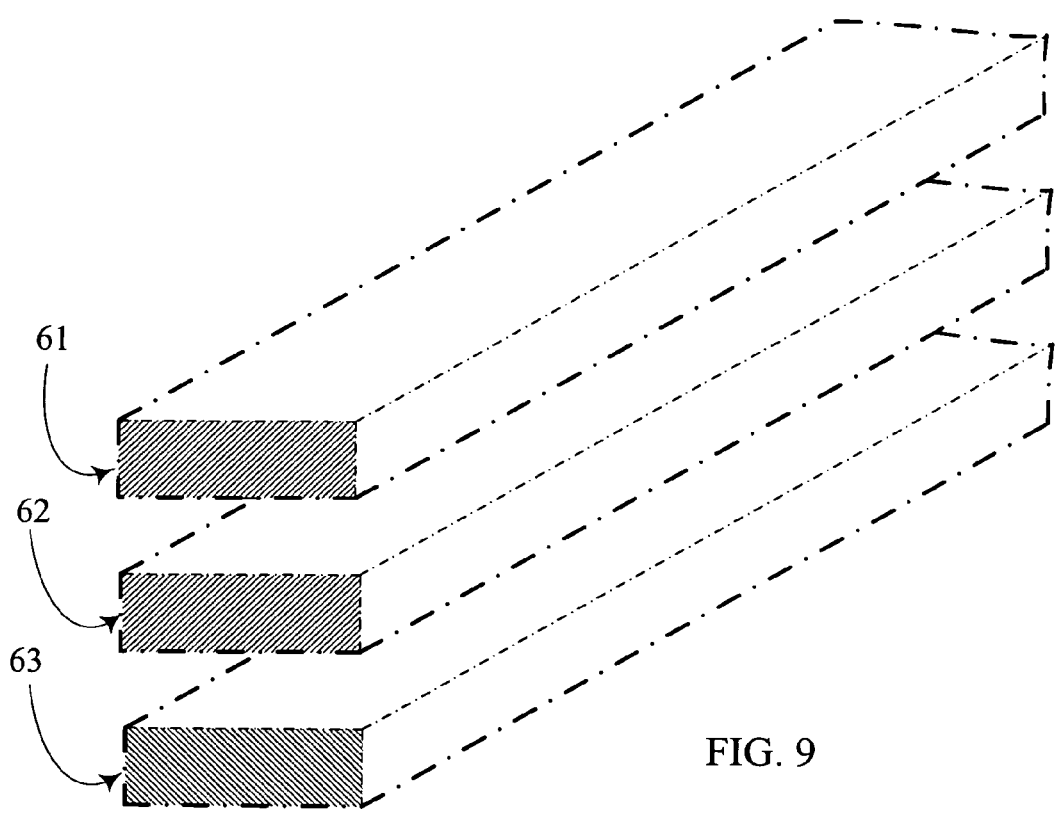
FIG. 9 is a schematic view showing a summary profile of a structure of a main unit of the present invention applied in a 3-layer type linear electric machinery without casing, bearing, locking member, cooling van, and optional conductive device.

Types of electric machinery applying the electric machinery provided with a PM magnetic pole wrapped by the magnetic pole and the magnetic circuit include:

1. A cylinder electric machinery in a construction comprised of an inner layer electric machinery structure and an outer layer electric machinery structure, including an inner layer electric machinery structure 11 and an outer layer electric machinery structure 12 as illustrated in FIG. 4 showing a schematic view of a summary profile of a structure of a main unit of the present invention applied in a cylinder electric machinery without casing, bearing, locking member, cooling van, and optional conductive device;

2. A coaxial 3-ring type electric machinery to engage coaxial operation by insertion of an inner ring, a mid ring, and an outer ring electric machinery structures including an inner ring electric machinery structure 21, a mid ring electric machinery structure 22, and an outer ring electric machinery structure 23 as illustrated in FIG. 5 for a schematic view showing a summary profile of a structure of a main unit of the present invention applied in a coaxial 3-ring type electric machinery without casing, bearing, locking member, cooling van, and optional conductive device;

3. A coaxial double layer type plate electric machinery comprised of two layers of electric machinery structure laminated to engage in coaxial operation includes an inner layer plate electric machinery structure 31 and an outer layer plate electric machinery structure 32 as illustrated in FIG. 6 for a schematic view showing a summary profile of a structure of a main unit of the present invention applied in a coaxial double layer type plate electric machinery without casing, bearing, locking member, cooling van, and optional conductive device;

4. A coaxial 3-layer type plate electric machinery comprised of an inner, a mid, and an outer layer electric machinery structures laminated to engage coaxial operation includes an inner layer plate electric machinery structure 41, a mid layer plate electric machinery structure 42, and an outer layer plate electric machinery structure 43 as illustrated in FIG. 7 for a schematic view showing a summary profile of a structure of a main unit of the present invention applied in a coaxial 3-layer type plate electric machinery without casing, bearing, locking member, cooling van, and optional conductive device;

5. A linearly coupled double layer type linear electric machinery comprised of two layers of linear electric machinery structures includes an inner layer linear electric machinery structure 51 and an outer layer linear electric machinery structure 52 as illustrated in FIG. 8 for a schematic view showing a summary profile of a structure of a main unit of the present invention applied in a double layer type linear electric machinery without casing, bearing, locking member, cooling van, and optional conductive device; and 6. A linearly coupled 3-layer type linear electric machinery comprised of a inner layer, a mid layer, and an outer layer linear electric machinery structures includes an inner layer linear electric machinery structure 61, a mid layer linear electric machinery structure 62, and an outer layer linear electric machinery structure 63 as illustrated in FIG. 9 for a schematic view showing a summary profile of a structure of a main unit of the present invention applied in a 3-layer type linear electric machinery without casing, bearing, locking member, cooling van, and optional conductive device.

For the present invention to be applied in those application examples of various types of structure described below, including two-piece electric machinery structure and 3-piece electric machinery structure, they may be comprised of an electric machinery structure comprised of more elements according to the same operation principle; therefore, it will not be elaborated herein.

Figure 10:
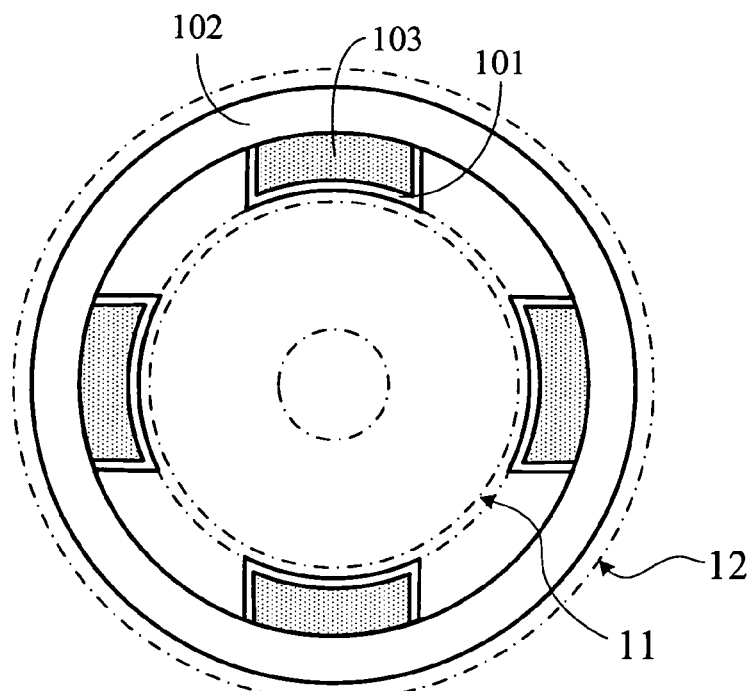
FIG. 10 is a schematic view showing a structure of the present invention applied in a cylinder electric machinery structure, wherein a PM magnetic pole wrapped between an individual magnetic pole and a magnetic circuit is disposed on an EME coupling aspect of an outer layer electric machinery structure to execute EME coupling with an inner layer electric machinery structure.

Now referring to FIG. 10 for a schematic view showing a structure of the present invention applied in a cylinder electric machinery structure, a PM magnetic pole wrapped between an individual magnetic pole and a magnetic circuit is disposed for an outer layer electric machinery structure to execute EME coupling to an inner layer electric machinery structure.

As illustrated in FIG. 10, in the cylinder electric machinery structure, an outer layer electric machinery structure 12 to execute EME coupling with the inner layer electric machinery structure 11 has provided on its EME coupling aspect in a direction facing an inner layer electric machinery structure a PM magnetic pole 103 wrapped between the magnetic pole 101 and the magnetic circuit 102 from an individual magnetic pole thus to constitute a cylinder electric machinery provided with a PM magnetic pole wrapped between the individual magnetic pole and the magnetic circuit.

Figure 11:
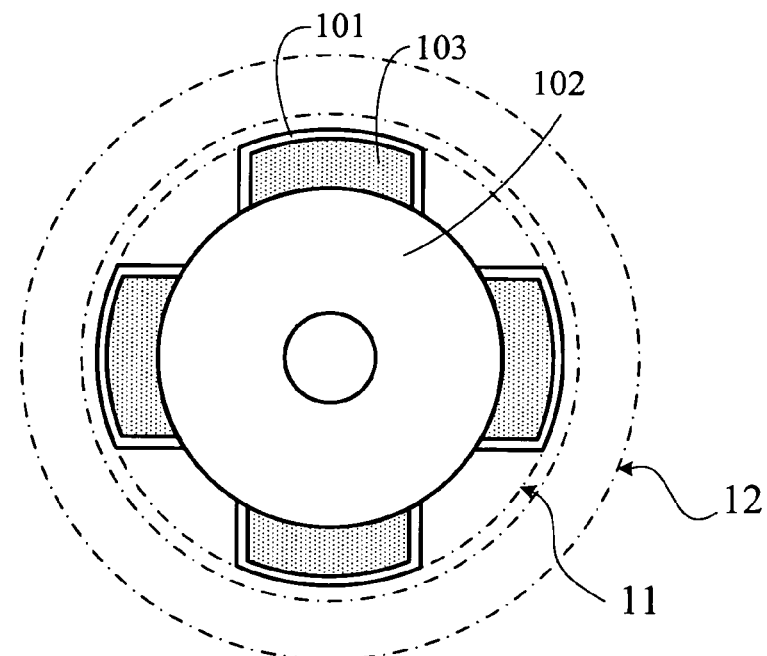
FIG. 11 is a schematic view showing a structure of the present invention applied in a cylinder electric machinery structure, wherein a PM magnetic pole wrapped between an individual magnetic pole and a magnetic circuit is disposed on an EME coupling aspect of an inner layer electric machinery structure in a direction facing the outer layer electric machinery structure to execute EME coupling with an outer layer electric machinery structure.

FIG. 11 is a schematic view showing a structure of the present invention applied in a cylinder electric machinery structure, wherein a PM magnetic pole wrapped between an individual magnetic pole and a magnetic circuit is disposed on an EME coupling aspect of an inner layer electric machinery structure in a direction facing an outer layer electric machinery structure to execute EME coupling with an outer layer electric machinery structure.

As illustrated in FIG. 11 for a cylinder electric machinery structure, the inner layer electric machinery structure 11 to execute EME coupling with the outer layer electric machinery structure 12 has provided on its EME coupling aspect in a direction facing the outer layer electric machinery structure 12 a PM magnetic pole 103 wrapped between the magnetic pole 101 and the magnetic circuit 102 from an individual magnetic pole thus to constitute a cylinder electric machinery provided with the PM magnetic pole wrapped between the individual magnetic pole and the magnetic circuit.

Figure 12:
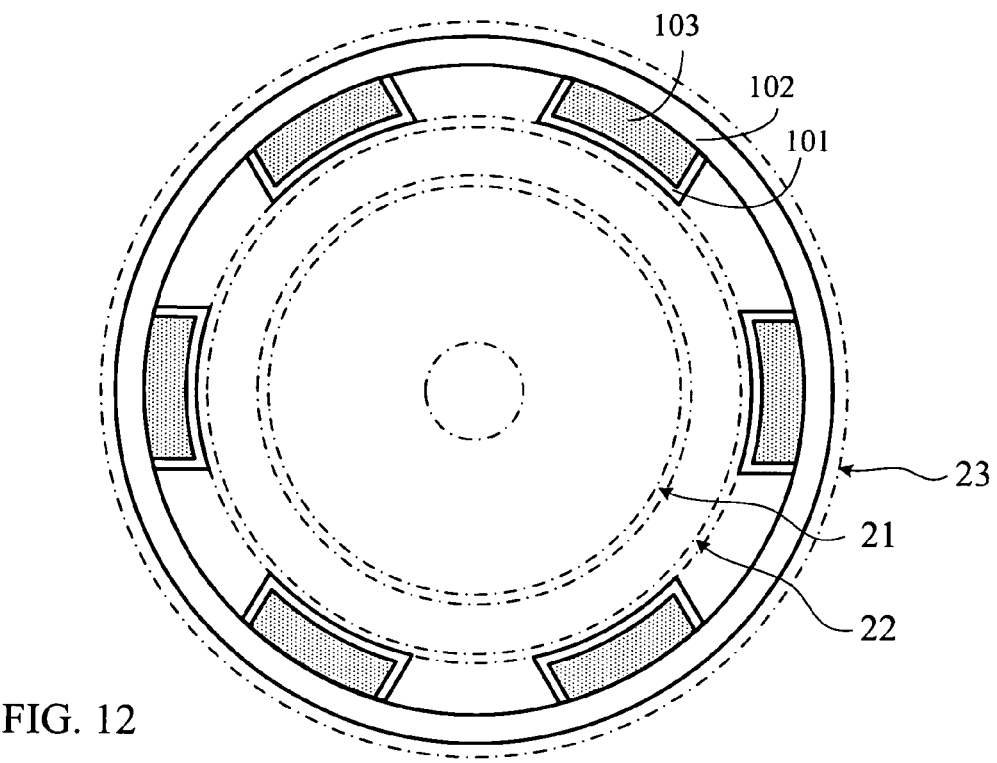
FIG. 12 is a schematic view showing a structure of the present invention applied in a coaxial 3-ring type electric machinery structure, wherein a PM magnetic pole wrapped between an individual magnetic pole and a magnetic circuit is disposed on an EME coupling aspect of an outer ring electric machinery structure in a direction facing the mid ring electric machinery structure to execute EME coupling with a mid ring electric machinery structure.

FIG. 12 is a schematic view showing a structure of the present invention applied in a coaxial 3-ring type electric machinery structure, wherein a PM magnetic pole wrapped between an individual magnetic pole and a magnetic circuit is disposed on an EME coupling aspect of an outer ring electric machinery structure to execute EME coupling with a mid ring electric machinery structure in a direction facing the mid ring electric machinery structure.

As illustrated in FIG. 12, in a coaxial 3-ring type electric machinery structure, the PM magnetic pole 103 wrapped between a magnetic pole 101 and a magnetic circuit 102 from an individual magnetic pole to execute EME interaction with the mid ring electric machinery structure 22 is disposed on an EME coupling aspect of the outer ring electric machinery structure 23 in a direction facing the mid ring electric machinery structure 22 for executing EME coupling with the mid ring electric machinery structure 22, and the type of the electric machinery between the mid ring electric machinery structure 22 and the inner ring electric machinery structure 21 is selected upon its EME property thus to constitute a coaxial 3-ring type electric machinery provided with the PM magnetic pole wrapped between the individual magnetic pole and the magnetic circuit.

Figure 13:
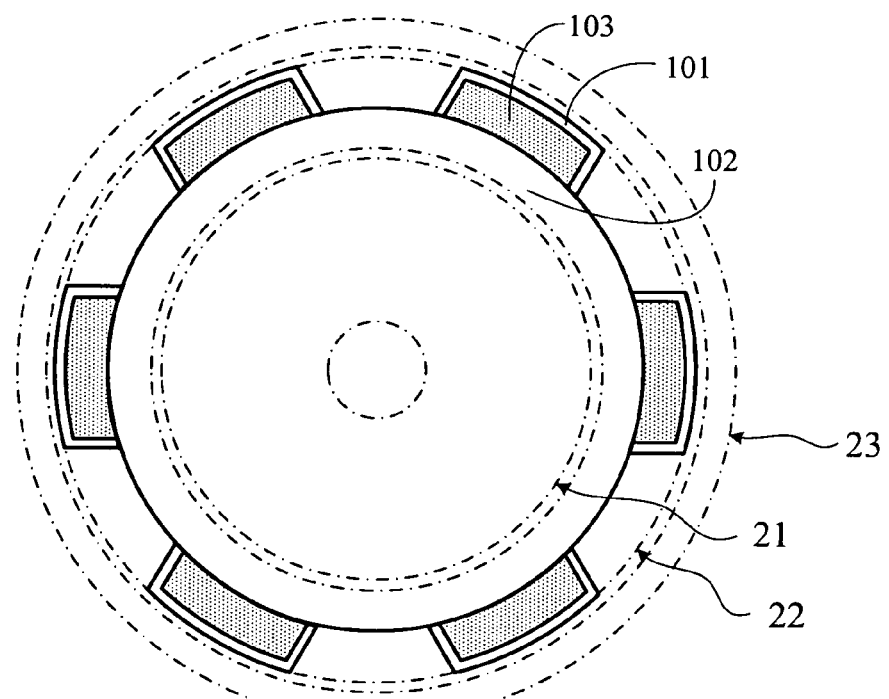
FIG. 13 is a schematic view showing a structure of the present invention applied in a coaxial 3-ring type electric machinery structure, wherein a PM magnetic pole wrapped between an individual magnetic pole and a magnetic circuit is disposed on an EME coupling aspect of a mid ring electric machinery structure in a direction facing the outer ring electric machinery structure for executing EME coupling with an outer ring electric machinery structure.

FIG. 13 is a schematic view showing a structure of the present invention applied in a coaxial 3-ring type electric machinery structure, wherein a PM magnetic pole wrapped between an individual magnetic pole and a magnetic circuit is disposed on an EME coupling aspect of a mid ring electric machinery structure in a direction facing the outer ring electric machinery structure for executing EME coupling with the outer ring electric machinery structure.

As illustrated in FIG. 13, in a coaxial 3-ring type electric machinery structure, the PM magnetic pole 103 wrapped between the magnetic pole 101 and a magnetic circuit 102 from an individual magnetic pole to execute EME interaction with the outer ring electric machinery structure 23 is disposed on an EME coupling aspect of the mid ring electric machinery structure 2 in a direction facing the outer ring electric machinery structure 23 for executing EME coupling with the outer ring electric machinery structure 23, and the type of the electric machinery between the mid ring electric machinery structure 22 and the inner ring electric machinery structure 21 is selected upon its EME property thus to constitute a coaxial 3-ring type electric machinery provided with the PM magnetic pole wrapped between the individual magnetic pole and the magnetic circuit.

Figure 14:
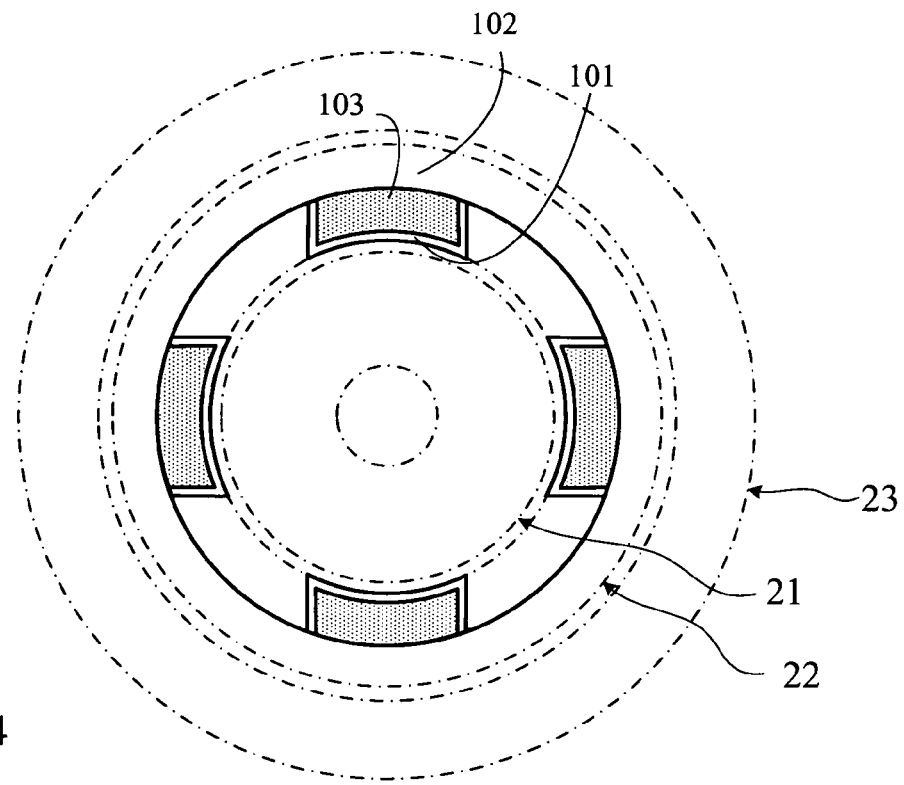
FIG. 14 is a schematic view showing a structure of the present invention applied in a coaxial 3-ring type electric machinery structure, wherein a PM magnetic pole wrapped between an individual magnetic pole and a magnetic circuit is disposed on an EME coupling aspect of a mid ring electric machinery structure in a direction facing an inner ring electric machinery structure to execute EME coupling with an inner ring electric machinery structure.

FIG. 14 is a schematic view showing a structure of the present invention applied in a coaxial 3-ring type electric machinery structure, wherein a PM magnetic pole wrapped between an individual magnetic pole and a magnetic circuit is disposed on an EME coupling aspect of a mid ring electric machinery structure in a direction facing the inner ring electric machinery structure for executing EME coupling with the inner ring electric machinery structure.

As illustrated in FIG. 14 for a coaxial 3-ring type electric machinery structure, the PM magnetic pole 103 wrapped between a magnetic pole 101 and a magnetic circuit 102 from an individual magnetic pole to execute EME interaction with the inner ring electric machinery structure 21 is disposed on an EME coupling aspect of the mid ring electric machinery structure 2 in a direction facing the inner ring electric machinery structure 21 to execute EME coupling with the inner ring electric machinery structure 21, and the type of the electric machinery between the mid ring electric machinery structure 22 and the outer ring electric machinery structure 23 is selected upon its EME property thus to constitute a coaxial 3-ring type electric machinery provided with a PM magnetic pole wrapped between an individual magnetic pole and a magnetic circuit.

Figure 15:
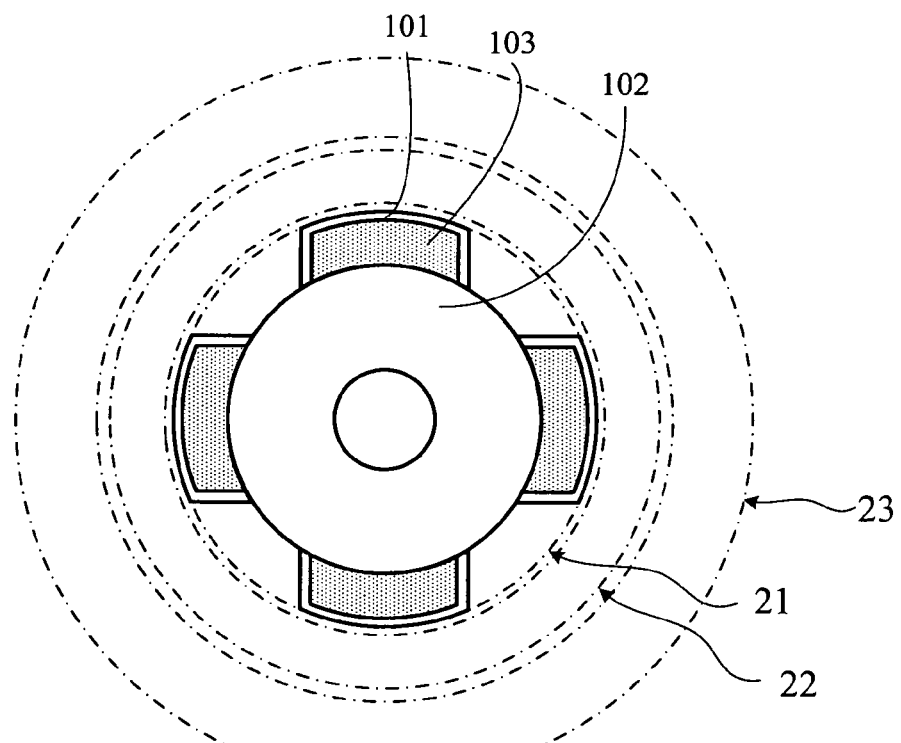
FIG. 15 is a schematic view showing a structure of the present invention applied in a coaxial 3-ring type electric machinery structure, wherein a PM magnetic pole wrapped between an individual magnetic pole and a magnetic circuit is disposed on an EME coupling aspect of an inner ring electric machinery structure in a direction facing the mid ring electric machinery structure to execute EME coupling with a mid ring electric machinery structure.

FIG. 15 is a schematic view showing a structure of the present invention applied in a coaxial 3-ring type electric machinery structure, wherein a PM magnetic pole wrapped between an individual magnetic pole and a magnetic circuit is disposed on an EME coupling aspect of an inner ring electric machinery structure in a direction facing the mid ring electric machinery structure to execute EME coupling with a mid ring electric machinery structure.

As illustrated in FIG. 15 for a coaxial 3-ring type electric machinery structure, the PM magnetic pole 103 wrapped between the magnetic pole 101 and the magnetic circuit 102 from the individual magnetic pole to execute EME interaction with the mid ring electric machinery structure 22 is disposed on an EME coupling aspect of the inner ring electric machinery structure 21 in a direction facing the mid ring electric machinery structure 22 for executing EME coupling with the mid ring electric machinery structure 22, and the type of the electric machinery between the mid ring electric machinery structure 2 and the outer ring electric machinery structure 23 is selected upon its EME property thus to constitute a coaxial 3-ring type electric machinery provided with the PM magnetic pole wrapped between the individual magnetic pole and the magnetic circuit.

Figure 16:
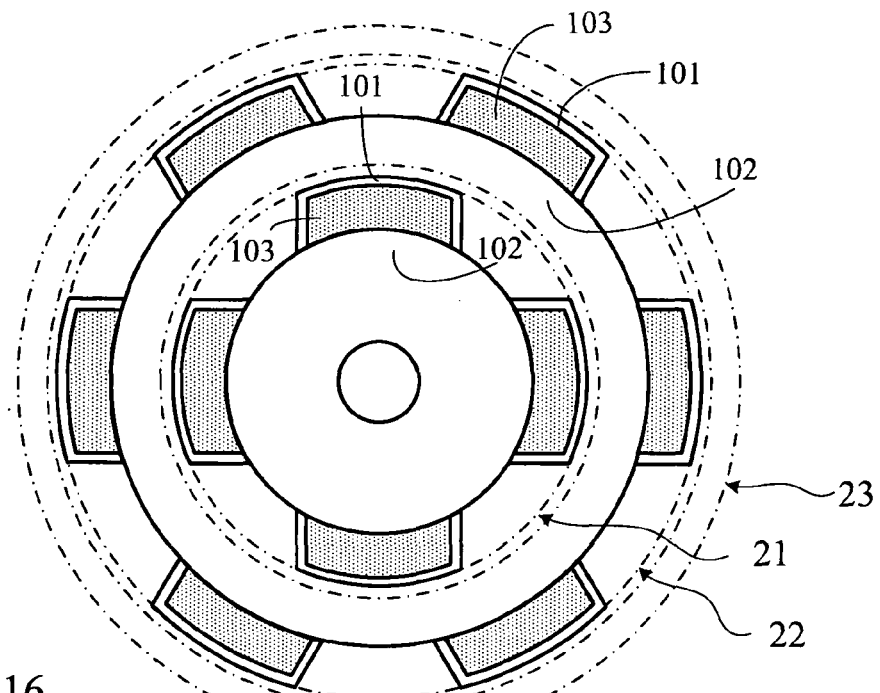
FIG. 16 is a schematic view showing a structure of the present invention applied in a coaxial 3-ring type electric machinery structure, wherein two PM magnetic poles with each being wrapped between an individual magnetic pole and a magnetic circuit are respectively disposed on an EME coupling aspect of an inner ring electric machinery structure to execute EME coupling with a mid ring electric machinery structure and on an EME coupling aspect of the mid ring electric machinery structure to execute EME coupling with an outer ring electric machinery structure.

FIG. 16 is a schematic view showing a structure of the present invention applied in a coaxial 3-ring type electric machinery structure, wherein two PM magnetic poles with each being wrapped between an individual magnetic pole and a magnetic circuit are respectively disposed on an EME coupling aspect of an inner ring electric machinery structure to execute EME coupling with a mid ring electric machinery structure and on an EME coupling aspect of the mid ring electric machinery structure to execute EME coupling with an outer ring electric machinery structure.

As illustrated in FIG. 16 for a coaxial 3-ring type electric machinery structure, both of an EME coupling aspect of the inner ring electric machinery structure 21 in a direction facing the mid ring electric machinery structure 22 to execute EME coupling with the mid ring electric machinery structure 2 and an EME coupling aspect of the mid ring electric machinery structure 22 in a direction facing the outer ring electric machinery structure 23 to execute EME coupling with the outer ring electric machinery structure 23 are respectively provided with a PM magnetic pole 103 wrapped between the magnetic pole 101 and the magnetic circuit 102 from the individual magnetic pole to constitute a coaxial 3-ring type electric machinery provided with the PM magnetic pole wrapped between the individual magnetic pole and the magnetic circuit.

Figure 17:
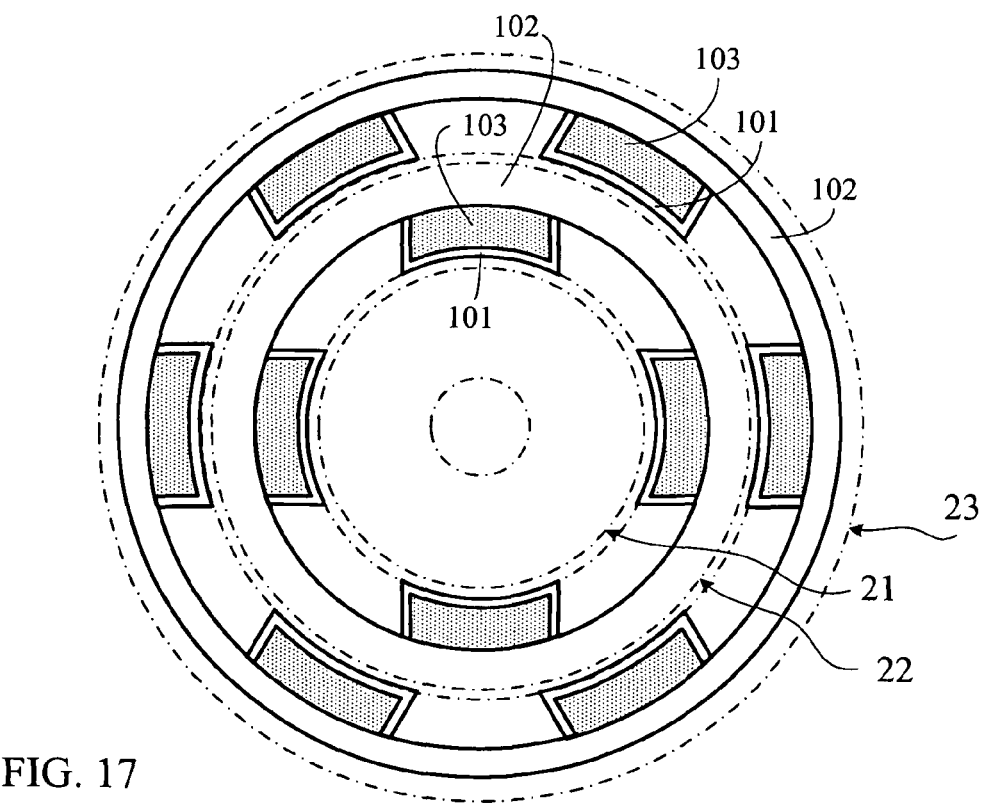
FIG. 17 is a schematic view showing a structure of the present invention applied in a coaxial 3-ring type electric machinery structure, wherein two PM magnetic poles with each being wrapped between an individual magnetic pole and a magnetic circuit are respectively disposed on an EME coupling aspect of an outer ring electric machinery structure to execute EME coupling with a mid ring electric machinery structure and on an EME coupling aspect of the mid ring electric machinery structure to execute EME coupling with an inner ring electric machinery structure.

FIG. 17 is a schematic view showing a structure of the present invention applied in a coaxial 3-ring type electric machinery structure, wherein two PM magnetic poles with each being wrapped between an individual magnetic pole and a magnetic circuit are respectively disposed on an EME coupling aspect of an outer ring electric machinery structure to execute EME coupling with a mid ring electric machinery structure and on an EME coupling aspect of the mid ring electric machinery structure to execute EME coupling with an inner ring electric machinery structure.

As illustrated in FIG. 17 for a coaxial 3-ring type electric machinery structure, both of an EME coupling aspect of the outer ring electric machinery structure 23 in a direction facing the mid ring electric machinery structure 22 to execute EME coupling with the mid ring electric machinery structure 2 and an EME coupling aspect of the mid ring electric machinery structure 22 in a direction facing the inner ring electric machinery structure 21 to execute EME coupling with the inner ring electric machinery structure 21 are respectively provided with a PM magnetic pole 103 wrapped between the magnetic pole 101 and the magnetic circuit 102 from the individual magnetic pole to constitute a coaxial 3-ring type electric machinery provided with the PM magnetic pole wrapped between the individual magnetic pole and the magnetic circuit.

Figure 18:
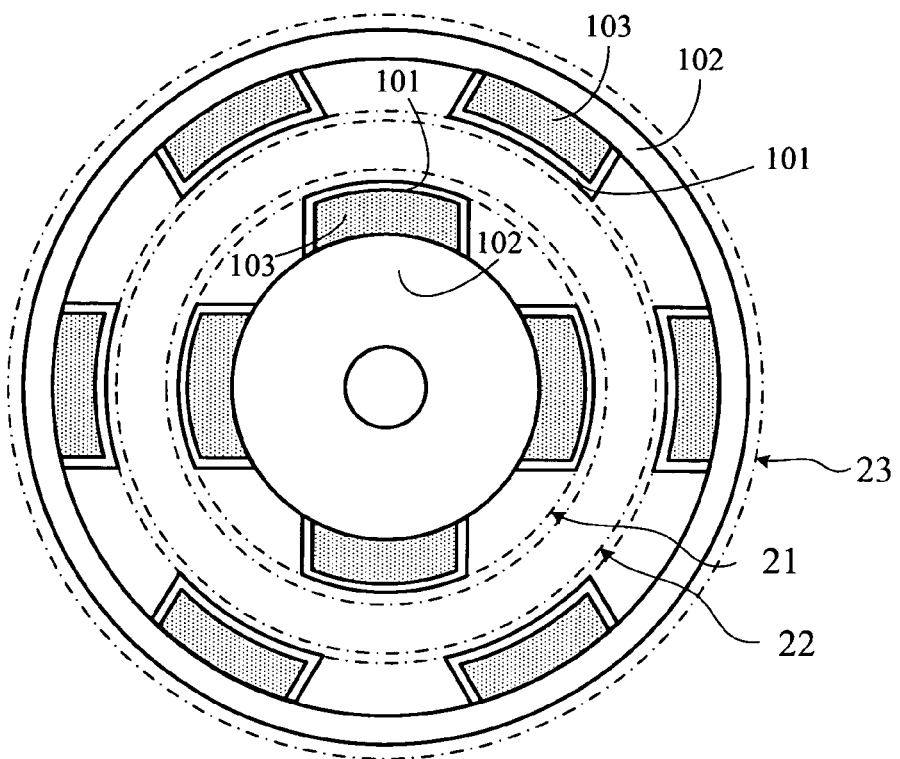
FIG. 18 is a schematic view showing a structure of the present invention applied in a coaxial 3-ring type electric machinery structure, wherein two PM magnetic poles with each being wrapped between an individual magnetic pole and a magnetic circuit are respectively disposed on an EME coupling aspect of an outer ring electric machinery structure in a direction facing a mid ring electric machinery structure and on an EME coupling aspect of an inner ring electric machinery structure in a direction facing a mid ring electric machinery structure.

FIG. 18 is a schematic view showing a structure of the present invention applied in a coaxial 3-ring type electric machinery structure, wherein two PM magnetic poles with each being wrapped between an individual magnetic pole and a magnetic circuit are respectively disposed on an EME coupling aspect of an outer ring electric machinery structure in a direction facing a mid ring electric machinery structure and on an EME coupling aspect of an inner ring electric machinery structure in a direction facing a mid ring electric machinery structure.

As illustrated in FIG. 18 for a coaxial 3-ring type electric machinery structure, both of the EME coupling aspects of the outer ring electric machinery structure 23 and the inner ring electric machinery structure 21 in a direction facing the mid ring electric machinery structure 2 to execute EME coupling with the mid ring electric machinery structure 22 are respectively disposed with the PM magnetic pole 103 wrapped between the magnetic pole 101 and the magnetic circuit 102 from the individual magnetic pole for jointly with the mid ring electric machinery structure 22 to constitute a coaxial 3-ring type electric machinery provided with the PM magnetic pole wrapped between the individual magnetic pole and the magnetic circuit.

Figure 19:
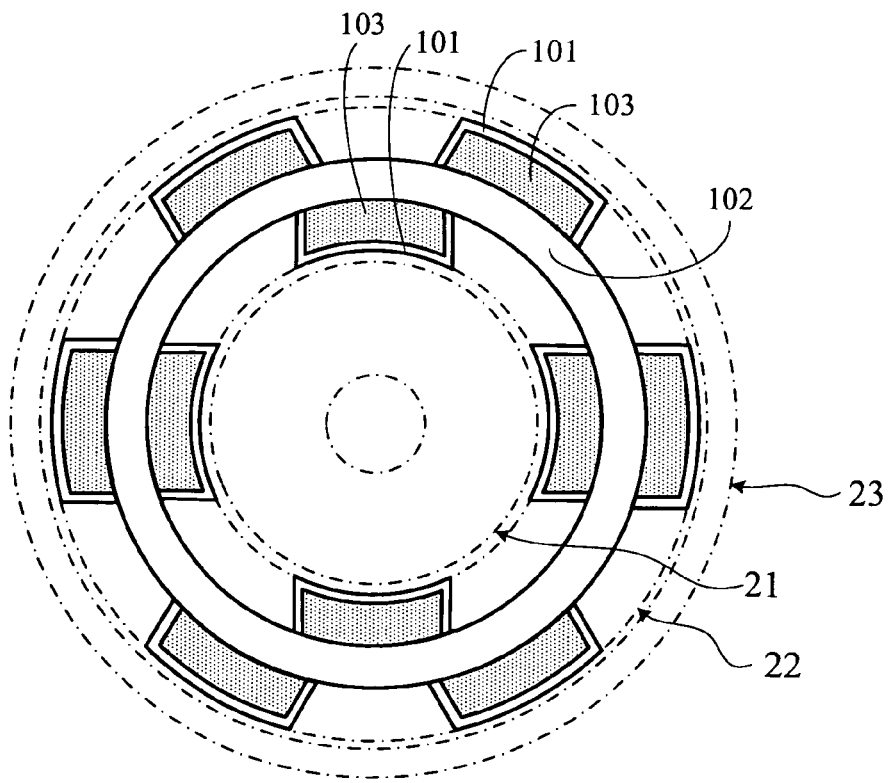
FIG. 19 is a schematic view showing a structure of the present invention applied in a coaxial 3-ring type electric machinery structure, wherein two PM magnetic poles each wrapped between an individual magnetic pole and a magnetic circuit are respectively disposed on an EME coupling aspect of a mid ring electric machinery structure to execute EME coupling with an outer ring electric machinery structure and an inner ring electric machinery structure in a direction facing the outer ring electric machinery structure and in another direction facing the inner ring electric machinery structure.

FIG. 19 is a schematic view showing a structure of the present invention applied in a coaxial 3-ring type electric machinery structure wherein two PM magnetic poles each wrapped between an individual magnetic pole and a magnetic circuit are respectively disposed on an EME coupling aspect of a mid ring electric machinery structure to execute EME coupling with an outer ring electric machinery structure and an inner ring electric machinery structure in a direction facing the outer ring electric machinery structure and in another direction facing the inner ring electric machinery structure.

As illustrated in FIG. 19 for a coaxial 3-ring type electric machinery structure, two PM magnetic poles 103 each being wrapped between the magnetic pole 101 and the magnetic circuit 102 from the individual magnetic pole for executing EME interaction with both the inner electric machinery structure 21 and the outer ring electric machinery structure 23 are respectively disposed on two EME coupling aspects of the mid ring electric machinery structure 22 in both directions respectively facing the outer ring electric machinery structure 23 and the inner ring electric machinery structure 21 to constitute a coaxial 3-ring type electric machinery provided with the PM magnetic pole wrapped between the individual magnetic pole and the magnetic circuit.

Figure 20:
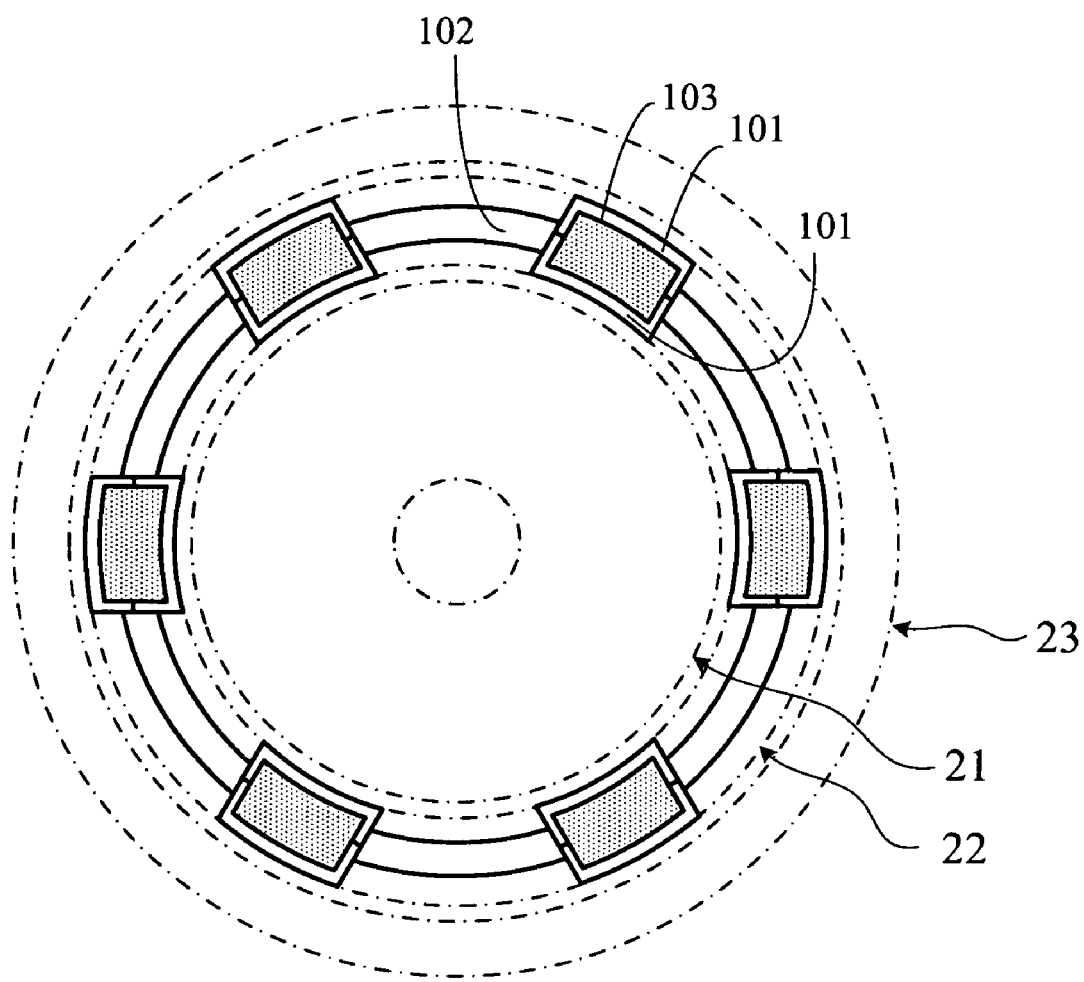
FIG. 20 is a schematic view showing a structure of the present invention applied in a coaxial 3-ring type electric machinery structure wherein a PM magnetic pole to execute bilateral coupling with an inner ring electric machinery structure and an outer ring electric machinery structure on both sides is wrapped by a permeable body on a mid ring electric machinery structure for executing EME coupling with an inner ring electric machinery structure and an outer ring electric machinery structure to constitute a magnetic pole and to form a structure of permeable pole-face on pole-faces at both ends of the PM magnetic pole.

FIG. 20 is a schematic view showing a structure of the present invention applied in a coaxial 3-ring type electric machinery structure wherein a PM magnetic pole to execute bilateral coupling with both an inner ring electric machinery structure and an outer ring electric machinery structure is wrapped by a permeable body on a mid ring electric machinery structure for executing EME coupling with an inner ring electric machinery structure and an outer ring electric machinery structure to constitute a magnetic pole and to form a structure of permeable pole-face on pole-faces at both ends of the PM magnetic pole.

As illustrated in FIG. 20 for a coaxial 3-ring type electric machinery structure, the mid ring electric machinery structure 2 for respectively executing EME coupling with the inner ring electric machinery structure 21 and the outer ring electric machinery structure 23 provided on both sides of the mid ring electric machinery structure 22 is arranged to wrap the PM magnetic pole 103 by a permeable body to constitute magnetic pole 101, so as to form two permeable pole-faces respectively on pole-faces at both ends of the PM magnetic pole 103; through the permeable pole-faces, the magnetic poles at both ends of the PM magnetic pole respectively execute bilateral coupling with the inner ring electric machinery structure 21 and the outer ring electric machinery structure 23 for executing EME interaction, thus to constitute a coaxial 3-ring type electric machinery with two permeable pole-faces each being formed on pole-faces at both ends of the PM magnetic pole.

Figure 21:
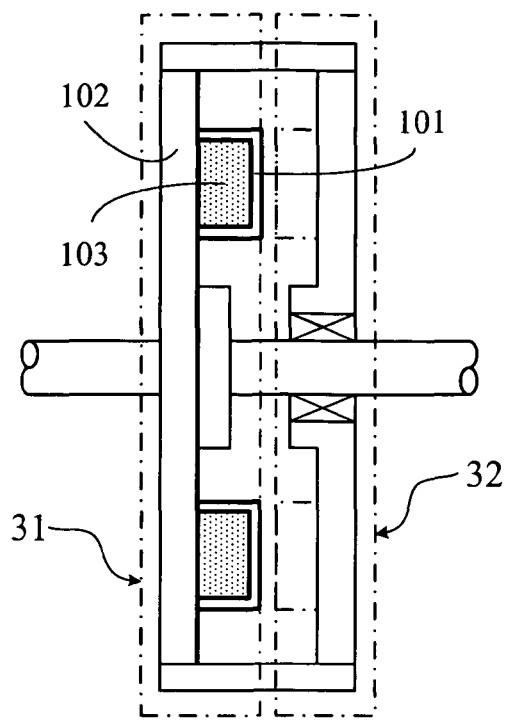
FIG. 21 is a schematic view showing a structure of the present invention applied in a double layer type plate electric machinery structure wherein a PM magnetic pole wrapped by a permeable polar face and a magnetic circuit from an individual magnetic pole is disposed on an EME coupling aspect of the inner layer plate electric machinery structure in a direction facing an outer layer plate electric machinery structure.

FIG. 21 is a schematic view showing a structure of the present invention applied in a double layer type plate electric machinery structure wherein a PM magnetic pole wrapped between an individual magnetic pole and a magnetic circuit is disposed on an EME coupling aspect of an inner layer plate electric machinery structure in a direction facing an outer layer plate electric machinery structure.

As illustrated in FIG. 21 for a double layer type plate electric machinery structure, the PM magnetic pole 103 wrapped between the magnetic pole 101 and the magnetic circuit 102 from the individual magnetic pole is disposed on an EME coupling aspect of the inner layer plate electric machinery structure 31 in a direction facing the outer layer plate electric machinery structure 32 to execute EME interaction with the outer layer plate electric machinery structure 32; or the PM magnetic pole 103 wrapped between the magnetic pole 101 and the magnetic circuit 102 from the individual magnetic pole is disposed on an EME coupling aspect of an outer layer plate electric machinery structure 32 in a direction facing an inner layer plate electric machinery structure 31 to execute EME interaction with the inner layer plate electric machinery structure, thus to constitute a double layer type plate electric machinery provided with the PM magnetic pole wrapped between the individual magnetic pole and the magnetic circuit.

Figure 22:
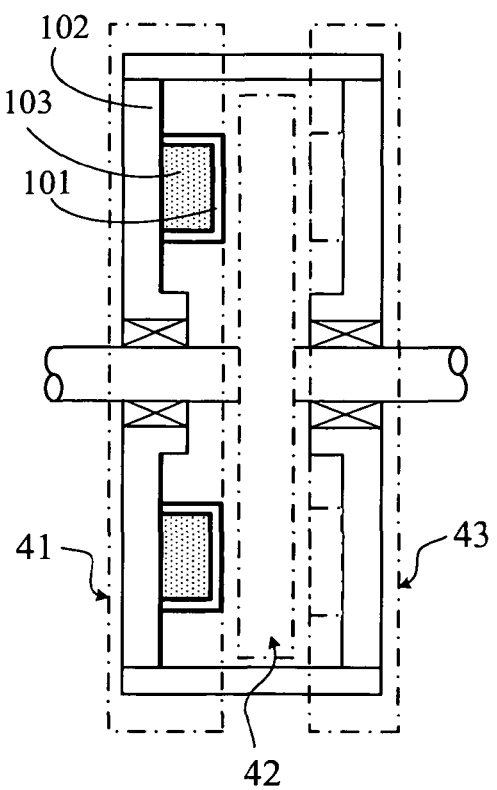
FIG. 22 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of an inner layer plate electric machinery structure in a direction facing a mid layer plate electric machinery structure.

FIG. 22 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of an inner layer plate electric machinery structure in a direction facing a mid layer plate electric machinery structure.

As illustrated in FIG. 22 for a coaxial 3-layer type plate electric machinery structure, the PM magnetic pole 103 wrapped between the magnetic pole 101 and the magnetic circuit 102 from the individual magnetic pole to execute EME interaction with a mid layer plate electric machinery structure 42 is disposed on an EME coupling aspect of an inner layer plate electric machinery structure 41 in a direction facing a mid layer plate electric machinery structure 42, and the type of the electric machinery structure between a mid layer plate electric machinery structure 42 and an outer layer plate electric machinery structure 43 is selected upon its EME property thus to constitute a 3-layer type plate electric machinery provided with the PM magnetic pole wrapped between the individual magnetic pole and the magnetic circuit.

Figure 23:
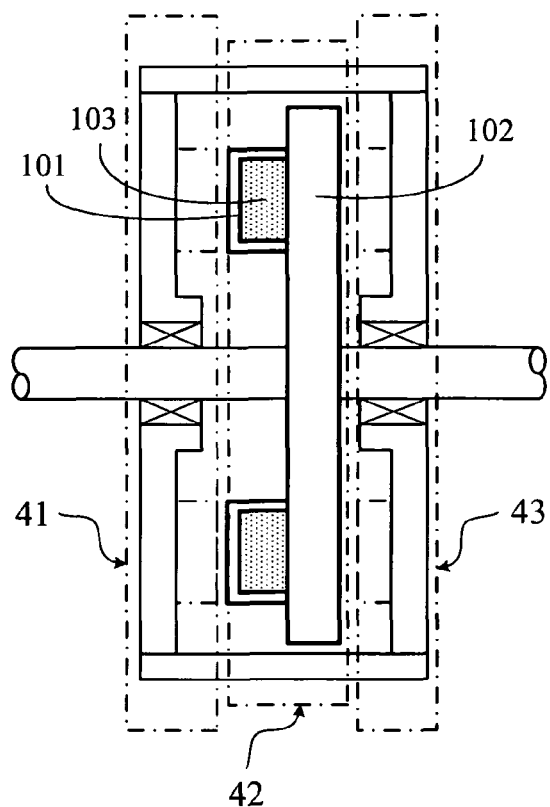
FIG. 23 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of a mid layer plate electric machinery structure in a direction facing an inner layer plate electric machinery structure.

FIG. 23 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of a mid layer plate electric machinery structure in a direction facing an inner layer plate electric machinery structure.

As illustrated in FIG. 23 for a coaxial 3-layer type plate electric machinery structure, the PM magnetic pole 103 wrapped between the magnetic pole 101 and the magnetic circuit 102 from the individual magnetic pole to execute EME interaction with an inner layer plate electric machinery structure 41 is disposed on an EME coupling aspect of a mid layer plate electric machinery structure 42 in a direction facing an inner layer plate electric machinery structure 41, and the type of the electric machinery structure between a mid layer plate electric machinery structure 42 and an outer layer plate electric machinery structure 43 is selected upon its EME property thus to constitute a 3-layer type plate electric machinery provided with the PM magnetic pole wrapped between the individual magnetic pole and the magnetic circuit.

Figure 24:
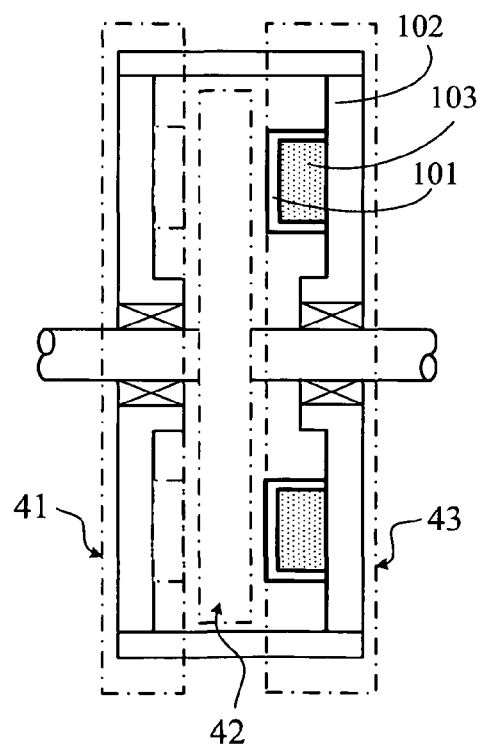
FIG. 24 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of an outer layer plate electric machinery structure in a direction facing a mid layer plate electric machinery structure.

FIG. 24 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of an outer layer plate electric machinery structure in a direction facing a mid layer plate electric machinery structure.

As illustrated in FIG. 24 for a coaxial 3-layer type plate electric machinery structure, the PM magnetic pole 103 wrapped between the magnetic pole 101 and the magnetic circuit 102 from the individual magnetic pole to execute EME interaction with a mid layer plate electric machinery structure 42 is disposed on an EME coupling aspect of an outer layer plate electric machinery structure 43 in a direction facing a mid layer plate electric machinery structure 42, and the type of the electric machinery structure between a mid layer plate electric machinery structure 42 and an inner layer plate electric machinery structure 41 is selected upon its EME property thus to constitute a 3-layer type plate electric machinery provided with the PM magnetic pole wrapped between the individual magnetic pole and the magnetic circuit.

Figure 25:
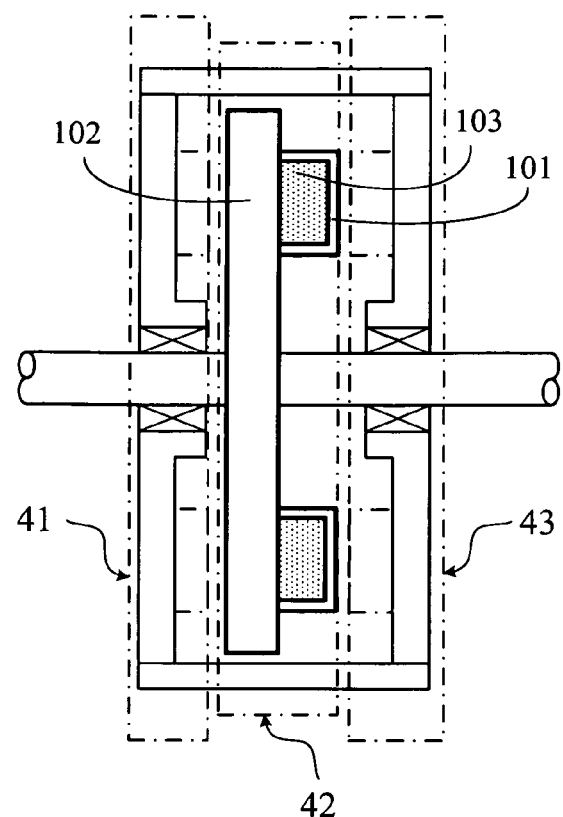
FIG. 25 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of a mid layer plate electric machinery structure in a direction facing an outer layer plate electric machinery structure.

FIG. 25 is a schematic view showing a structure of the present invention applied in a coaxial 3-layer type plate electric machinery structure wherein a PM magnetic pole wrapped between an individual magnetic pole and a magnetic circuit is disposed on an EME coupling aspect of a mid layer plate electric machinery structure in a direction facing an outer layer plate electric machinery structure.

As illustrated in FIG. 25 for a coaxial 3-layer type plate electric machinery structure, the PM magnetic pole 103 wrapped between the magnetic pole 101 and the magnetic circuit 102 from the individual magnetic pole to execute EME interaction with an outer layer plate electric machinery structure 43 is disposed on an EME coupling aspect of a mid layer plate electric machinery structure 42 in a direction facing an outer layer plate electric machinery structure 43, and the type of the electric machinery structure between a mid layer plate electric machinery structure 42 and an inner layer plate electric machinery structure 41 is selected upon its EME property thus to constitute a 3-layer type plate electric machinery provided with the PM magnetic pole wrapped between the individual magnetic pole and the magnetic circuit.

Figure 26:
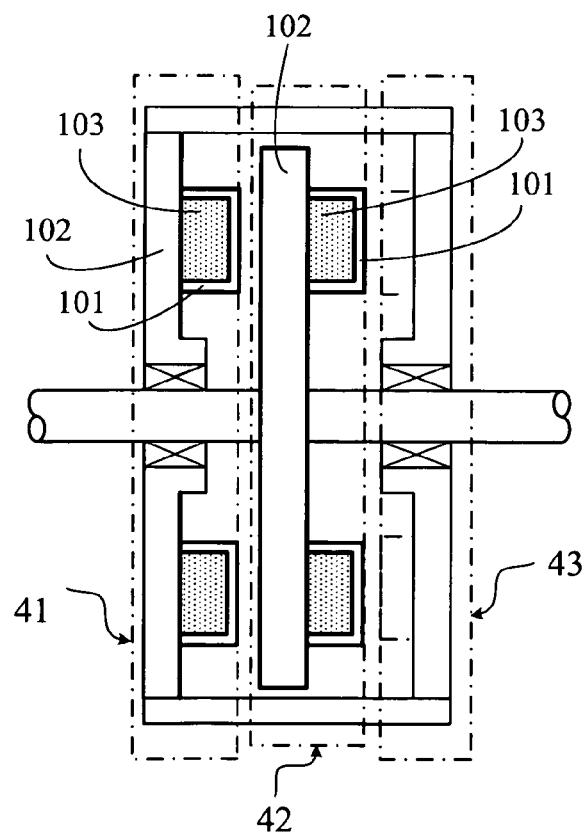
FIG. 26 is a schematic view showing a structure of the present invention applied in a coaxial 3-layer type plate electric machinery structure wherein two PM magnetic poles with each being wrapped between an individual magnetic pole and a magnetic circuit are respectively disposed on an EME coupling aspect of an inner layer plate electric machinery structure in a direction facing a mid layer plate electric machinery structure, and on an EME coupling aspect of a mid layer plate electric machinery structure in a direction facing an outer layer plate electric machinery structure.

FIG. 26 is a schematic view showing a structure of the present invention applied in a coaxial 3-layer type plate electric machinery structure wherein two PM magnetic poles with each being wrapped between an individual magnetic pole and a magnetic circuit from an individual magnetic pole are respectively disposed on an EME coupling aspect of an inner layer plate electric machinery structure in a direction facing a mid layer plate electric machinery structure, and on an EME coupling aspect of a mid layer plate electric machinery structure in a direction facing an outer layer plate electric machinery structure.

As illustrated in FIG. 26 for a coaxial 3-layer type plate electric machinery structure, both of an EME coupling aspect of an inner layer plate electric machinery structure 41 in a direction facing the mid layer plate electric machinery structure 42, and an EME coupling aspect of the mid layer plate electric machinery structure 42 in a direction facing the outer layer plate electric machinery structure 43 are respectively disposed with the PM magnetic pole 103 wrapped between the magnetic pole 101 and the magnetic circuit 102 from the individual magnetic pole for jointly with the outer layer plate electric machinery structure 43 to constitute a 3-layer type plate electric machinery provided with the PM magnetic pole wrapped between the individual magnetic pole and the magnetic circuit.

Figure 27:
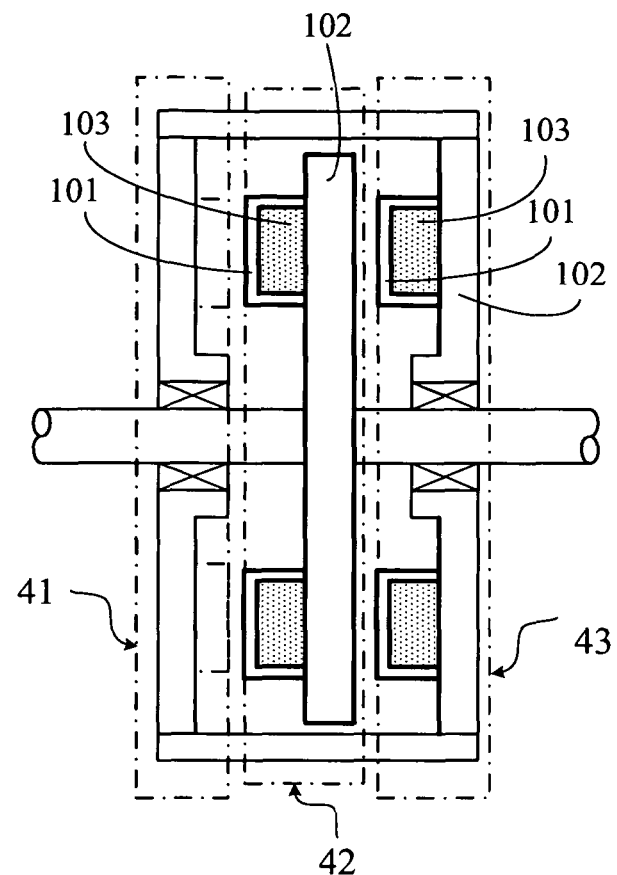
FIG. 27 is a schematic view showing a structure of the present invention applied in a coaxial 3-layer type plate electric machinery structure wherein two PM magnetic poles with each being wrapped between an individual magnetic pole and a magnetic circuit are respectively disposed on an EME coupling aspect of an outer layer plate electric machinery structure in a direction facing a mid layer plate electric machinery structure, and on an EME coupling aspect of a mid layer plate electric machinery structure in a direction facing an inner layer plate electric machinery structure.

FIG. 27 is a schematic view showing a structure of the present invention applied in a coaxial 3-layer type plate electric machinery structure wherein two PM magnetic poles with each being wrapped between an individual magnetic pole and a magnetic circuit from an individual magnetic pole are respectively disposed on an EME coupling aspect of an outer layer plate electric machinery structure in a direction facing a mid layer plate electric machinery structure, and on an EME coupling aspect of a mid layer plate electric machinery structure in a direction facing an inner layer plate electric machinery structure.

As illustrated in FIG. 27 for a coaxial 3-layer type plate electric machinery structure, both of the EME coupling aspect of the outer layer plate electric machinery structure 43 in a direction facing the mid layer plate electric machinery structure 42 and the EME coupling aspect of the mid layer plate electric machinery structure 42 in a direction facing the inner layer plate electric machinery structure 41 are respectively disposed with the PM magnetic pole 103 wrapped between the magnetic pole 101 and the magnetic circuit 102 from the individual magnetic pole for constituting a coaxial 3-layer type plate electric machinery provided with the PM magnetic pole wrapped between the individual magnetic pole and the magnetic circuit from the individual magnetic pole.

Figure 28:
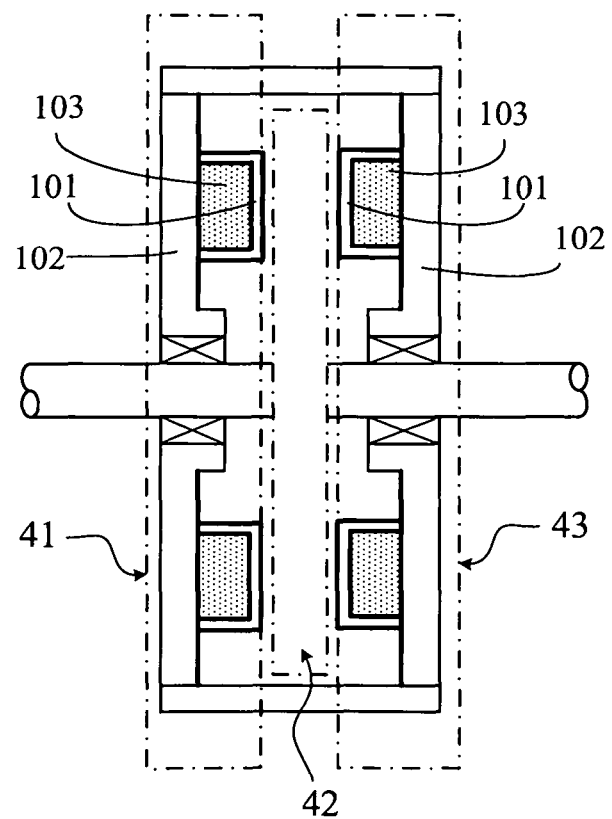
FIG. 28 is a schematic view showing a structure of the present invention applied in a coaxial 3-layer type plate electric machinery structure wherein two PM magnetic poles with each being wrapped between an individual magnetic pole and a magnetic circuit are respectively disposed on an EME coupling aspect of an inner layer plate electric machinery structure, and on an EME coupling aspect of an outer layer plate electric machinery structure to respectively execute EME coupling with a mid layer plate electric machinery structure.

FIG. 28 is a schematic view showing a structure of the present invention applied in a coaxial 3-layer type plate electric machinery structure wherein two PM magnetic poles with each being wrapped between an individual magnetic pole and a magnetic circuit from an individual magnetic pole are respectively disposed on an EME coupling aspect of an inner layer plate electric machinery structure, and on an EME coupling aspect of an outer layer plate electric machinery structure to respectively execute EME coupling with a mid layer plate electric machinery structure.

As illustrated in FIG. 28 for a coaxial 3-layer type plate electric machinery structure, both of an EME coupling aspect of the inner layer plate electric machinery structure 41 in a direction facing a mid layer plate electric machinery structure 42 and an EME coupling aspect of the outer layer plate electric machinery structure 43 in a direction facing a mid layer plate electric machinery structure 42 are each disposed with the PM magnetic pole 103 wrapped between the magnetic pole 101 and the magnetic circuit 102 from the individual magnetic pole for executing EME interaction with the mid layer electric machinery structure 42 thus to constitute a coaxial 3-layer type plate electric machinery provided with the PM magnetic pole wrapped between the individual magnetic pole and the magnetic circuit.

Figure 29:
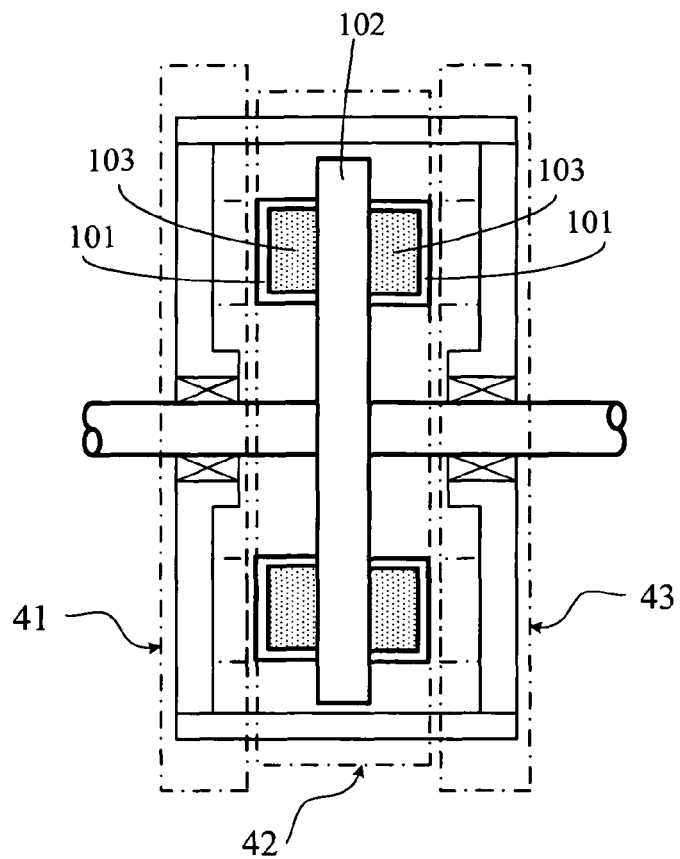
FIG. 29 is a schematic view showing a structure of the present invention applied in a coaxial 3-layer type plate electric machinery structure wherein two PM magnetic poles each being wrapped between an individual magnetic pole and a magnetic circuit are respectively disposed on both sides of a mid layer plate electric machinery structure to execute EME coupling with an inner layer plate electric machinery structure and an outer layer plate electric machinery structure.

FIG. 29 is a schematic view showing a structure of the present invention applied in a coaxial 3-layer type plate electric machinery structure wherein two PM magnetic poles each being wrapped between an individual magnetic pole and a magnetic circuit from an individual magnetic pole are respectively disposed on both sides of a mid layer plate electric machinery structure to execute EME coupling with both an inner layer plate electric machinery structure and an outer layer plate electric machinery structure.

As illustrated in FIG. 29 for a coaxial 3-layer type plate electric machinery structure, two EME coupling aspects on both sides of the mid layer plate electric machinery structure 42 in a direction facing an inner layer plate electric machinery structure 41 and in another direction facing an outer layer plate electric machinery structure 43 provided on both sides of the mid layer plate electric machinery structure 42 are respectively disposed with the PM magnetic pole 103 wrapped between the magnetic pole 101 and the magnetic circuit 102 from the individual magnetic pole for executing EME interaction with the inner layer plate electric machinery structure 41 and the outer layer plate electric machinery structure 43 thus to constitute a coaxial 3-layer type plate electric machinery provided with the PM magnetic pole wrapped between the individual magnetic pole and the magnetic circuit.

Figure 30:
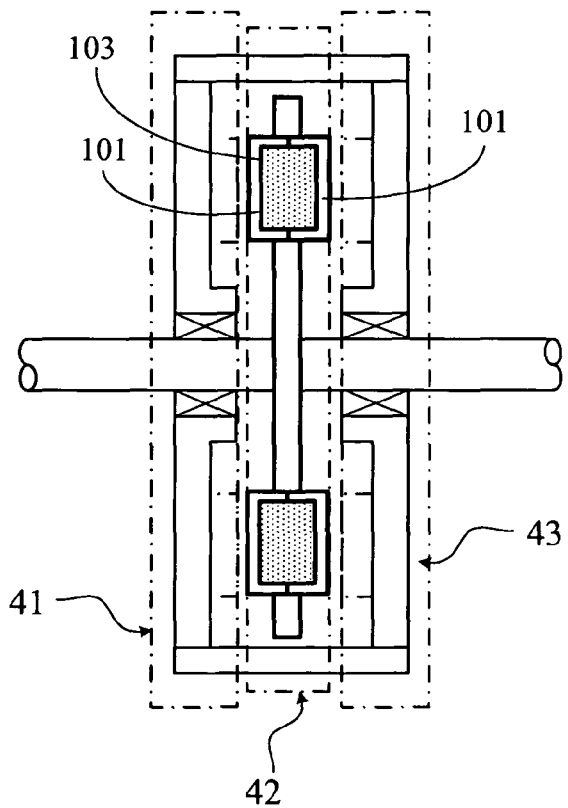
FIG. 30 is a schematic view showing a structure of the present invention applied in a coaxial 3-layer type plate electric machinery structure wherein a PM magnetic pole to execute bilateral coupling with an inner layer plate electric machinery structure and an outer layer plate electric machinery structure on both sides is wrapped by a permeable body on a mid layer plate electric machinery structure for executing EME coupling with an inner layer plate electric machinery structure and an outer layer plate electric machinery structure to constitute a magnetic pole and to form a structure of permeable pole-face on pole-faces at both ends of the PM magnetic pole.

FIG. 30 is a schematic view showing a structure of the present invention applied in a coaxial 3-layer type plate electric machinery structure, wherein a PM magnetic pole to execute bilateral coupling with an inner layer plate electric machinery structure and an outer layer plate electric machinery structure on both sides is wrapped by a permeable body on a mid layer plate electric machinery structure for executing EME coupling with an inner layer plate electric machinery structure and an outer layer plate electric machinery structure to constitute a magnetic pole and to form a structure of permeable pole-face on pole-faces at both ends of the PM magnetic pole.

As illustrated in FIG. 30 for a coaxial 3-layer type plate electric machinery structure, the mid layer plate electric machinery structure 42 for respectively executing EME coupling with the inner layer plate electric machinery structure 41 and the outer layer plate electric machinery structure 43 provided on both sides of the mid layer plate electric machinery structure 42 is arranged to wrap the PM magnetic pole 103 by a permeable body to constitute magnetic pole 101, so as to form two permeable pole-faces respectively on pole-faces at both ends of the PM magnetic pole 103; through the permeable pole-faces, the magnetic poles at both ends of the PM magnetic pole respectively execute bilateral coupling with the inner layer plate electric machinery structure 41 and the outer layer plate electric machinery structure 43 for executing EME interaction, thus to constitute a coaxial 3-layer type plate electric machinery with two permeable pole-faces each being formed on pole-faces at both ends of the PM magnetic pole.

Figure 31:
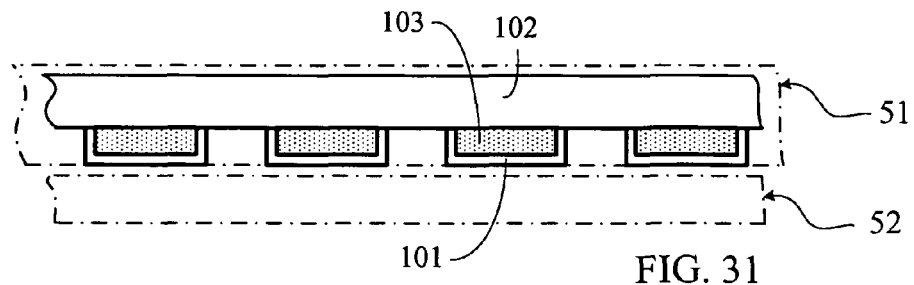
FIG. 31 is a schematic view showing a structure of the present invention applied in a double layer type linear electric machinery structure wherein the double layer linear electric machinery has disposed on an EME coupling aspect of an inner layer linear electric machinery structure a PM magnetic pole wrapped between an individual magnetic pole and a magnetic circuit from an individual magnetic pole.

FIG. 31 is a schematic view showing a structure of the present invention applied in a double layer type linear electric machinery structure wherein the double linear electric machinery has disposed on an EME coupling aspect of an inner layer linear electric machinery structure a PM magnetic pole wrapped between an individual magnetic pole and a magnetic circuit.

As illustrated in FIG. 31 for a double layer type linear electric machinery structure, the PM magnetic pole 103 wrapped between the magnetic pole 101 and the magnetic circuit 102 from the individual magnetic pole is disposed on an EME coupling aspect of the inner layer linear electric machinery structure 51 in a direction facing an outer layer linear electric machinery structure 52 to execute EME interaction with the outer layer linear electric machinery structure 52; or the PM magnetic pole 103 wrapped between the magnetic pole 101 and the magnetic circuit 102 from the individual magnetic pole is disposed on an EME coupling aspect of the outer layer linear electric machinery structure 53 in a direction facing an inner layer linear electric machinery structure 51 to execute EME interaction with the inner layer linear electric machinery structure 51 thus to constitute a double layer type electric machinery provided with the PM magnetic pole wrapped between the individual magnetic pole and the magnetic circuit.

Figure 32:
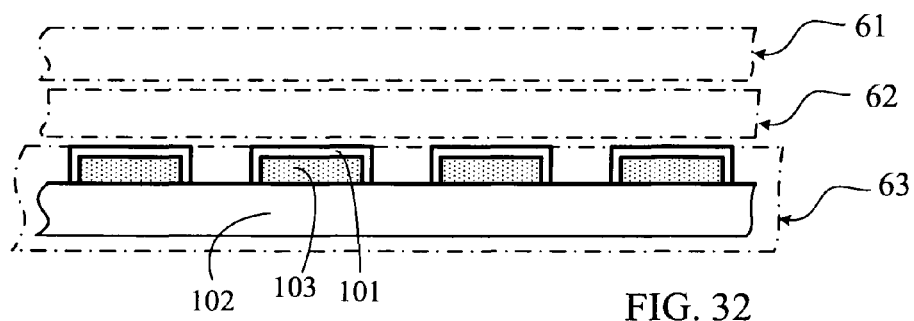
FIG. 32 is a schematic view showing a structure of the present invention applied in a 3-layer type linear electric machinery structure wherein a PM magnetic pole wrapped between an individual magnetic pole and a magnetic circuit is disposed on an outer layer linear electric machinery structure to execute EME coupling with a mid layer linear electric machinery structure.

FIG. 32 is a schematic view showing a structure of the present invention applied in a 3-layer type linear electric machinery structure wherein a PM magnetic pole wrapped between an individual magnetic pole and a magnetic circuit is disposed on an outer layer linear electric machinery structure to execute EME coupling with a mid layer linear electric machinery structure.

As illustrated in FIG. 32 for a layer type linear electric machinery structure, the PM magnetic pole 103 wrapped between the magnetic pole 101 and the magnetic circuit 102 from the individual magnetic pole to execute EME interaction with a mid layer linear electric machinery structure 62 is disposed on an EME coupling aspect of an outer layer linear electric machinery structure 61 in a direction facing a mid layer linear electric machinery structure 62, and the type of the electric machinery structure between a mid layer linear electric machinery structure 62 and an inner layer linear electric machinery structure 61 is selected upon its EME property thus to constitute a 3-layer type linear electric machinery provided with the PM magnetic pole wrapped between the individual magnetic pole and the magnetic circuit.

Figure 33:
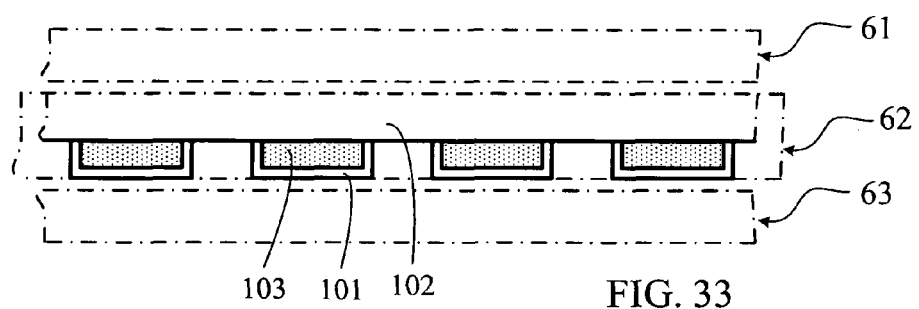
FIG. 33 is a schematic view showing a structure of the present invention applied in a 3-layer type linear electric machinery structure wherein a PM magnetic pole wrapped between an individual magnetic pole and a magnetic circuit is disposed on an EME coupling aspect of a mid layer linear electric machinery structure in a direction facing an outer layer linear electric machinery structure.

FIG. 33 is a schematic view showing a structure of the present invention applied in a 3-layer type linear electric machinery structure wherein a PM magnetic pole wrapped between an individual magnetic pole and a magnetic circuit is disposed on an EME coupling aspect of a mid layer linear electric machinery structure in a direction facing an outer layer linear electric machinery structure.

As illustrated in FIG. 33 for a layer type linear electric machinery structure, the PM magnetic pole 103 wrapped between the magnetic pole 101 and the magnetic circuit 102 from the individual magnetic pole to execute EME interaction with an outer layer linear electric machinery structure 63 is disposed on an EME coupling aspect of a mid layer linear electric machinery structure 62 in a direction facing an outer layer linear electric machinery structure 63, and the type of the electric machinery structure between a mid layer linear electric machinery structure 62 and an inner layer linear electric machinery structure 61 is selected upon its EME property thus to constitute a 3-layer type linear electric machinery provided with the PM magnetic pole wrapped between the individual magnetic pole and the magnetic circuit.

Figure 34:
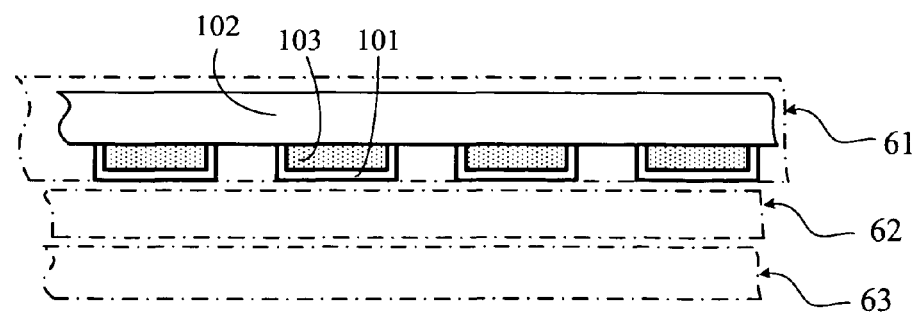
FIG. 34 is a schematic view showing a structure of the present invention applied in a 3-layer type linear electric machinery structure wherein a PM magnetic pole wrapped between an individual magnetic pole and a magnetic circuit is disposed on an EME coupling aspect of an inner layer linear electric machinery structure in a direction facing a mid layer linear electric machinery structure.

FIG. 34 is a schematic view showing a structure of the present invention applied in a 3-layer type linear electric machinery structure wherein a PM magnetic pole wrapped between an individual magnetic pole and a magnetic circuit is disposed on an EME coupling aspect of an inner layer linear electric machinery structure in a direction facing a mid layer linear electric machinery structure.

As illustrated in FIG. 34 for a layer type linear electric machinery structure, the PM magnetic pole 103 wrapped between the magnetic pole 101 and the magnetic circuit 102 from the individual magnetic pole to execute EME interaction with a mid layer linear electric machinery structure 62 is disposed on an EME coupling aspect of an inner layer linear electric machinery structure 61 in a direction facing a mid layer linear electric machinery structure 62, and the type of the electric machinery structure between a mid layer linear electric machinery structure 62 and an outer layer linear electric machinery structure 63 is selected upon its EME property thus to constitute a 3-layer type linear electric machinery provided with the PM magnetic pole wrapped between the individual magnetic pole and the magnetic circuit.

Figure 35:
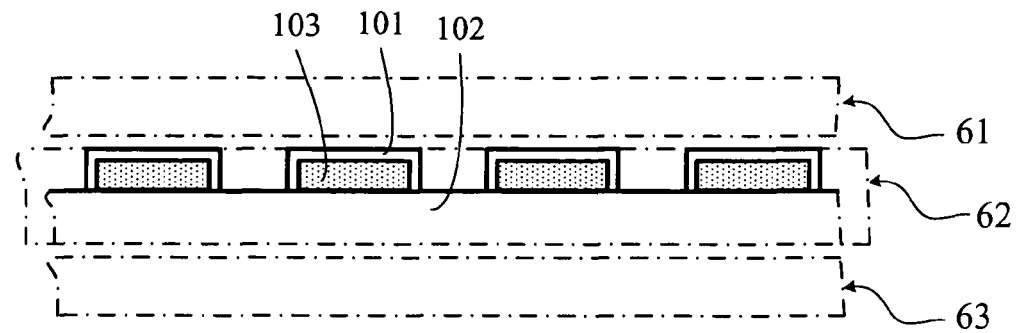
FIG. 35 is a schematic view showing a structure of the present invention applied in a 3-layer type linear electric machinery structure wherein a PM magnetic pole wrapped between an individual magnetic pole and a magnetic circuit is disposed to an EME coupling aspect of a mid layer linear electric machinery structure in a direction facing an inner layer linear electric machinery structure.

FIG. 35 is a schematic view showing a structure of the present invention applied in a 3-layer type linear electric machinery structure wherein a PM magnetic pole wrapped between an individual magnetic pole and a magnetic circuit is disposed to an EME coupling aspect of a mid layer linear electric machinery structure in a direction facing an inner layer linear electric machinery structure.

As illustrated in FIG. 35 for a layer type linear electric machinery structure, the PM magnetic pole 103 wrapped between the magnetic pole 101 and the magnetic circuit 102 from the individual magnetic pole to execute EME interaction with an inner layer linear electric machinery structure 61 is disposed on an EME coupling aspect of a mid layer linear electric machinery structure 62 in a direction facing an inner layer linear electric machinery structure 61, and the type of the electric machinery structure between a mid layer linear electric machinery structure 62 and an outer layer linear electric machinery structure 63 is selected upon its EME property thus to constitute a 3-layer type linear electric machinery provided with the PM magnetic pole wrapped between the individual magnetic pole and the magnetic circuit.

Figure 36:
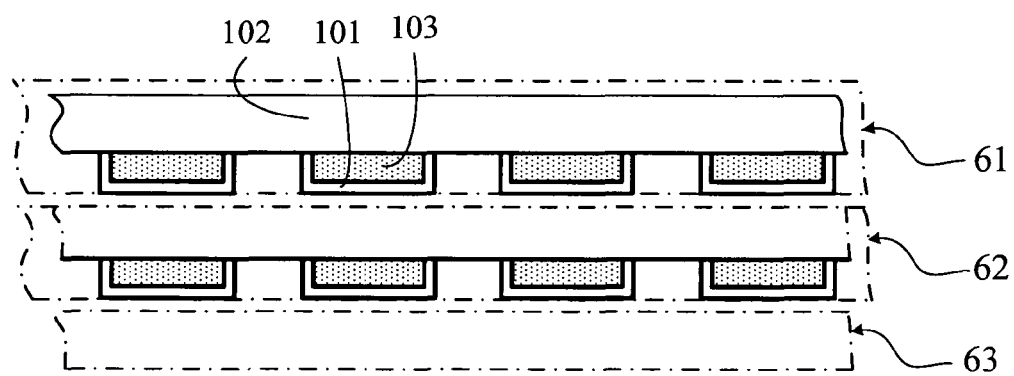
FIG. 36 is a schematic view showing a structure of the present invention applied in a 3-layer type linear electric machinery structure wherein two PM magnetic poles each being wrapped between an individual magnetic pole and a magnetic circuit are respectively disposed on an EME coupling aspect of a mid layer linear electric machinery structure to execute EME coupling with an outer layer linear electric machinery structure, and on an EME coupling aspect of an inner layer linear electric machinery structure to execute EME coupling with a mid layer linear electric machinery structure.

FIG. 36 is a schematic view showing a structure of the present invention applied in a 3-layer linear type electric machinery structure wherein two PM magnetic poles each being wrapped between an individual magnetic pole and a magnetic circuit are respectively disposed on an EME coupling aspect of a mid layer linear electric machinery structure to execute EME coupling with an outer layer linear electric machinery structure, and on an EME coupling aspect of an inner layer linear electric machinery structure to execute EME coupling with a mid layer linear electric machinery structure.

As illustrated in FIG. 36 for a layer type linear electric machinery structure, both of an EME coupling aspect of the mid layer linear electric machinery structure 62 in a direction facing the outer layer linear electric machinery structure 63 and an EME coupling aspect of the inner layer linear electric machinery structure 61 in a direction facing the mid layer linear electric machinery structure 62 are respectively disposed with the PM magnetic pole 103 wrapped between the magnetic pole 101 and the magnetic circuit 102 from the individual magnetic pole, thus to constitute a 3-layer type linear electric machinery provided with the PM magnetic pole wrapped between the individual magnetic pole and the magnetic circuit.

Figure 37:
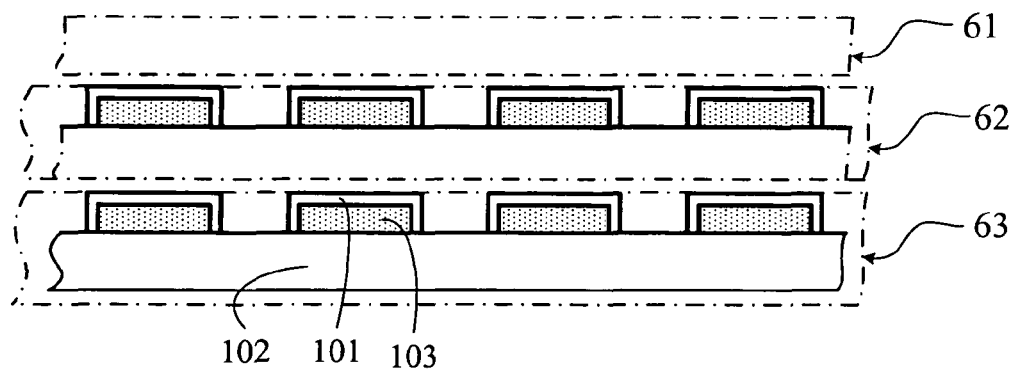
FIG. 37 is a schematic view showing a structure of the present invention applied in a 3-layer type linear electric machinery structure wherein two PM magnetic poles each being wrapped between an individual magnetic pole and a magnetic circuit are respectively disposed on an EME coupling aspect of an outer layer linear electric machinery structure to execute EME coupling with a mid layer linear electric machinery structure, and on an EME coupling aspect of a mid layer linear electric machinery structure to execute EME coupling with an inner layer linear electric machinery structure.

FIG. 37 is a schematic view showing a structure of the present invention applied in a 3-layer type linear electric machinery structure wherein two PM magnetic poles each being wrapped between an individual magnetic pole and a magnetic circuit are respectively disposed on an EME coupling aspect of an outer layer linear electric machinery structure to execute EME coupling with a mid layer linear electric machinery structure, and on an EME coupling aspect of a mid layer linear electric machinery structure to execute EME coupling with an inner layer linear electric machinery structure.

As illustrated in FIG. 37 for a layer type linear electric machinery structure, two PM magnetic poles 103 each being wrapped between the magnetic pole 101 and the magnetic circuit 102 from the individual magnetic pole are respectively disposed on an EME coupling aspect of the outer layer linear electric machinery structure 63 in a direction facing a mid layer linear electric machinery structure 62 and an EME coupling aspect of the mid layer linear electric machinery structure 62 in a direction facing the inner layer linear electric machinery structure 61 thus to constitute a 3-layer type linear electric machinery provided with the PM magnetic pole wrapped between the individual magnetic pole and the magnetic circuit.

Figure 38:
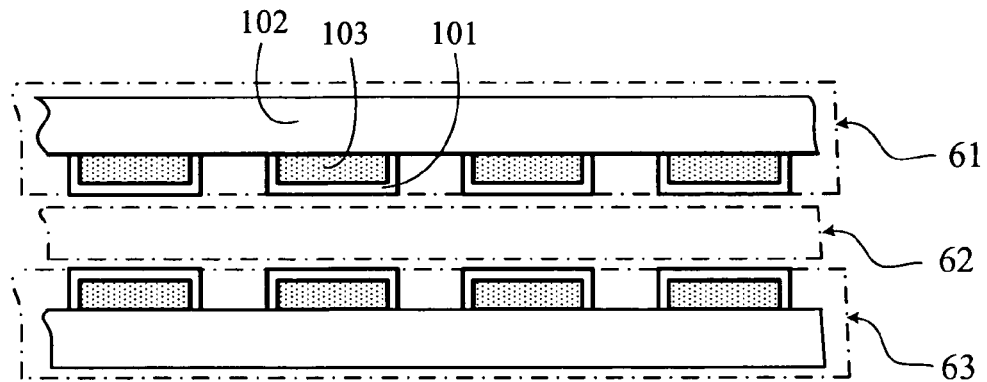
FIG. 38 is a schematic view showing a structure of the present invention applied in a 3-layer type linear electric machinery structure wherein two PM magnetic poles each being wrapped between an individual magnetic pole and a magnetic circuit are respectively disposed on an EME coupling aspect of an outer layer linear electric machinery structure to execute EME coupling with a mid layer linear electric machinery structure, and on an EME coupling aspect of an inner layer linear electric machinery structure to execute EME coupling with a mid layer linear electric machinery structure.

FIG. 38 is a schematic view showing a structure of the present invention applied in a 3-layer type linear electric machinery structure wherein two PM magnetic poles each being wrapped between an individual magnetic pole and a magnetic circuit are respectively disposed on an EME coupling aspect of an outer layer linear electric machinery structure to execute EME coupling with a mid layer linear electric machinery structure, and on an EME coupling aspect of an inner layer linear electric machinery structure to execute EME coupling with a mid layer linear electric machinery structure.

As illustrated in FIG. 38 for a 3-layer type linear electric machinery structure, an EME coupling aspect of the outer layer linear electric machinery structure 63 in a direction facing the mid layer linear electric machinery structure 62 and an EME coupling aspect of the inner layer linear electric machinery structure 61 facing in a direction facing the mid layer linear electric machinery structure 62 are each disposed with the PM magnetic pole 103 wrapped between the magnetic pole 101 and the magnetic circuit 102 from the individual magnetic pole for executing EME interaction with the mid layer linear electric machinery structure 62, thus to constitute a 3-layer type linear electric machinery provided with the PM magnetic pole wrapped between the individual magnetic pole and the magnetic circuit.

Figure 39:
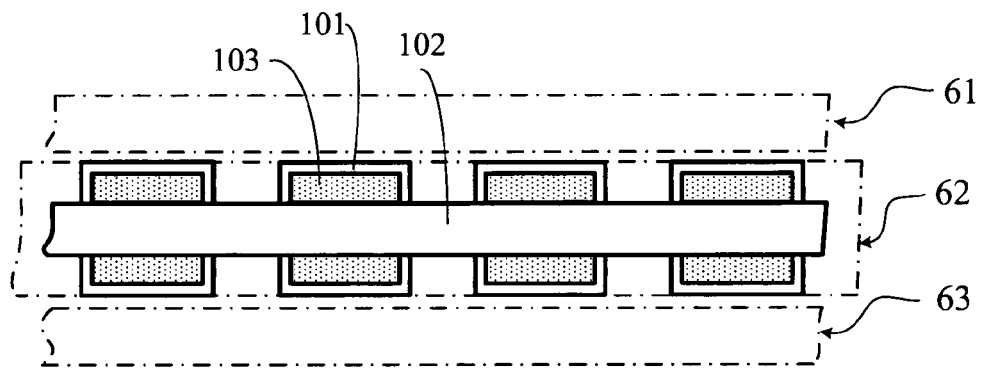
FIG. 39 is a schematic view showing a structure of the present invention applied in a 3-layer type linear electric machinery structure wherein two PM magnetic poles each being wrapped between an individual magnetic pole and a magnetic circuit are respectively disposed on two EME coupling aspects of both sides of a mid layer linear electric machinery structure to respectively execute EME coupling with an outer layer linear electric machinery structure and an inner layer linear electric machinery structure.

FIG. 39 is a schematic view showing a structure of the present invention applied in a 3-layer type linear electric machinery structure wherein two PM magnetic poles each being wrapped between an individual magnetic pole and a magnetic circuit are respectively disposed on two EME coupling aspects of both sides of a mid layer linear electric machinery structure to respectively execute EME coupling with an outer layer linear electric machinery structure and an inner layer linear electric machinery structure.

As illustrated in FIG. 39 for a 3-layer type linear electric machinery structure, two PM magnetic poles 103 each being wrapped between the magnetic pole 101 and the magnetic circuit 102 from the individual magnetic pole are respectively disposed on two EME coupling aspects on both sides of the mid layer linear electric machinery structure 62 in a direction facing the outer layer linear electric machinery structure 63 and in another direction facing the inner layer linear electric machinery structure 61 for executing EME interaction with both the inner layer linear electric machinery structure 61 and the outer layer linear electric machinery structure 63 thus to constitute a 3-layer type linear electric machinery provided with the PM magnetic pole wrapped between the individual magnetic pole and the magnetic circuit.

Figure 40:
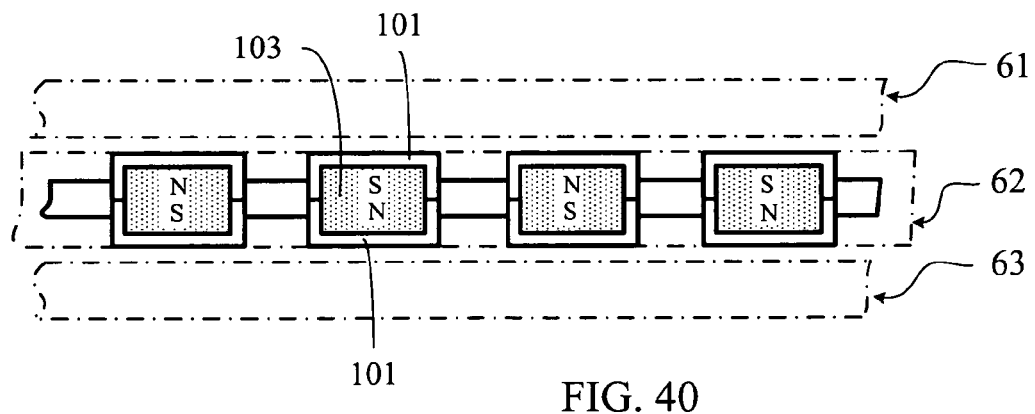
FIG. 40 is a schematic view showing a structure of the present invention applied in a 3-layer type linear electric machinery structure wherein a PM magnetic pole to execute bilateral coupling with an inner layer linear electric machinery structure and an outer layer linear electric machinery structure on both sides is wrapped by a permeable body on a mid layer linear electric machinery structure for executing EME coupling with an inner layer linear electric machinery structure and an outer layer linear electric machinery structure to constitute a magnetic pole and to form a structure of permeable pole-face on pole-faces at both ends of the PM magnetic pole.

FIG. 40 is a schematic view showing a structure of the present invention applied in a 3-layer type linear electric machinery structure wherein a PM magnetic pole to execute bilateral coupling with an inner layer linear electric machinery structure and an outer layer linear electric machinery structure on both sides is wrapped by a permeable body on a mid layer linear electric machinery structure for executing EME coupling with an inner layer linear electric machinery structure and an outer layer linear electric machinery structure to constitute a magnetic pole and to form a structure of permeable pole-faces on pole-faces at both ends of the PM magnetic pole.

As illustrated in FIG. 40 for a 3-layer type linear electric machinery structure, the mid layer linear electric machinery structure 62 for respectively executing EME coupling with the inner layer linear electric machinery structure 61 and the outer layer linear electric machinery structure 63 provided on both sides of the mid layer linear electric machinery structure 62 is arranged to wrap the PM magnetic pole 103 by a permeable body to constitute magnetic pole 101, so as to form two permeable pole-faces respectively on pole-faces at both ends of the PM magnetic pole 103; through the permeable pole-faces, the magnetic poles at both ends of the PM magnetic pole respectively execute bilateral coupling with the inner layer linear electric machinery structure 61 and the outer layer linear electric machinery structure 63 for executing EME interaction, thus to constitute a coaxial 3-layer type linear electric machinery with two permeable pole-faces each being formed on pole-faces at both ends of the PM magnetic pole.

In the electric machinery provided with the PM magnetic pole wrapped by a magnetic pole or a magnetic circuit as described in FIGS. 9 through 40, the PM magnetic pole wrapped by the magnetic pole and the magnetic circuit is disposed including to the coaxial 3-ring type electric machinery structure, the coaxial 3-layer type plate electric machinery structure, the 3-layer type linear electric machinery structure, or other electric machinery structure of mid electric machinery structure from 3-piece electric machinery structure to execute EME interaction, wherein the mid electric machinery structure for wrapping the PM magnetic pole 103 by a permeable body serves as the static portion of the electric machinery or the mobile portion of the electric machinery.

Quantity of the magnetic pole disposed on the EME coupling aspect of each electric machinery structure for all those preferred embodiments described in FIGS. 9 through 40 may be selected to be the same or different as applicable.

In practical application, operation types of two electric machinery components interacting with each other by means of EME of the electric machinery disposed with a PM magnetic pole wrapped by a magnetic pole or a magnetic circuit in case of the cylinder electric machinery (as illustrated in FIGS. 10 and 11) or the double layer type plate electric machinery (as illustrated in FIG. 21), or the double layer type linear electric machinery (as illustrated in FIG. 31) for producing function of a generator, a motor, an EME vortex coupling transmission, or EME vortex braking function include:

1. Either electric machinery structural component serves as a static portion of the electric machinery while another electric machinery structural component serves as a mobile portion of the electric machinery; or 2. Both electric machinery structural components function as the mobile portions of the electric machinery.

In practical application, the electric machinery provided with a PM magnetic pole wrapped by a magnetic pole or a magnetic circuit, e.g., the coaxial 3-ring type electric machinery (as illustrated in FIGS. 12 through 20), the coaxial 3-layer type plate electric machinery (as illustrated in FIGS. 22 through 30), or the 3-layer type linear electric machinery (as illustrated in FIGS. 32 through 40), or other electric machinery structure comprised of 3-piece electric machinery structure to execute EME interaction, or those three interacting electric machinery structural components for producing function of a generator, a motor, an EME vortex coupling transmission, or EME vortex braking function provide the following composition functions:

1. One EM structural component serves as a static portion of the electric machinery while the other two EM structural components function as two mobile portions of the electric machinery; or 2. Two EM structural components serve as two static portions of the electric machinery while the third EM structural component serves as a mobile portion of the electric machinery; or 3. All three EM structural components each serves as a mobile portion of the electric machinery.

In the electric machinery provided with a PM magnetic pole wrapped by a magnetic pole or a magnetic circuit as described in those preferred embodiments illustrated in FIGS. 2 through 33, selection and layout of electric machinery structure and windings for the electric machinery structural component of the PM magnetic pole wrapped between a magnetic pole and a magnetic circuit and other electric machinery structural components executing EME coupling interaction are determined according to the property of the assembly of the entire electric machinery, nature of the power inputted, control function, control mode, and output performance requirements; according to the selection of its EME interaction property, the electric machinery provided with a PM magnetic pole wrapped by a magnetic pole or a magnetic circuit to constitute the assembly of the electric machinery includes those for operating in DC or AC revolution or linear electric machinery are comprised of commutator brush, brushless, ring-brush, synchronous, asynchronous, internal revolving, external revolving, mid electric machinery structure revolving, double-acting, multi-layer, multi-ring, linear, DC brushless, or inverter electric machinery, or an electric machinery functioning as a generator or as a motor or as both a generator and a motor, coupling transmission device, as an EME vortex coupling transmission device, or an EME vortex braking device.

For example, ways of having the PM magnetic pole 103 wrapped by the individual magnetic pole and the magnetic circuit 102 in the electric machinery provided with a PM magnetic pole wrapped by a magnetic pole or a magnetic circuit include having a mechanical locking member to clamp or secure, a screw and a nut structure to lock up, a rivet to secure, a pin and a pinhole structure to fix, or a packing means in proper size and selected geometric form to insert, a magnetic circuit structure to clamp, a casing to clamp, a dedicated structural member to clamp, an adhesion to bind, fuse, or weld the PM magnetic pole 103, or having any other means of the prior art to secure the PM magnetic pole 103.

Figure 41:
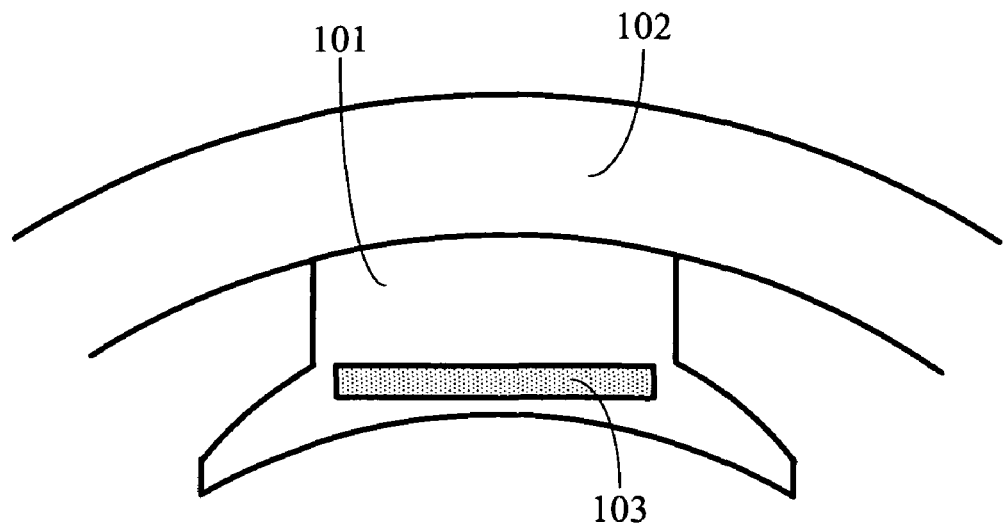
FIG. 41 is a schematic view showing an embodiment of the present invention applied in the outer layer electric machinery structure of a cylinder electric machinery structure, wherein a transverse rabbet is disposed at where near the pole-face on the magnetic pole for installing the PM magnetic pole.

The method for the electric machinery provided with a PM magnetic pole wrapped by a magnetic pole or a magnetic circuit to wrap the PM magnetic pole 103 is to provide with at least one or more than one side of the magnetic circuit made of permeable material collocated at one or more than one side of two magnetic poles of different polarity from the PM magnetic pole 103 or wrapped overall between two magnetic poles of different polarity of the PM magnetic pole 103 disposed on the magnetic pole 101, after the combination of the magnetic pole 101 and the magnetic circuit 102 for passing through partial magnetic line of force while the PM magnetic pole 103 remains having partial strength of the magnetic field of the original PM magnetic pole 103 on the pole-face of the magnetic pole 101; the purpose to collocate or wrap the magnetic circuit made of permeable material between the magnetic poles of different polarity on the PM magnetic pole 103 for passing through partial magnetic line of force is that when the PM magnetic pole 103 being inversely excited in the course of the operation, two magnetic poles of different polarity on the PM magnetic pole 103 keeps closed magnetic circuit to maintain its magnetic line of force so as to enhance the ability to against inverse excitation;

Various embodiments of the electric machinery provided with a PM magnetic pole wrapped by a magnetic pole or a magnetic circuit of the present invention are illustrated as follows:

FIG. 41 is a schematic view showing an embodiment of the present invention applied in the outer layer electric machinery structure of a cylinder electric machinery structure, wherein a transverse rabbet is disposed at where near the pole-face on the magnetic pole for installing the PM magnetic pole;

As illustrated in FIG. 41 is the present invention to be applied in the outer layer electric machinery structure of the cylinder electric machinery structure, wherein the magnetic pole 101 at where near the EME coupling aspect is disposed with a transverse rabbet, which indicates a linear or arcuate or any required geometric shape, or is in a form of parallel along the EME coupling aspect, for installing the PM magnetic pole 103 with corresponding shape.

Figure 42:
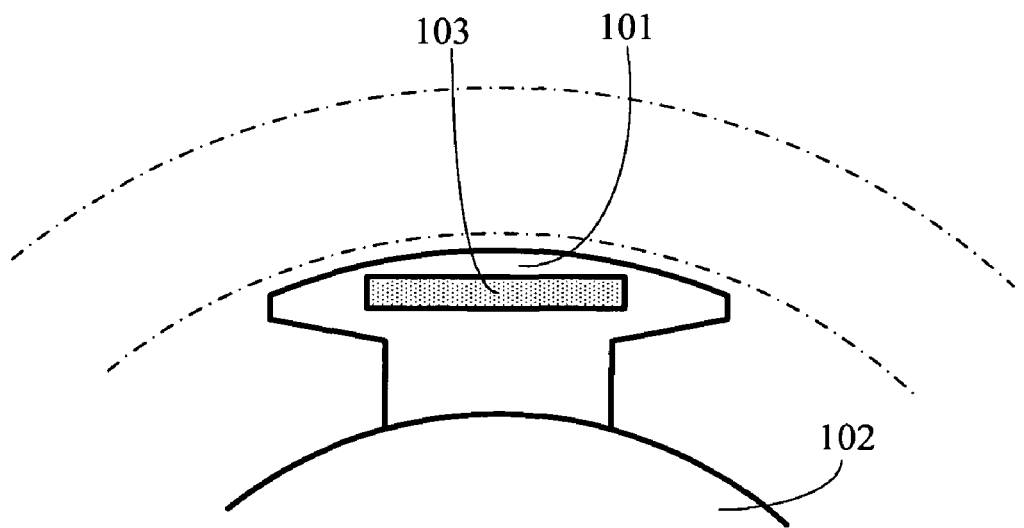
FIG. 42 is a schematic view showing an embodiment of the present invention applied in the inner layer electric machinery structure of a cylinder electric machinery structure, wherein a transverse rabbet is disposed at where near the pole-face on the magnetic pole for installing the PM magnetic pole.

FIG. 42 is a schematic view showing an embodiment of the present invention applied in the inner layer electric machinery structure of a cylinder electric machinery structure, wherein a transverse rabbet is disposed at where near the pole-face on the magnetic pole for installing the PM magnetic pole.

As illustrated in FIG. 42 is the present invention to be applied in the inner layer electric machinery structure of the cylinder electric machinery structure, wherein the magnetic pole 101 at where near the EME coupling aspect is disposed with a transverse rabbet, which indicates a linear or arcuate or any required geometric shape, or is in a form of parallel along the EME coupling aspect, for installing the PM magnetic pole 103 with corresponding shape.

The embodied examples as shown in FIG. 41 and FIG. 42, whereof the magnetic pole 101 provided with a transverse rabbet for installing the PM magnetic pole 103 may be selected to add a protective cap made of either permeable material or non-permeable material on one or both sides of the magnetic pole 101 as needed; ways to dispose the protective cap include:

(1) the protective cap is not provided; or
(2) the protective cap is added on one or both sides of the PM magnetic pole 103, whereof the length of the protective cap is the same as the combined length of the magnetic pole 101 and the PM magnetic pole 103; or
(3) the protective cap is added on one or both sides of the magnetic pole 101 constituted by blocks or permeable laminated sheets for clamping the magnetic pole 101 constituted by permeable laminated sheets, whereof the protective cap extends at the direction facing the magnetic circuit 102 to connect with the magnetic circuit 102; or
(4) a PM magnetic pole 103 which is thinner than the thickness of the magnetic pole 101 is disposed into the transverse rabbet, whereof a protective cap is stuffed into or a filler is added into one or both ends of the transverse rabbet.

Figures 43, 44:
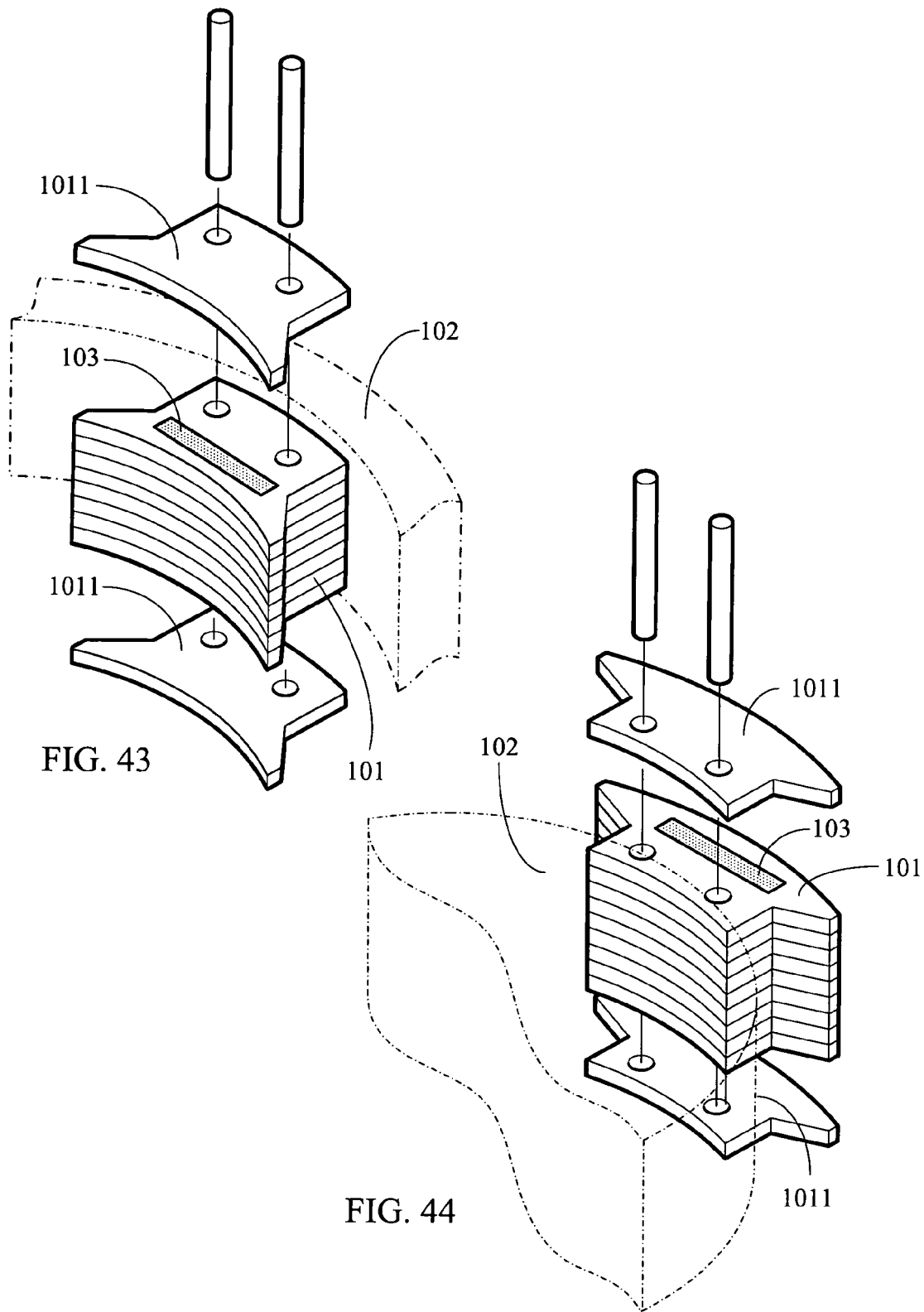
FIG. 43 is a schematic view showing an embodiment of the present invention applied in the outer layer electric machinery structure of a cylinder electric machinery structure, wherein a transverse rabbet is disposed at where near the pole-face on the magnetic pole of a block shape or constituted by conductive laminating sheets for installing the PM magnetic pole, and a protective cap with the same length as the magnetic pole is disposed to one or both sides of the magnetic pole for clamping the magnetic pole and wrapping the PM magnetic pole.
FIG. 44 is a schematic view showing an embodiment of the present invention applied in the inner layer electric machinery structure of a cylinder electric machinery structure, wherein a transverse rabbet is disposed at where near the pole-face on the magnetic pole of a block shape or constituted by permeable laminated sheets for installing the PM magnetic pole, and a protective cap with the same length as the magnetic pole is disposed to one or both sides of the magnetic pole for clamping the magnetic pole and wrapping the PM magnetic pole.

FIG. 43 is a schematic view showing an embodiment of the present invention applied in the outer layer electric machinery structure of a cylinder electric machinery structure, wherein a transverse rabbet is disposed at where near the pole-face on the magnetic pole constituted by permeable laminated sheets for installing the PM magnetic pole, and a protective cap with the same length as the magnetic pole is disposed to one or both sides of the magnetic pole for clamping the magnetic pole and wrapping the PM magnetic pole.

As illustrated in FIG. 43 is the present invention to be applied in the outer layer electric machinery structure of the cylinder electric machinery structure, wherein the magnetic pole 101 constituted by permeable laminated sheets at where near the EME coupling aspect is disposed with a transverse rabbet, which indicates a linear or arcuate or any required geometric shape, or is in a form of parallel along the EME coupling aspect, for installing the PM magnetic pole 103 with corresponding shape, and an optional protective cap 1011 with the same length as the magnetic pole, made of either permeable material or non-permeable material, is further disposed to one or both sides of the magnetic pole 101 as needed for clamping the magnetic pole 101 constituted by permeable laminated sheets and wrapping the PM magnetic pole 103.

FIG. 44 is a schematic view showing an embodiment of the present invention applied in the inner layer electric machinery structure of a cylinder electric machinery structure, wherein a transverse rabbet is disposed at where near the pole-face on the magnetic pole constituted by permeable laminated sheets for installing the PM magnetic pole, and a protective cap with the same length as the magnetic pole is disposed to one or both sides of the magnetic pole for clamping the magnetic pole and wrapping the PM magnetic pole.

As illustrated in FIG. 44 is the present invention to be applied in the inner layer electric machinery structure of the cylinder electric machinery structure, wherein the magnetic pole 101 constituted by permeable laminated sheets at where near the EME coupling aspect is disposed with a transverse rabbet, which indicates a linear or arcuate or any required geometric shape, or is in a form of parallel along the EME coupling aspect, for installing the PM magnetic pole 103 with corresponding shape, and an optional protective cap 1011 with the same length as the magnetic pole, made of either permeable material or non-permeable material, is further disposed to one or both sides of the magnetic pole 101 as needed for clamping the magnetic pole 101 constituted by permeable laminated sheets and wrapping the PM magnetic pole 103.

Figure 45:
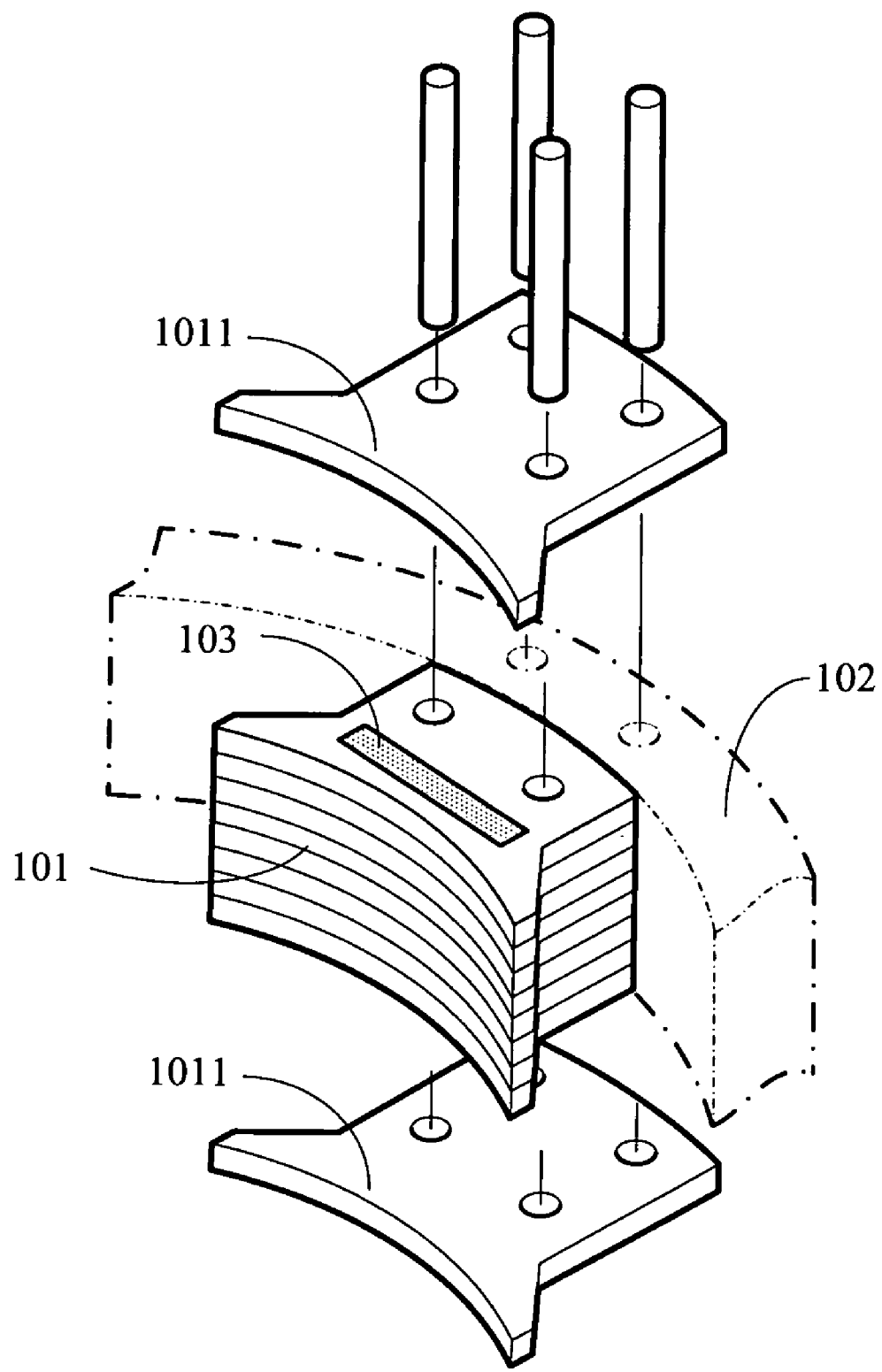
FIG. 45 is a schematic view showing an embodiment of FIG. 43 applied in the outer layer electric machinery structure of a cylinder electric machinery structure, wherein a protective cap is provided to one or both sides of the magnetic pole for clamping the magnetic pole constituted by the permeable laminated sheets and wrapping the PM magnetic pole whereof the protective cap extends at the direction facing the magnetic circuit to connect with the magnetic circuit.

FIG. 45 is a schematic view showing an embodiment of FIG. 43 applied in the outer layer electric machinery structure of a cylinder electric machinery structure, wherein a protective cap is provided to one or both sides of the magnetic pole for clamping the magnetic pole constituted by the permeable laminated sheets and wrapping the PM magnetic pole whereof the protective cap extends at the direction facing the magnetic circuit to connect with the magnetic circuit.

As illustrated in FIG. 45 is FIG. 43 to be applied in the outer layer electric machinery structure of the cylinder electric machinery structure, wherein the magnetic pole 101 constituted by the permeable laminated sheets at where near the edge of the EME coupling aspect is disposed with a transverse rabbet, which indicates a linear or arcuate or any required geometric shape, or is in a form of parallel along the EME coupling aspect, for installing the PM magnetic pole 103 with corresponding shape; an optional protective cap 1011, made of either permeable material or non-permeable material, extending at the direction facing the magnetic circuit 102 to connect with the magnetic circuit 102, is further provided to one or both sides of the magnetic pole 101 as needed for clamping the magnetic pole 101 constituted by permeable laminated sheets and wrapping the PM magnetic pole 103.

Figure 46:
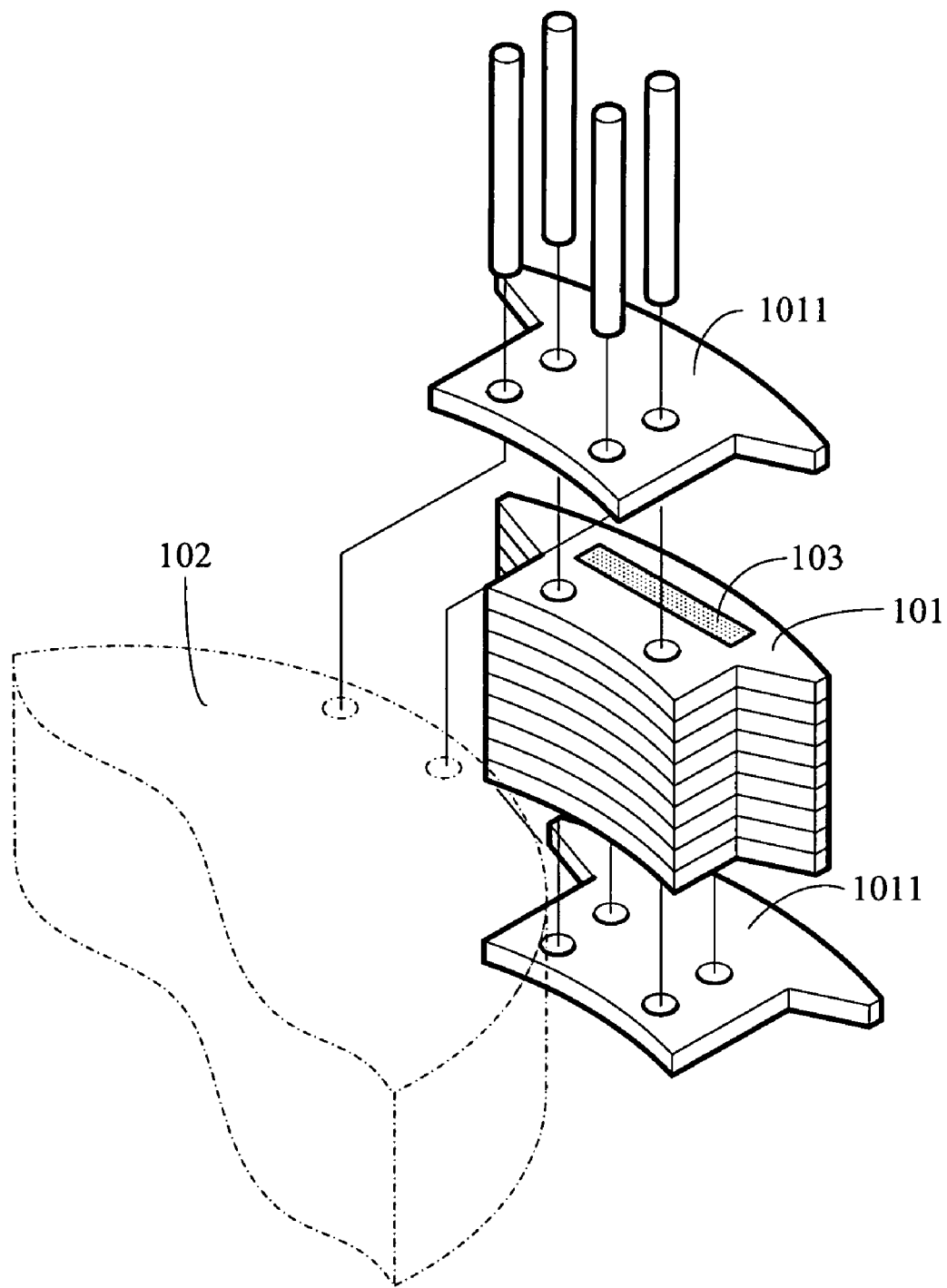
FIG. 46 is a schematic view showing an embodiment of FIG. 44 applied in the inner layer electric machinery structure of a cylinder electric machinery structure, wherein a protective cap is provided to one or both sides of the magnetic pole for clamping the magnetic pole constituted by the permeable laminated sheets and wrapping the PM magnetic pole whereof the protective cap extends at the direction facing the magnetic circuit to connect with the magnetic circuit.

FIG. 46 is a schematic view showing an embodiment of FIG. 44 applied in the inner layer electric machinery structure of a cylinder electric machinery structure, wherein a protective cap is provided to one or both sides of the magnetic pole for clamping the magnetic pole constituted by the permeable laminated sheets and wrapping the PM magnetic pole whereof the protective cap extends at the direction facing the magnetic circuit to connect with the magnetic circuit.

As illustrated in FIG. 46 is FIG. 44 to be applied in the inner layer electric machinery structure of the cylinder electric machinery structure, wherein the magnetic pole 101 constituted by the permeable laminated sheets at where near the edge of the magnetic circuit 102 is disposed with a transverse rabbet, which indicates a linear or arcuate or any required geometric shape, or is in a form of parallel along the EME coupling aspect, for installing the PM magnetic pole 103 with corresponding shape; an optional protective cap 1011, made of either permeable material or non-permeable material, extending at the direction facing the magnetic circuit 102 to connect with the magnetic circuit 102, is further provided to one or both sides of the magnetic pole 101 as needed for clamping the magnetic pole 101 constituted by permeable laminated sheets and wrapping the PM magnetic pole 103.

Figure 47:
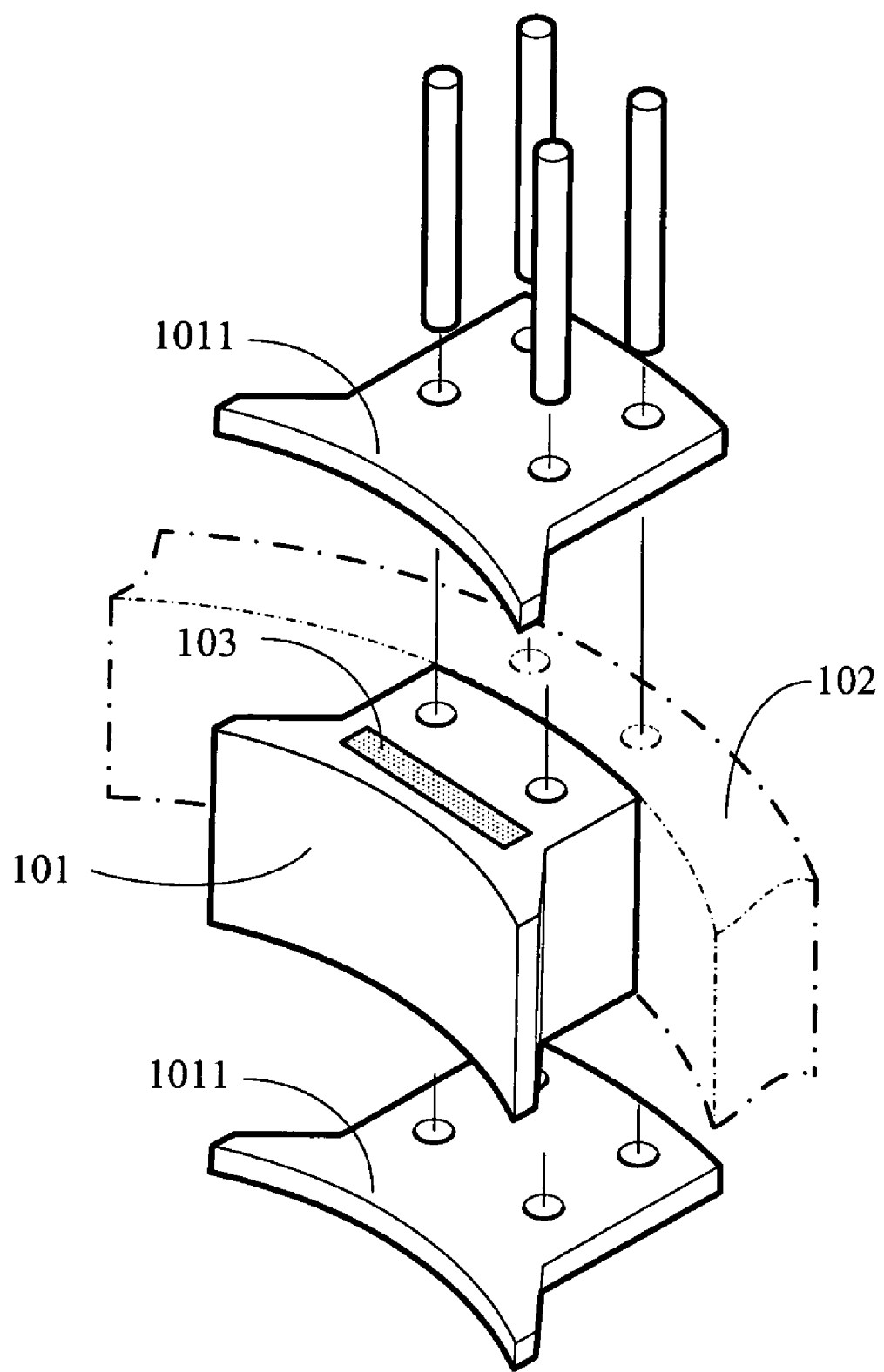
FIG. 47 is a schematic view showing an embodiment of FIG. 43 applied in the outer layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

FIG. 47 is a schematic view showing an embodiment of FIG. 43 applied in the outer layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

As illustrated in FIG. 47 is FIG. 43 to be applied in the outer layer electric machinery structure of the cylinder electric machinery structure, wherein the magnetic pole 101 of a block structure at where near the edge of the EME coupling aspect is disposed with a transverse rabbet, which indicates a linear or arcuate or any required geometric shape, or is in a form of parallel along the EME coupling aspect, for installing the PM magnetic pole 103 with corresponding shape, and an optional protective cap 1011, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and wrapping the PM magnetic pole 103.

Figure 48:
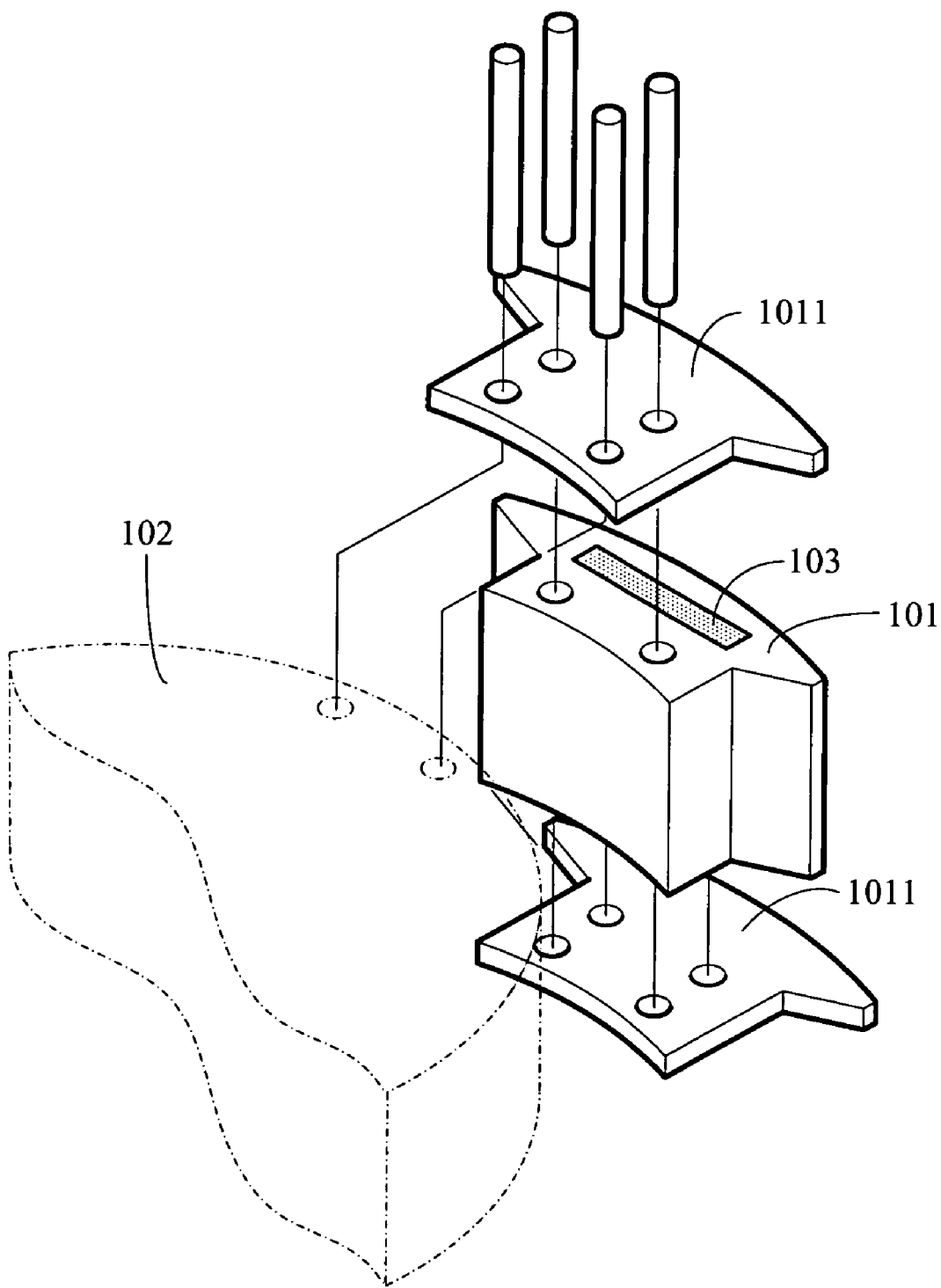
FIG. 48 is a schematic view showing an embodiment of FIG. 44 applied in the inner layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

FIG. 48 is a schematic view showing an embodiment of FIG. 44 applied in the inner layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

As illustrated in FIG. 48 is FIG. 44 to be applied in the inner layer electric machinery structure of the cylinder electric machinery structure, wherein the magnetic pole 101 of a block structure at where near the edge of the EME coupling aspect is disposed with a transverse rabbet, which indicates a linear or arcuate or any required geometric shape, or is in a form of parallel along the EME coupling aspect, for installing the PM magnetic pole 103 with corresponding shape, and an optional protective cap 1011, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and wrapping the PM magnetic pole 103.

Figure 49:
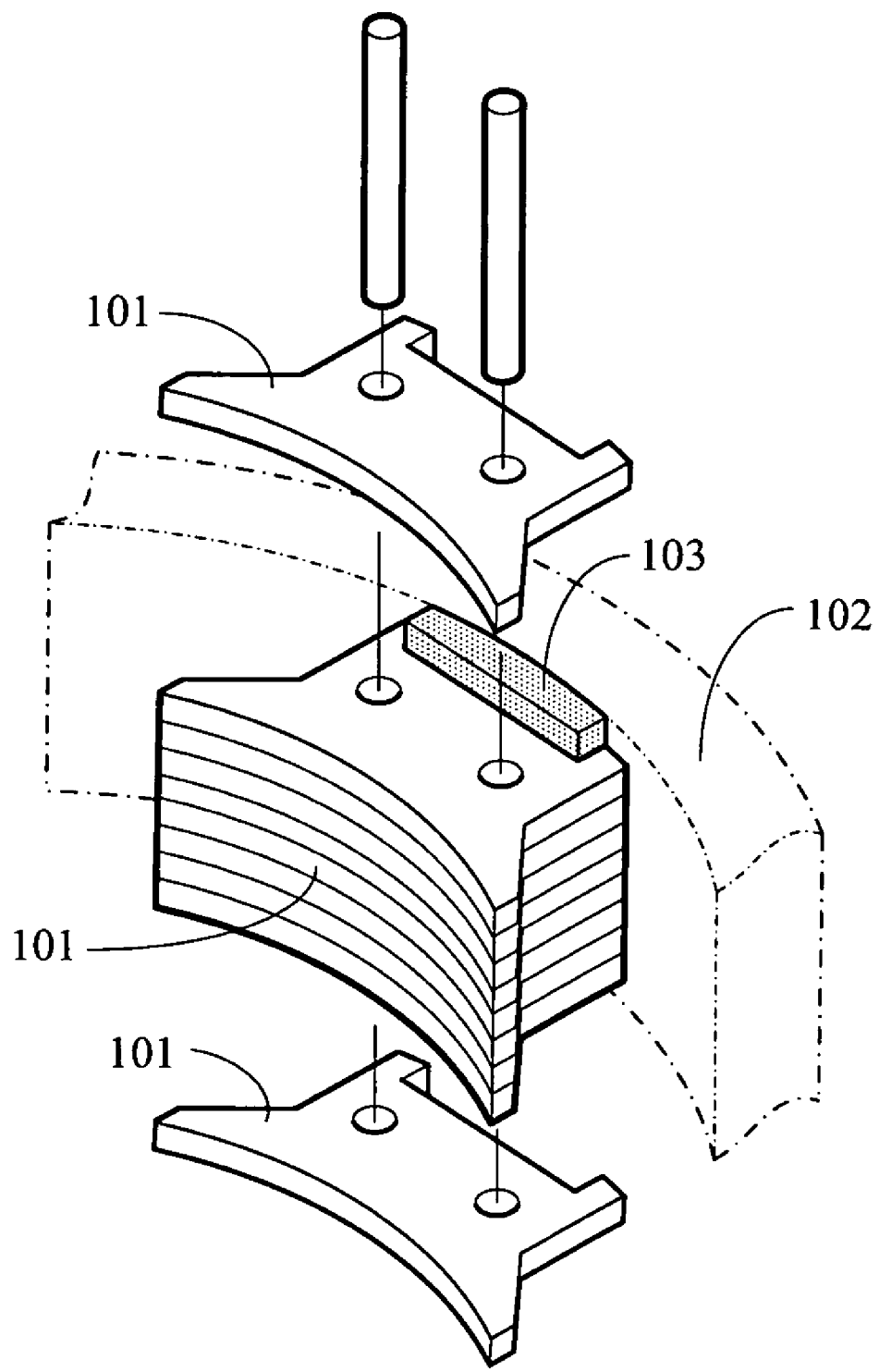
FIG. 49 is a schematic view showing an embodiment of the present invention applied in the outer layer electric machinery structure of a cylinder electric machinery structure, wherein an axial notch is disposed at where near the edge of the magnetic circuit on the magnetic pole constituted by permeable laminated sheets for installing the PM magnetic pole.

FIG. 49 is a schematic view showing an embodiment of the present invention applied in the outer layer electric machinery structure of a cylinder electric machinery structure, wherein an axial notch is disposed at where near the edge of the magnetic circuit on the magnetic pole constituted by permeable laminated sheets for installing the PM magnetic pole.

As illustrated in FIG. 49 is the present invention to be applied in the outer layer electric machinery structure of the cylinder electric machinery structure, wherein the magnetic pole 101 constituted by permeable laminated sheets at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape.

Figure 50:
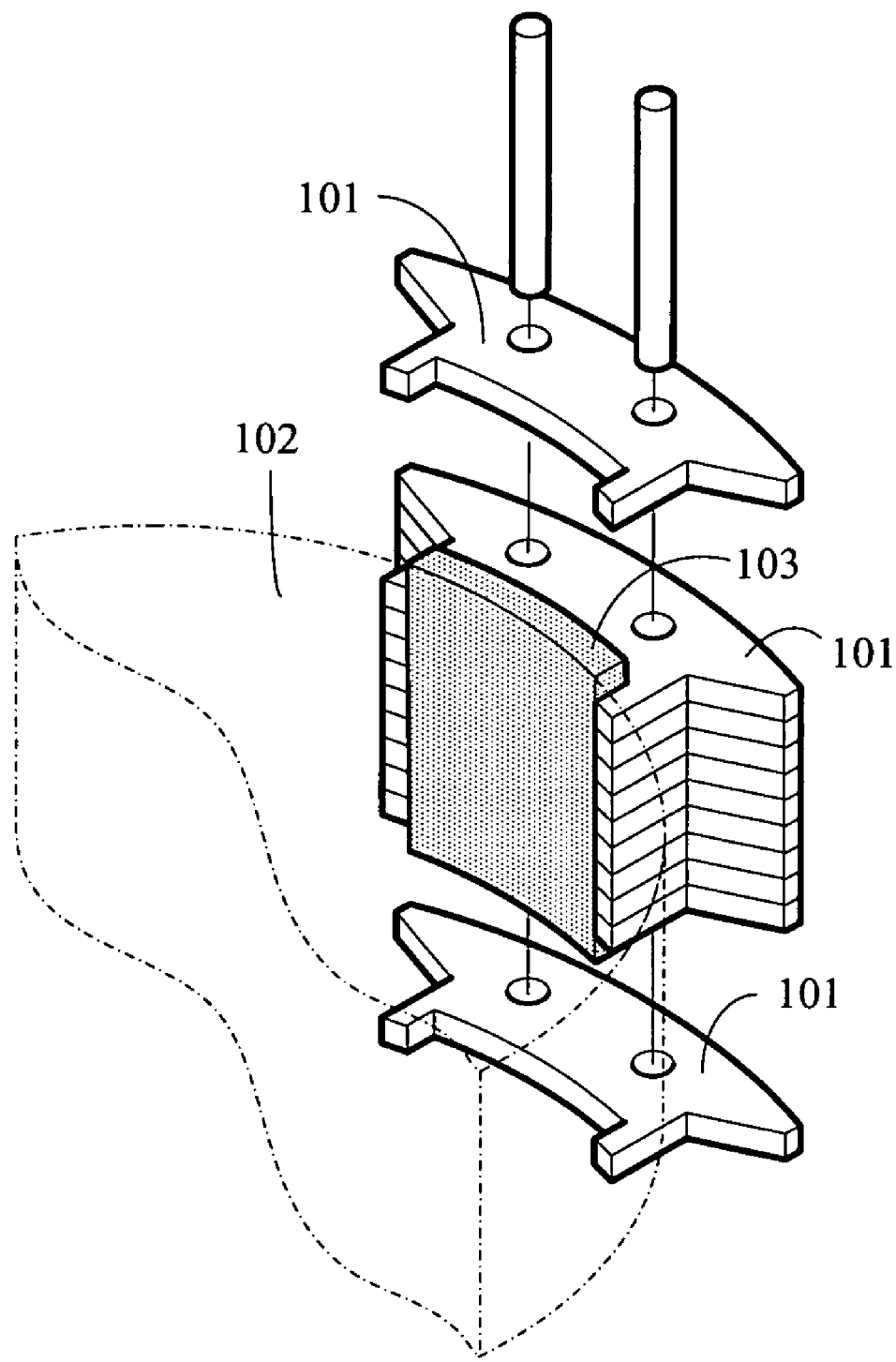
FIG. 50 is a schematic view showing an embodiment of the present invention applied in the inner layer electric machinery structure of a cylinder electric machinery structure, wherein an axial notch is disposed at where near the edge of the magnetic circuit on the magnetic pole constituted by permeable laminated sheets for installing the PM magnetic pole.

FIG. 50 is a schematic view showing an embodiment of the present invention applied in the inner layer electric machinery structure of a cylinder electric machinery structure, wherein an axial notch is disposed at where near the edge of the magnetic circuit on the magnetic pole constituted by permeable laminated sheets for installing the PM magnetic pole.

As illustrated in FIG. 50 is the present invention to be applied in the inner layer electric machinery structure of the cylinder electric machinery structure, wherein the magnetic pole 101 constituted by permeable laminated sheets at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape.

Figure 51:
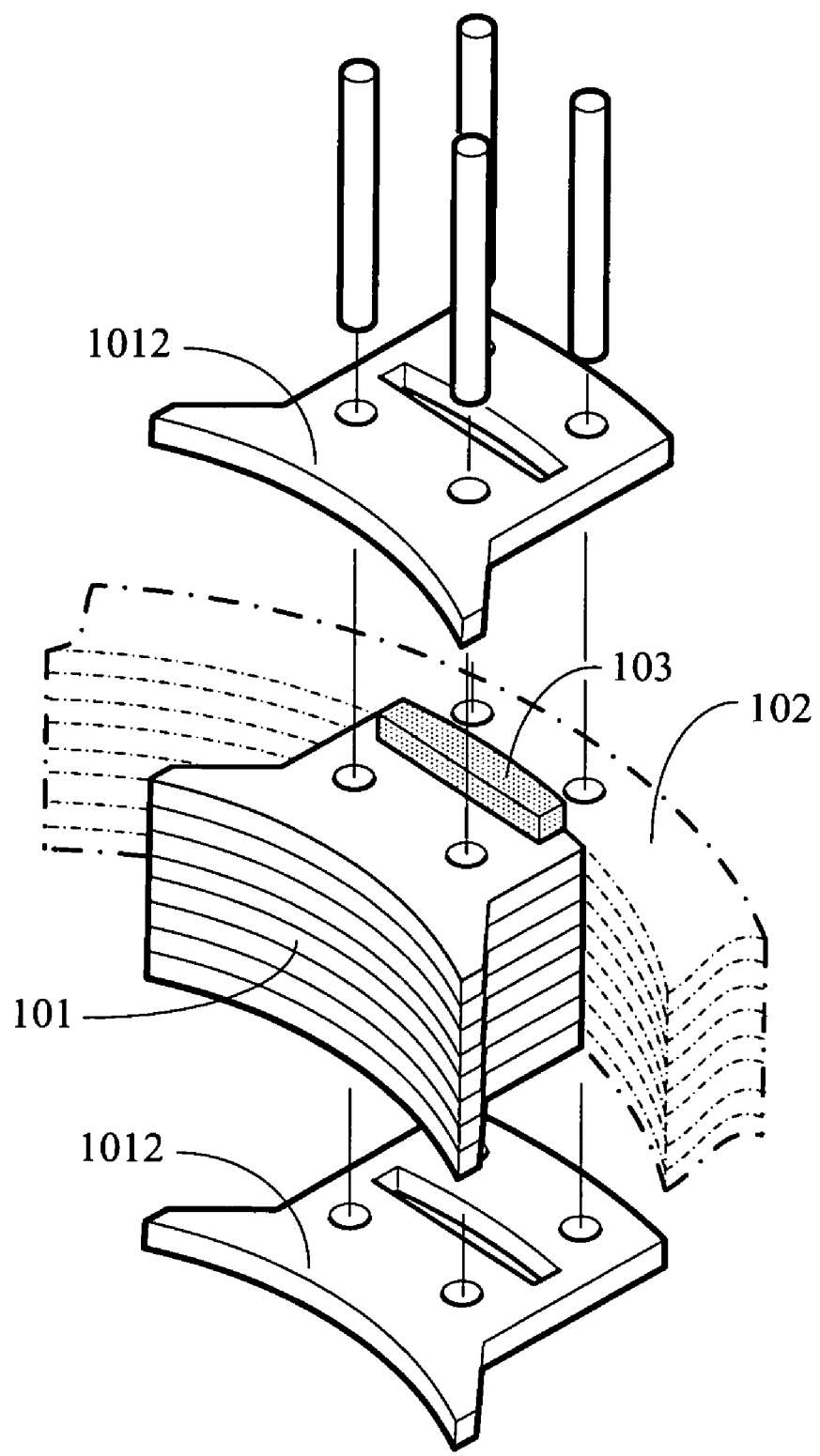
FIG. 51 is a schematic view showing an embodiment of FIG. 49 applied in the outer layer electric machinery structure of a cylinder electric machinery structure, wherein an axial notch is disposed at where near the edge of the magnetic circuit on the magnetic pole constituted by permeable laminated sheets for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

FIG. 51 is a schematic view showing an embodiment of FIG. 49 applied in the outer layer electric machinery structure of a cylinder electric machinery structure, wherein an axial notch is disposed at where near the edge of the magnetic circuit on the magnetic pole constituted by permeable laminated sheets for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

As illustrated in FIG. 51 is FIG. 49 to be applied in the outer layer electric machinery structure of the cylinder electric machinery structure, wherein the magnetic pole 101 constituted by the permeable laminated sheets at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the magnetic pole 101 as needed for clamping the magnetic pole 101 constituted by permeable laminated sheets.

Figure 52:
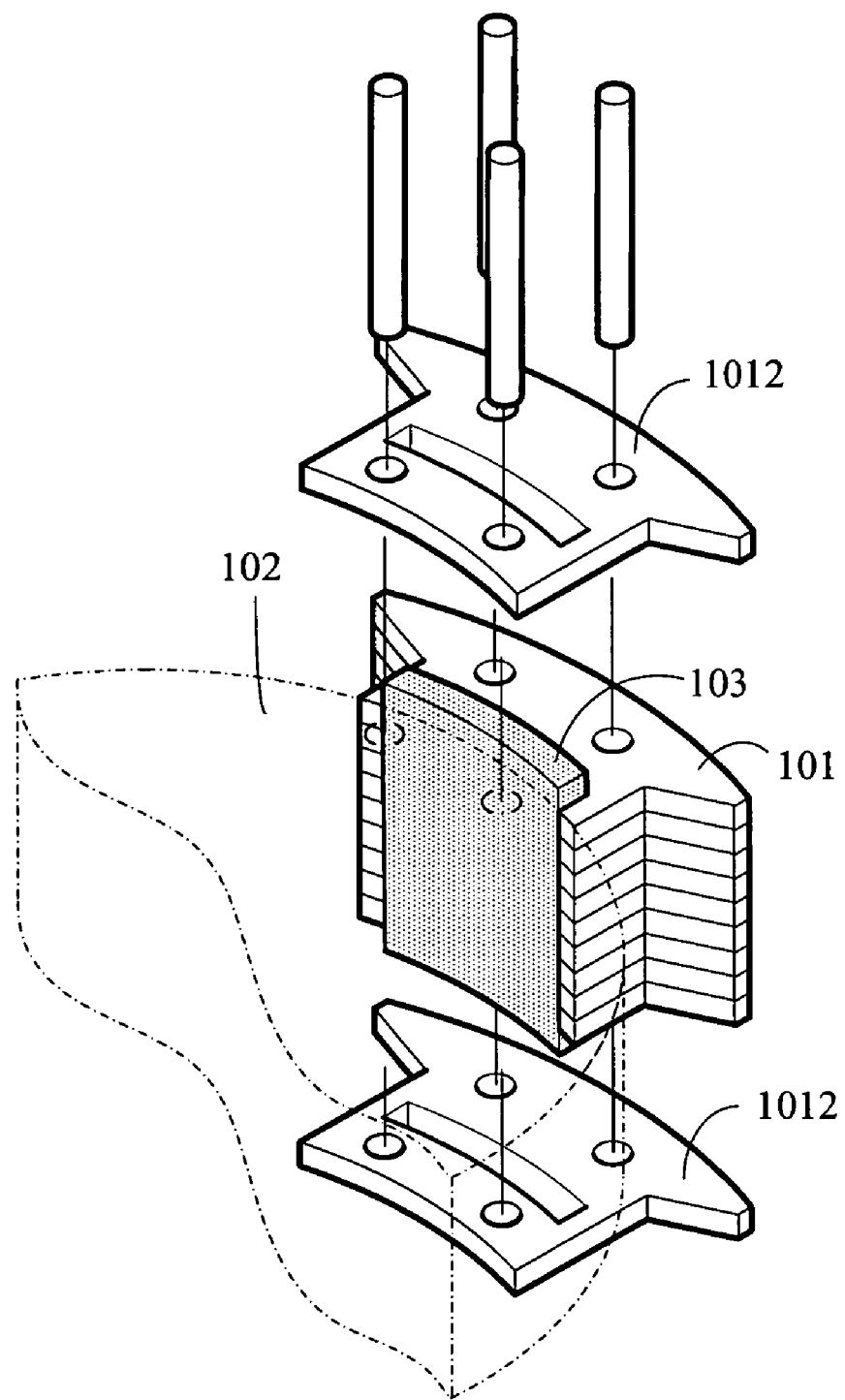
FIG. 52 is a schematic view showing an embodiment of FIG. 50 applied in the inner layer electric machinery structure of a cylinder electric machinery structure, wherein an axial notch is disposed at where near the edge of the magnetic circuit on the magnetic pole constituted by permeable laminated sheets for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

FIG. 52 is a schematic view showing an embodiment of FIG. 50 applied in the inner layer electric machinery structure of a cylinder electric machinery structure, wherein an axial notch is disposed at where near the edge of the magnetic circuit on the magnetic pole constituted by permeable laminated sheets for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

As illustrated in FIG. 52 is FIG. 50 to be applied in the inner layer electric machinery structure of the cylinder electric machinery structure, wherein the magnetic pole 101 constituted by the permeable laminated sheets at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the magnetic pole 101 as needed for clamping the magnetic pole 101 constituted by permeable laminated sheets.

Figure 53:
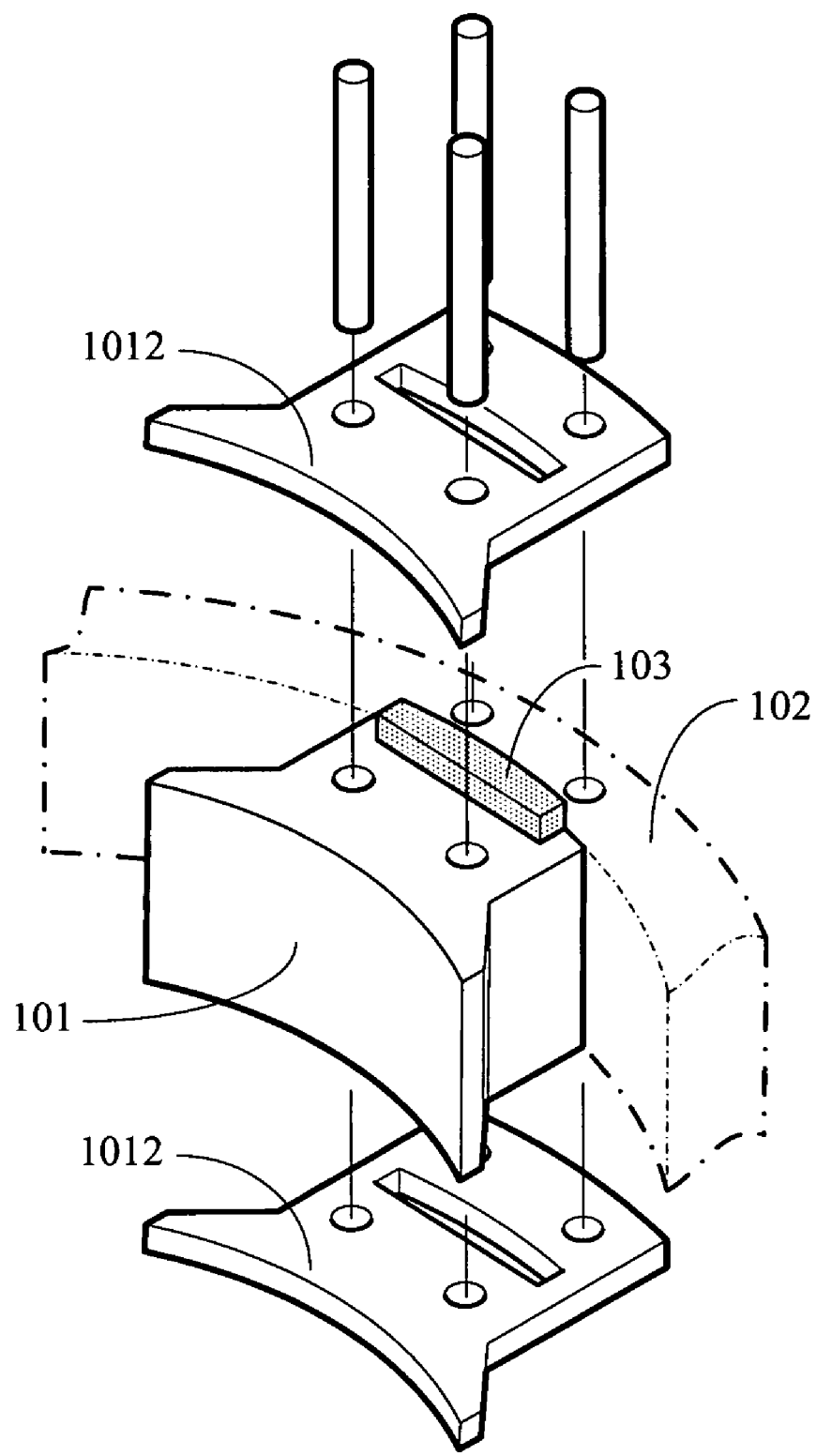
FIG. 53 is a schematic view showing an embodiment of FIG. 49 applied in the outer layer electric machinery structure of a cylinder electric machinery structure, wherein an axial notch is disposed at where near the edge of the magnetic circuit on the magnetic pole constituted by blocks for installing the PM magnetic pole, and a protective cap, extending at the direction facing the magnetic circuit to connect with the magnetic circuit, is provided to one or both sides of the block-shaped magnetic pole for clamping the block-shaped magnetic pole.

FIG. 53 is a schematic view showing an embodiment of FIG. 49 applied in the outer layer electric machinery structure of a cylinder electric machinery structure, wherein an axial notch is disposed at where near the edge of the magnetic circuit on the magnetic pole constituted by blocks for installing the PM magnetic pole, and a protective cap, extending at the direction facing the magnetic circuit to connect with the magnetic circuit, is provided to one or both sides of the block-shaped magnetic pole for clamping the block-shaped magnetic pole.

As illustrated in FIG. 53 is FIG. 49 to be applied in the outer layer electric machinery structure of the cylinder electric machinery structure, wherein the magnetic pole 101 constituted by blocks at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the block-shaped magnetic pole 101 as needed for clamping the block-shaped magnetic pole 101.

Figure 54:
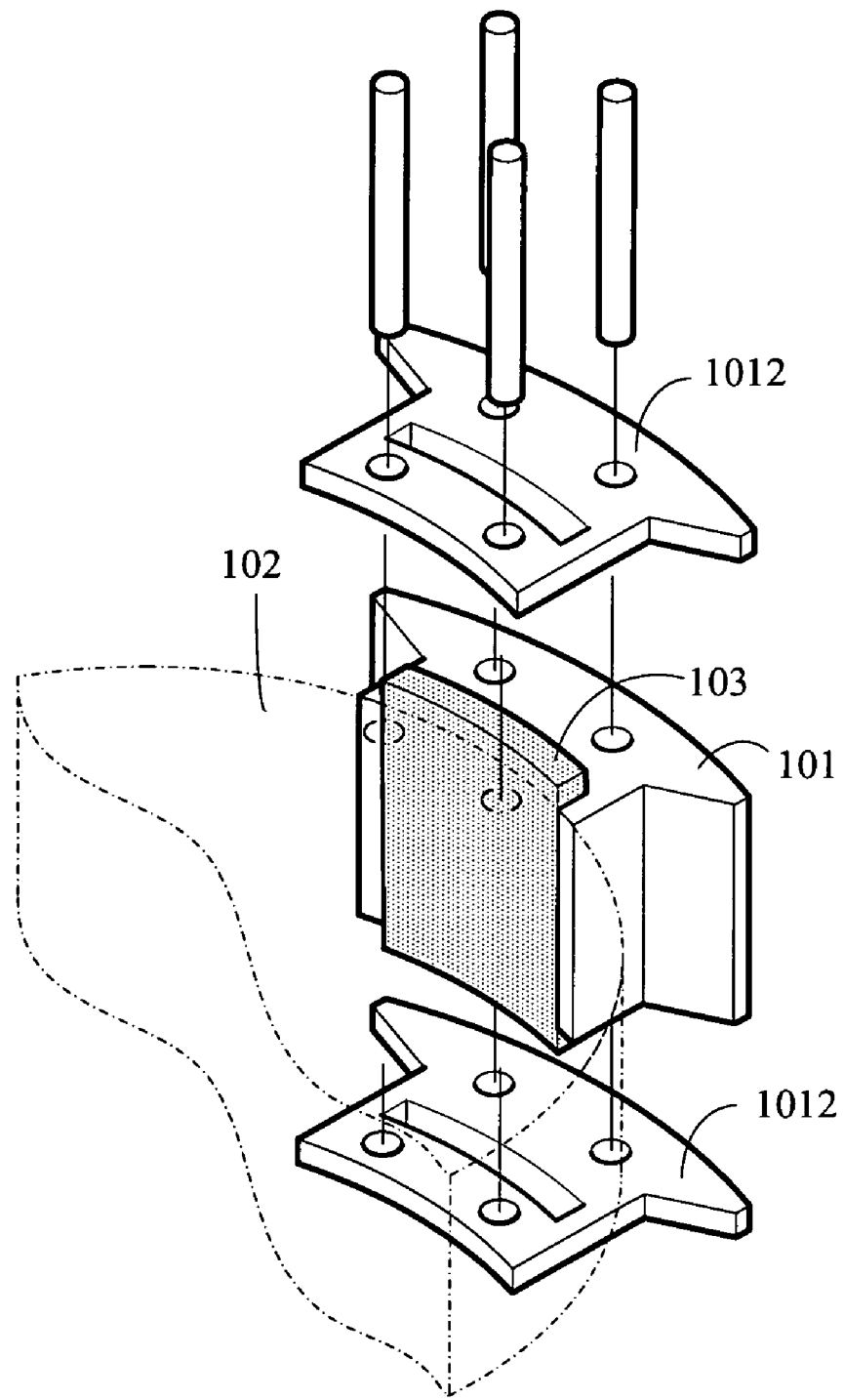
FIG. 54 is a schematic view showing an embodiment of FIG. 50 applied in the inner layer electric machinery structure of a cylinder electric machinery structure, wherein an axial notch is disposed at where near the edge of the magnetic circuit on the magnetic pole constituted by blocks for installing the PM magnetic pole, and a protective cap, extending at the direction facing the magnetic circuit to connect with the magnetic circuit, is provided to one or both sides of the block-shaped magnetic pole for clamping the block-shaped magnetic pole.

FIG. 54 is a schematic view showing an embodiment of FIG. 50 applied in the inner layer electric machinery structure of a cylinder electric machinery structure, wherein an axial notch is disposed at where near the edge of the magnetic circuit on the magnetic pole constituted by blocks for installing the PM magnetic pole, and a protective cap, extending at the direction facing the magnetic circuit to connect with the magnetic circuit, is provided to one or both sides of the block-shaped magnetic pole for clamping the block-shaped magnetic pole.

As illustrated in FIG. 54 is FIG. 50 to be applied in the inner layer electric machinery structure of the cylinder electric machinery structure, wherein the magnetic pole 101 constituted by blocks at where near the edge of the magnetic circuit 102 is disposed with an axial notch structure, whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the block-shaped magnetic pole 101 for clamping the block-shaped magnetic pole 101 as applicable.

Figure 55:
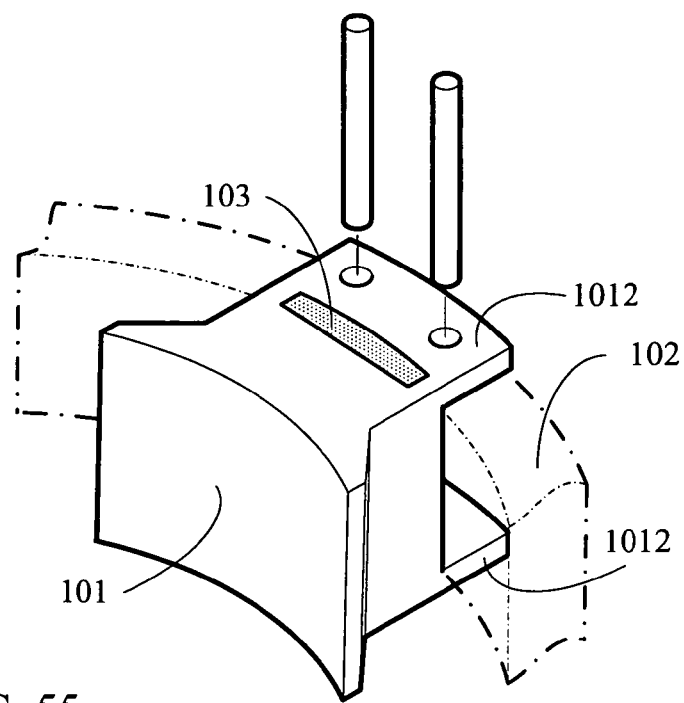
FIG. 55 is a schematic view showing an embodiment of FIG. 49 applied in the outer layer electric machinery structure of a cylinder electric machinery structure, wherein an axial notch is disposed to the magnetic pole constituted by a block integrally at where near the edge of the magnetic circuit for installing the PM magnetic pole whereof one or both sides of the integrally block-shaped magnetic pole extends at the direction facing the magnetic circuit for serving as a permeable protective cap.

FIG. 55 is a schematic view showing an embodiment of FIG. 49 applied in the outer layer electric machinery structure of a cylinder electric machinery structure, wherein an axial notch is disposed to the magnetic pole constituted by a block integrally at where near the edge of the magnetic circuit for installing the PM magnetic pole whereof one or both sides of the integrally block-shaped magnetic pole extends at the direction facing the magnetic circuit for serving as a permeable protective cap.

As illustrated in FIG. 55 is FIG. 49 to be applied in the outer layer electric machinery structure of the cylinder electric machinery structure, wherein the magnetic pole 101 constituted by a block integrally at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; one or both sides of the integrally block-shaped magnetic pole 101 extends at the direction facing the magnetic circuit 102 to connect with the magnetic circuit 102 thereby to form an protective cap 1012 on one or both sides of the PM magnetic pole 103.

Figure 56:
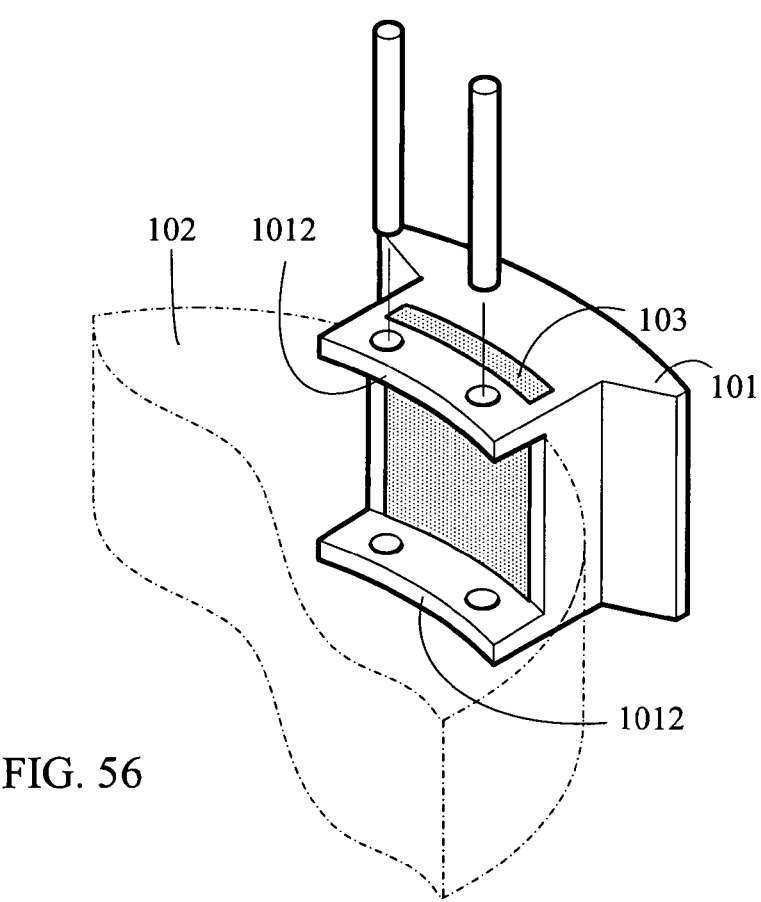
FIG. 56 is a schematic view showing an embodiment of FIG. 50 applied in the inner layer electric machinery structure of a cylinder electric machinery structure, wherein an axial notch is disposed to the magnetic pole constituted by a block integrally at where near the edge of the magnetic circuit for installing the PM magnetic pole whereof one or both sides of the integrally block-shaped magnetic pole extends at the direction facing the magnetic circuit for serving as a permeable protective cap.

FIG. 56 is a schematic view showing an embodiment of FIG. 50 applied in the inner layer electric machinery structure of a cylinder electric machinery structure, wherein an axial notch is disposed to the magnetic pole constituted by a block integrally at where near the edge of the magnetic circuit for installing the PM magnetic pole whereof one or both sides of the integrally block-shaped magnetic pole extends at the direction facing the magnetic circuit for serving as a permeable protective cap.

As illustrated in FIG. 56 is FIG. 50 to be applied in the inner layer electric machinery structure of the cylinder electric machinery structure, wherein the magnetic pole 101 constituted by a block integrally at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; one or both sides of the integrally block-shaped magnetic pole 101 extends at the direction facing the magnetic circuit 102 to connect with the magnetic circuit 102 thereby to form an protective cap 1012 on one or both sides of the PM magnetic pole 103.

Figure 57:
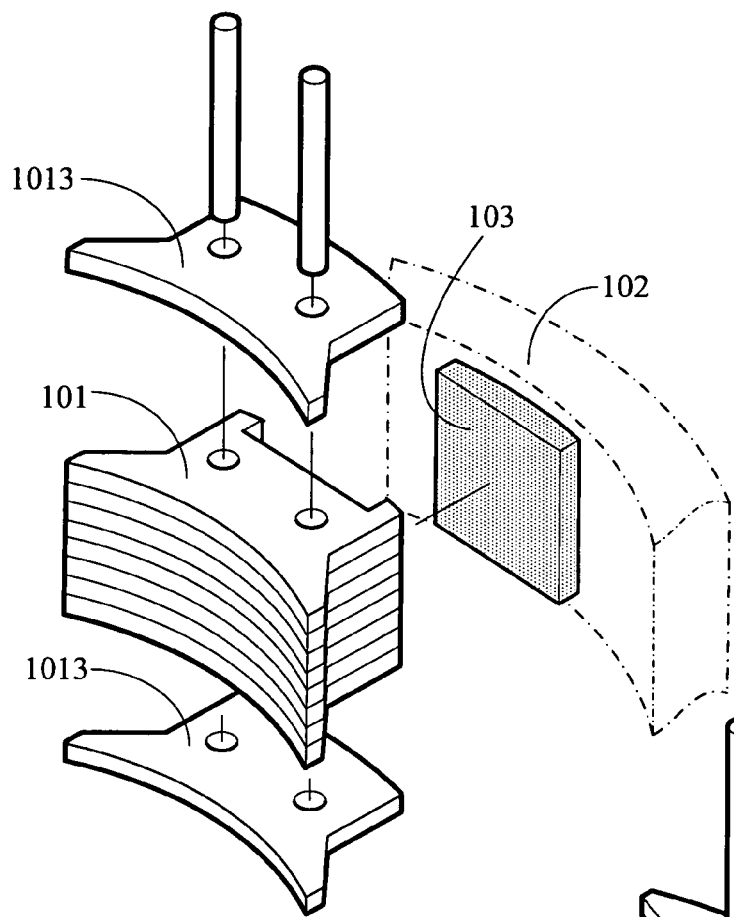
FIG. 57 is a schematic view showing an embodiment of the present invention applied in the outer layer electric machinery structure of a cylinder electric machinery structure, wherein an axial notch is disposed to the magnetic pole constituted by permeable laminated sheets at where near the edge of the magnetic circuit for installing the PM magnetic pole whereof a protective cap is disposed to one or both sides of the magnetic pole for clamping the magnetic pole and sandwiching the PM magnetic pole.

FIG. 57 is a schematic view showing an embodiment of the present invention applied in the outer layer electric machinery structure of a cylinder electric machinery structure, wherein an axial notch is disposed to the magnetic pole constituted by permeable laminated sheets at where near the edge of the magnetic circuit for installing the PM magnetic pole whereof a protective cap is disposed to one or both sides of the magnetic pole for clamping the magnetic pole and sandwiching the PM magnetic pole.

As illustrated in FIG. 57 is the present invention to be applied in the outer layer electric machinery structure of the cylinder electric machinery structure, wherein the magnetic pole 101 constituted by permeable laminated sheets at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1013, made of either permeable material or non-permeable material, is further disposed to one or both sides of the magnetic pole 101 as needed for clamping the magnetic pole 101 constituted by permeable laminated sheets and sandwiching the PM magnetic pole 103.

Figure 58:
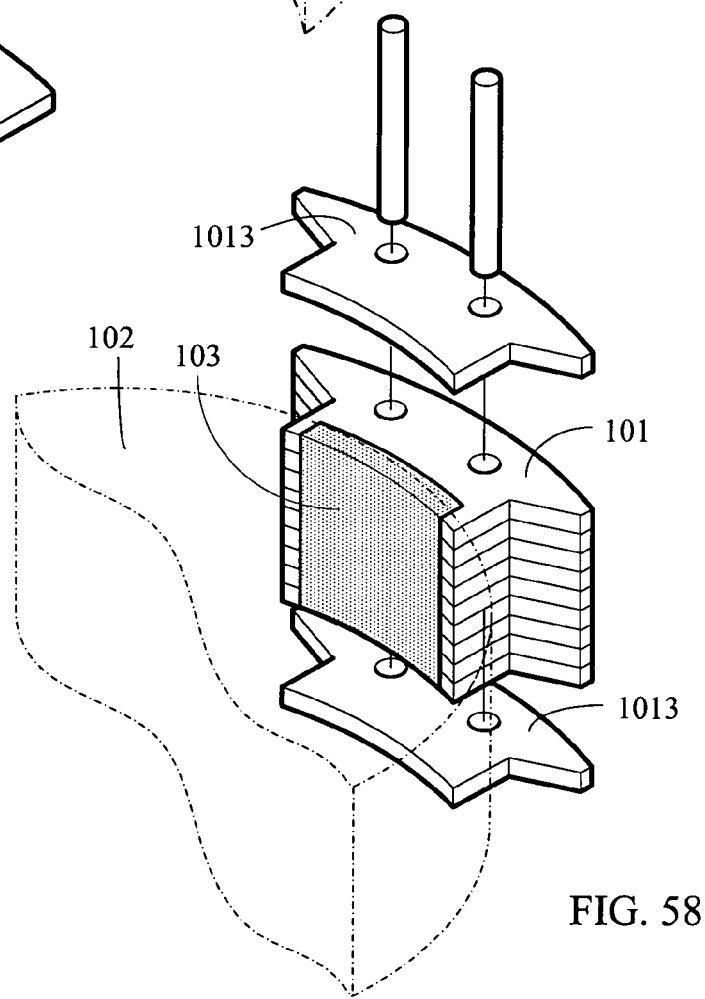
FIG. 58 is a schematic view showing an embodiment of the present invention applied in the inner layer electric machinery structure of a cylinder electric machinery structure, wherein an axial notch is disposed to the magnetic pole constituted by permeable laminated sheets at where near the edge of the magnetic circuit for installing the PM magnetic pole whereof a protective cap is disposed to one or both sides of the magnetic pole for clamping the magnetic pole and sandwiching the PM magnetic pole.

FIG. 58 is a schematic view showing an embodiment of the present invention applied in the inner layer electric machinery structure of a cylinder electric machinery structure, wherein an axial notch is disposed to the magnetic pole constituted by permeable laminated sheets at where near the edge of the magnetic circuit for installing the PM magnetic pole whereof a protective cap is disposed to one or both sides of the magnetic pole for clamping the magnetic pole and sandwiching the PM magnetic pole.

As illustrated in FIG. 58 is the present invention to be applied in the inner layer electric machinery structure of the cylinder electric machinery structure, wherein the magnetic pole 101 constituted by permeable laminated sheets at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with a corresponding shape; an optional protective cap 1013, made of either permeable material or non-permeable material, is further disposed to one or both sides of the magnetic pole 101 as needed for clamping the magnetic pole 101 constituted by permeable laminated sheets and sandwiching the PM magnetic pole 103.

Figure 59:
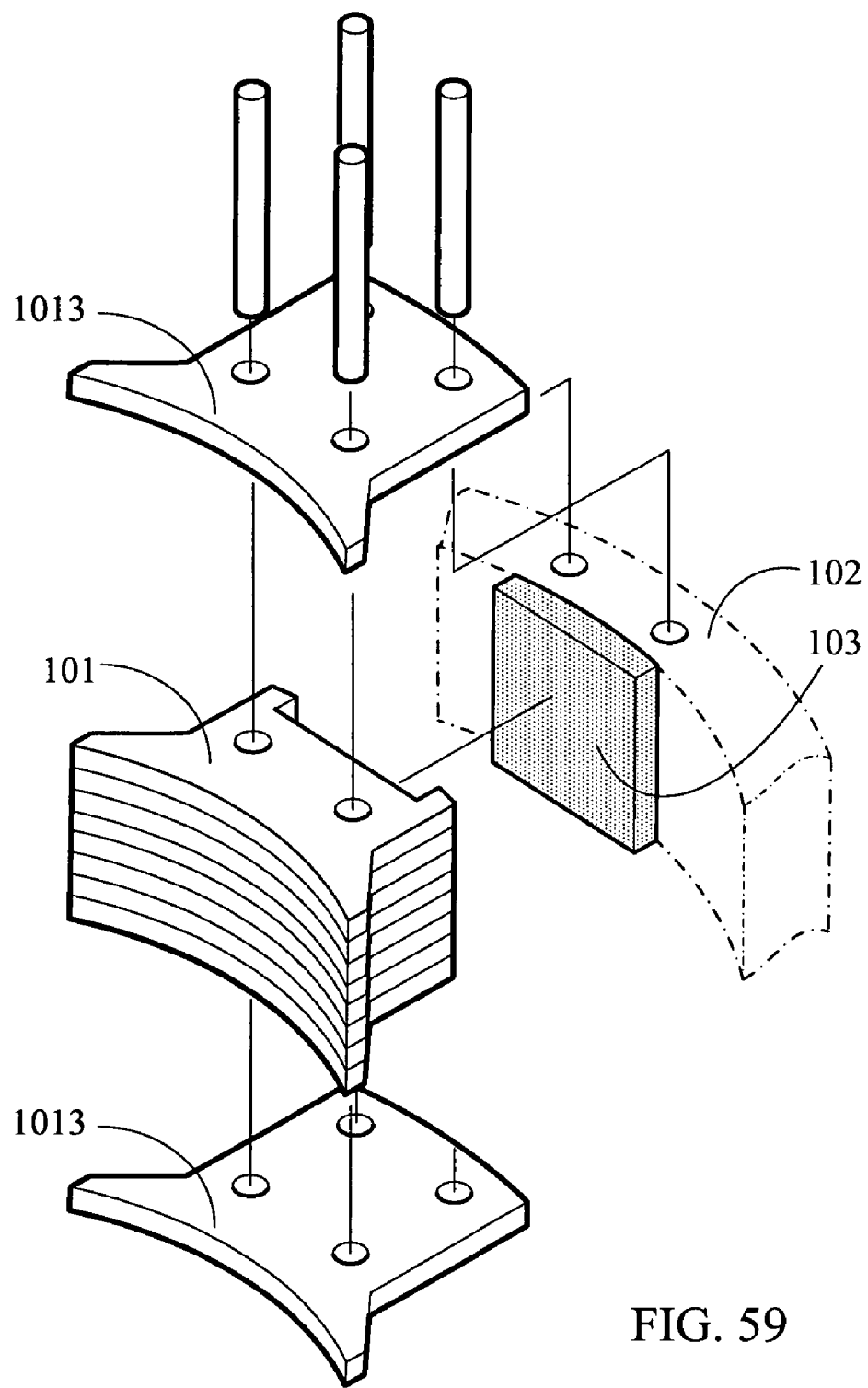
FIG. 59 is a schematic view showing an embodiment of FIG. 57 applied in the outer layer electric machinery structure of a cylinder electric machinery structure, wherein a protective cap is provided to one or both sides of the magnetic pole for clamping the magnetic pole constituted by the permeable laminated sheets and for sandwiching the PM magnetic pole whereof the protective cap extends at the direction facing the magnetic circuit to connect with the magnetic circuit.

FIG. 59 is a schematic view showing an embodiment of FIG. 57 applied in the outer layer electric machinery structure of a cylinder electric machinery structure, wherein a protective cap is provided to one or both sides of the magnetic pole for clamping the magnetic pole constituted by the permeable laminated sheets and for sandwiching the PM magnetic pole whereof the protective cap extends at the direction facing the magnetic circuit to connect with the magnetic circuit.

As illustrated in FIG. 59 is FIG. 57 to be applied in the outer layer electric machinery structure of the cylinder electric machinery structure, wherein the magnetic pole 101 constituted by the permeable laminated sheets at where near the edge of the magnetic circuit 102 is disposed with an axial notch structure, whereof the concave bottom of the axial notch is a flat or curved surface or any required geometric shape, or in a form of parallel along the EME coupling aspect for installing the PM magnetic pole 103 with corresponding shape; an optional protective cap 1013, made of either permeable material or non-permeable material, extending at the direction facing the magnetic circuit 102 to connect with the magnetic circuit 102, is further provided to one or both sides of the magnetic pole 101 as needed for clamping the magnetic pole 101 constituted by permeable laminated sheets and for sandwiching the PM magnetic pole 103.

Figure 60:
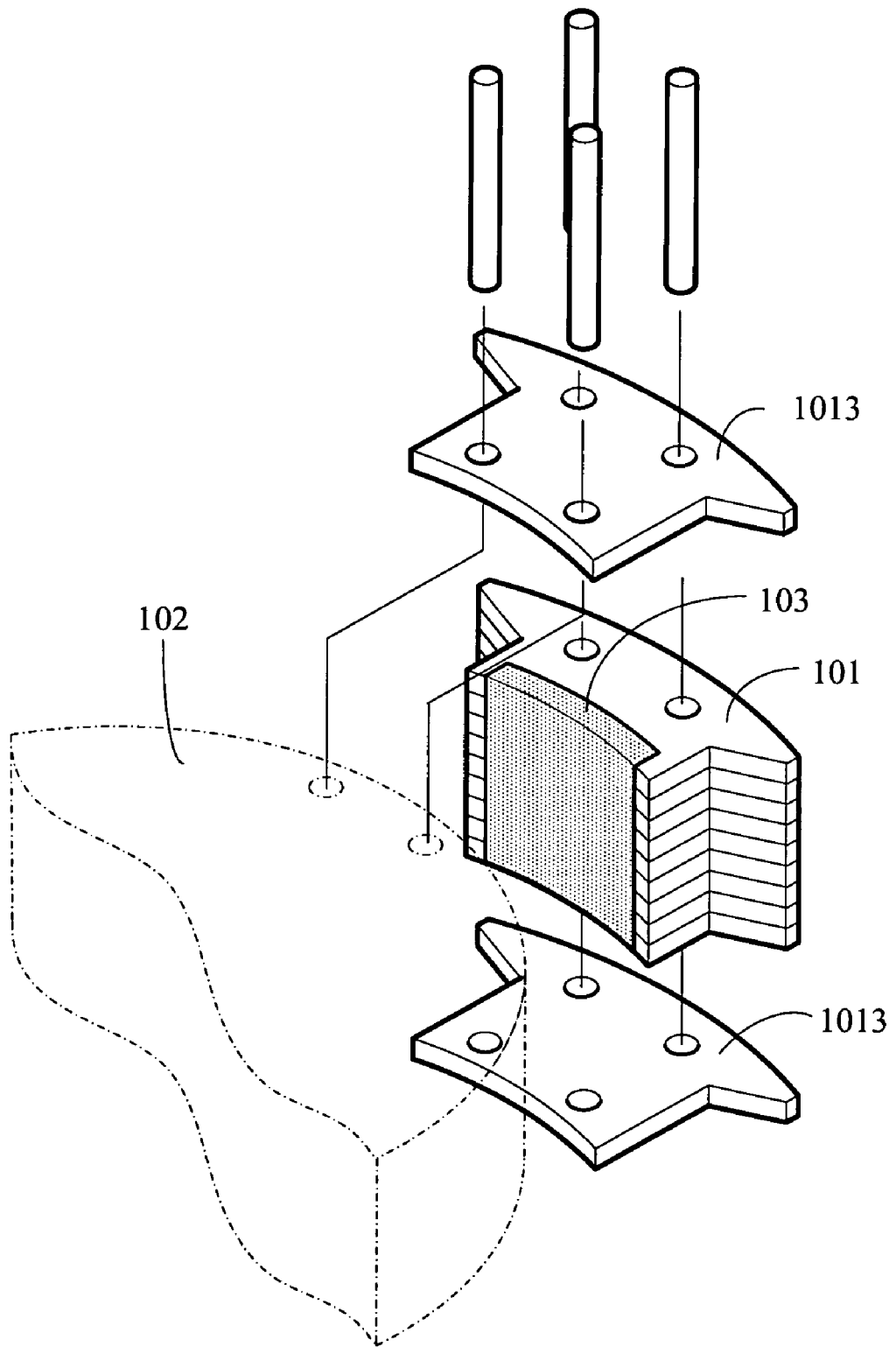
FIG. 60 is a schematic view showing an embodiment of FIG. 58 applied in the inner layer electric machinery structure of a cylinder electric machinery structure, wherein a protective cap is provided to one or both sides of the magnetic pole for clamping the magnetic pole constituted by the permeable laminated sheets and for sandwiching the PM magnetic pole whereof the protective cap extends at the direction facing the magnetic circuit to connect with the magnetic circuit.

FIG. 60 is a schematic view showing an embodiment of FIG. 58 applied in the inner layer electric machinery structure of a cylinder electric machinery structure, wherein a protective cap is provided to one or both sides of the magnetic pole for clamping the magnetic pole constituted by the permeable laminated sheets and for sandwiching the PM magnetic pole whereof the protective cap extends at the direction facing the magnetic circuit to connect with the magnetic circuit.

As illustrated in FIG. 60 is FIG. 58 to be applied in the inner layer electric machinery structure of the cylinder electric machinery structure, wherein the magnetic pole 101 constituted by the permeable laminated sheets at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1013, made of either permeable material or non-permeable material, extending at the direction facing the magnetic circuit 102 to connect with the magnetic circuit 102, is further provided to one or both sides of the magnetic pole 101 as needed for clamping the magnetic pole 101 constituted by permeable laminated sheets and for sandwiching the PM magnetic pole 103.

Figure 61:
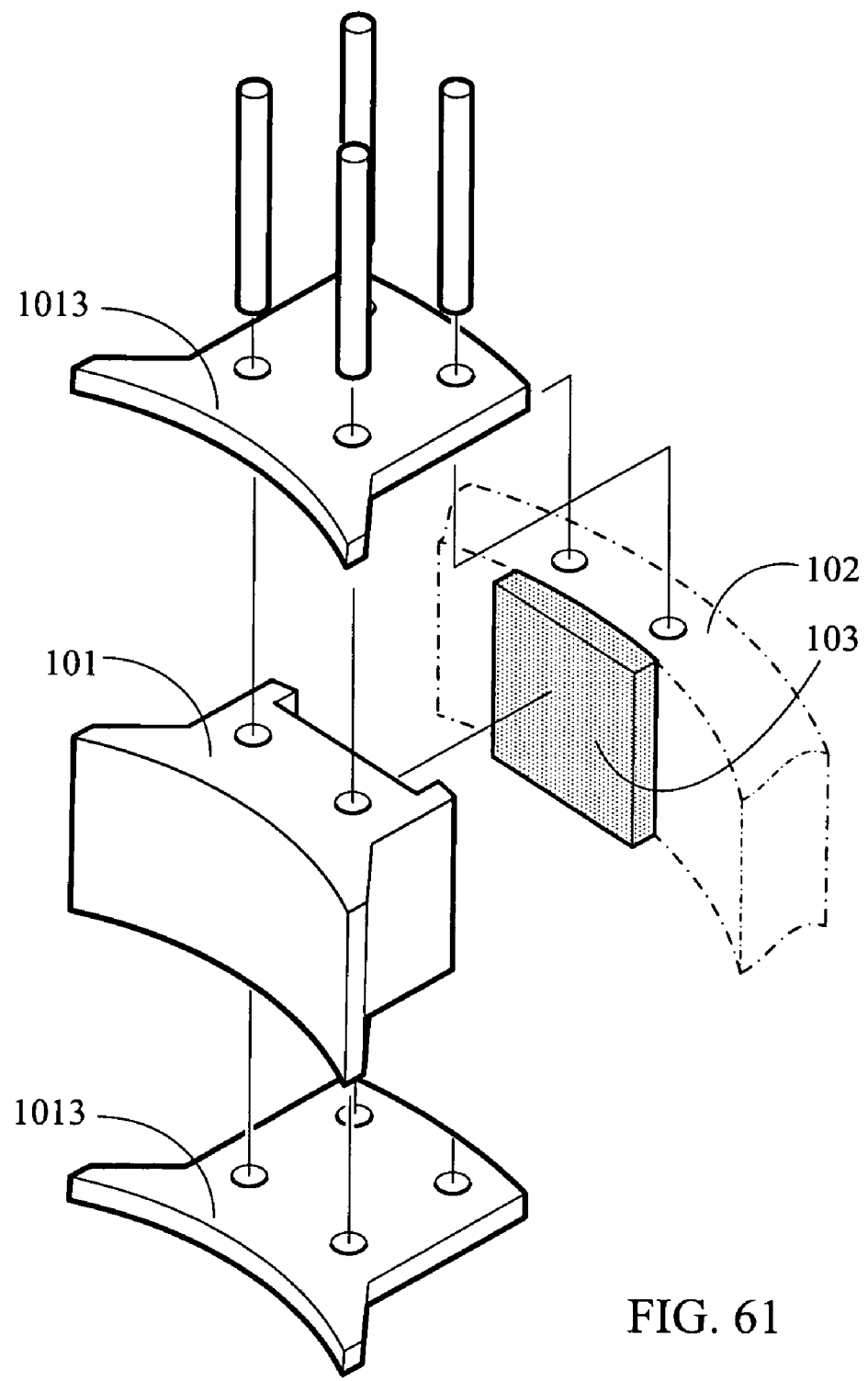
FIG. 61 is a schematic view showing an embodiment of FIG. 57 applied in the outer layer electric machinery structure of a cylinder electric machinery structure, wherein an axial notch is disposed to the magnetic pole of a block structure at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

FIG. 61 is a schematic view showing an embodiment of FIG. 57 applied in the outer layer electric machinery structure of a cylinder electric machinery structure, wherein an axial notch is disposed to the magnetic pole of a block structure at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

As illustrated in FIG. 61 is FIG. 57 to be applied in the outer layer electric machinery structure of the cylinder electric machinery structure, wherein the magnetic pole 101 of a block structure at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape, and an optional protective cap 1013, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and sandwiching the PM magnetic pole 103.

Figure 62:
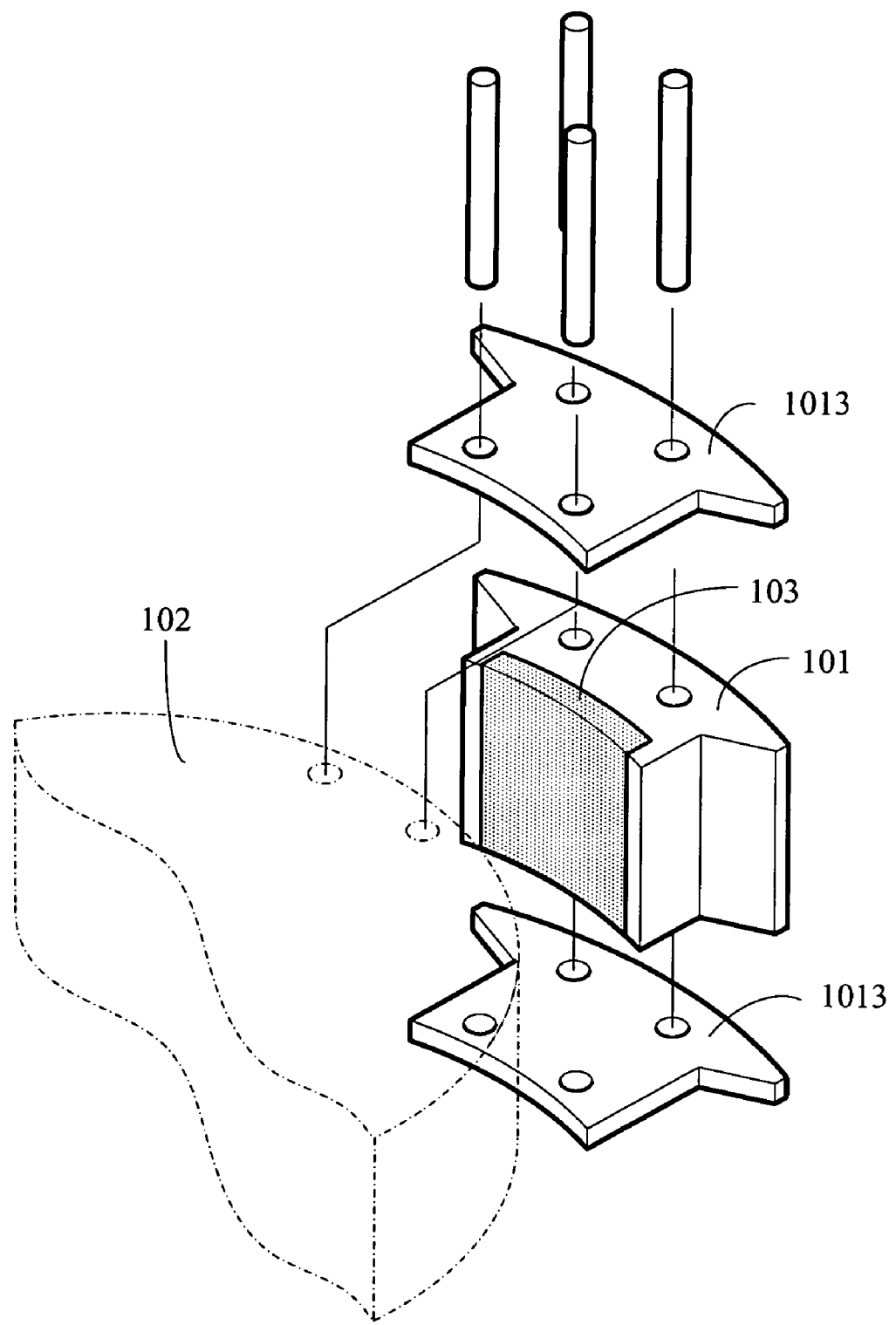
FIG. 62 is a schematic view showing an embodiment of FIG. 58 applied in the inner layer electric machinery structure of a cylinder electric machinery structure, wherein an axial notch is disposed to the magnetic pole of a block structure at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

FIG. 62 is a schematic view showing an embodiment of FIG. 58 applied in the inner layer electric machinery structure of a cylinder electric machinery structure, wherein an axial notch is disposed to the magnetic pole of a block structure at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

As illustrated in FIG. 62 is FIG. 58 to be applied in the inner layer electric machinery structure of the cylinder electric machinery structure, wherein the magnetic pole 101 of a block structure at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape, and an optional protective cap 1013, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and sandwiching the PM magnetic pole 103.

Figure 63:
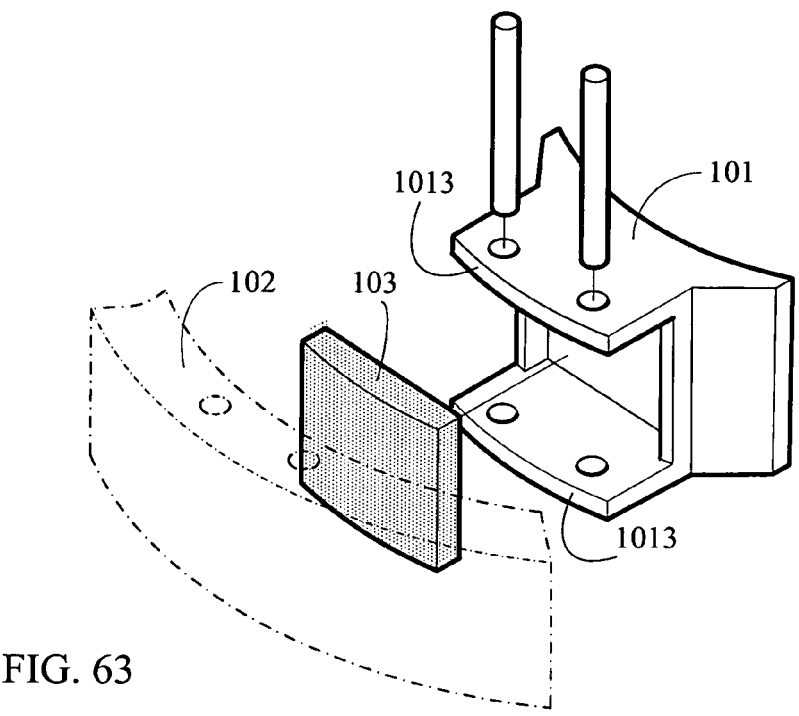
FIG. 63 is a schematic view showing an embodiment of FIG. 57 applied in the outer layer electric machinery structure of a cylinder electric machinery structure, wherein a concave socket is disposed to the magnetic pole constituted by a block integrally at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

FIG. 63 is a schematic view showing an embodiment of FIG. 57 applied in the outer layer electric machinery structure of a cylinder electric machinery structure, wherein a concave socket is disposed to the magnetic pole constituted by a block integrally at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

As illustrated in FIG. 63 is FIG. 57 to be applied in the outer layer electric machinery structure of the cylinder electric machinery structure, wherein the magnetic pole 101 constituted by a block integrally at where near one surface of the magnetic circuit 102 is disposed with a concave socket for installing the PM magnetic pole 103 with chosen geometric shape as needed; the protective cap 1013 disposed to one or both sides of the integrally block-shaped magnetic pole 101 extends at the direction facing the magnetic circuit 102 to connect with the magnetic circuit 102.

Figure 64:
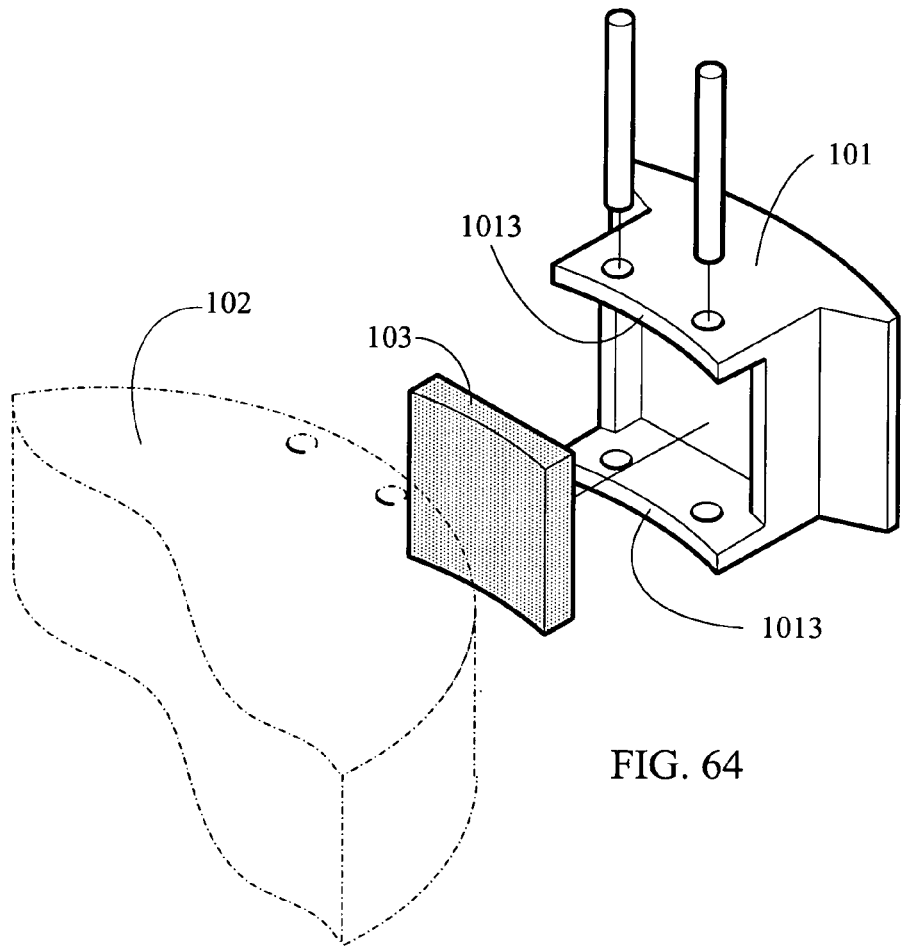
FIG. 64 is a schematic view showing an embodiment of FIG. 58 applied in the inner layer electric machinery structure of a cylinder electric machinery structure, wherein a concave socket is disposed to the magnetic pole constituted by a block integrally at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

FIG. 64 is a schematic view showing an embodiment of FIG. 58 applied in the inner layer electric machinery structure of a cylinder electric machinery structure, wherein a concave socket is disposed to the magnetic pole constituted by a block integrally at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

As illustrated in FIG. 64 is FIG. 58 to be applied in the inner layer electric machinery structure of the cylinder electric machinery structure, wherein the magnetic pole 101 constituted by a block integrally at where near one surface of the magnetic circuit 102 is disposed with a concave socket for installing the PM magnetic pole 103 with chosen geometric shape as needed; the protective cap 1013 disposed to one or both sides of the integrally block-shaped magnetic pole 101 extends at the direction facing the magnetic circuit 102 to connect with the magnetic circuit 102.

Figure 65:
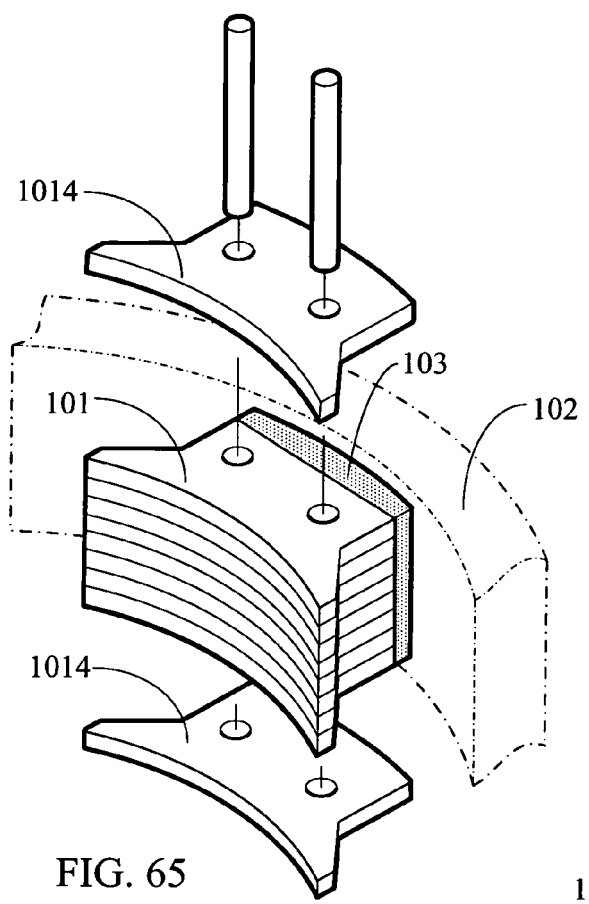
FIG. 65 is a schematic view showing an embodiment of the present invention applied in the outer layer electric machinery structure of a cylinder electric machinery structure, wherein a PM magnetic pole is sandwiched between a magnetic pole constituted by permeable laminated sheets and a magnetic circuit whereof one or both sides of the PM magnetic pole are disposed with a permeable protective cap.

FIG. 65 is a schematic view showing an embodiment of the present invention applied in the outer layer electric machinery structure of a cylinder electric machinery structure, wherein a PM magnetic pole is sandwiched between a magnetic pole constituted by permeable laminated sheets and a magnetic circuit whereof one or both sides of the PM magnetic pole are disposed with a permeable protective cap.

As illustrated in FIG. 65 is the present invention to be applied in the outer layer electric machinery structure of the cylinder electric machinery structure, wherein at where between the magnetic pole 101 constituted by permeable laminated sheets and the magnetic circuit 102 is disposed with a PM magnetic pole 103 in chosen geometric shape as needed, and one or both sides of the PM magnetic pole 103 is further provided with a protective cap 1014 made of permeable material whereof the length of the protective cap 1014 is selectable from at least covering across two magnetic poles of different polarities of the PM magnetic pole 103 to being the same length as the combined length of the magnetic pole 101 and the PM magnetic pole 103.

Figure 66:
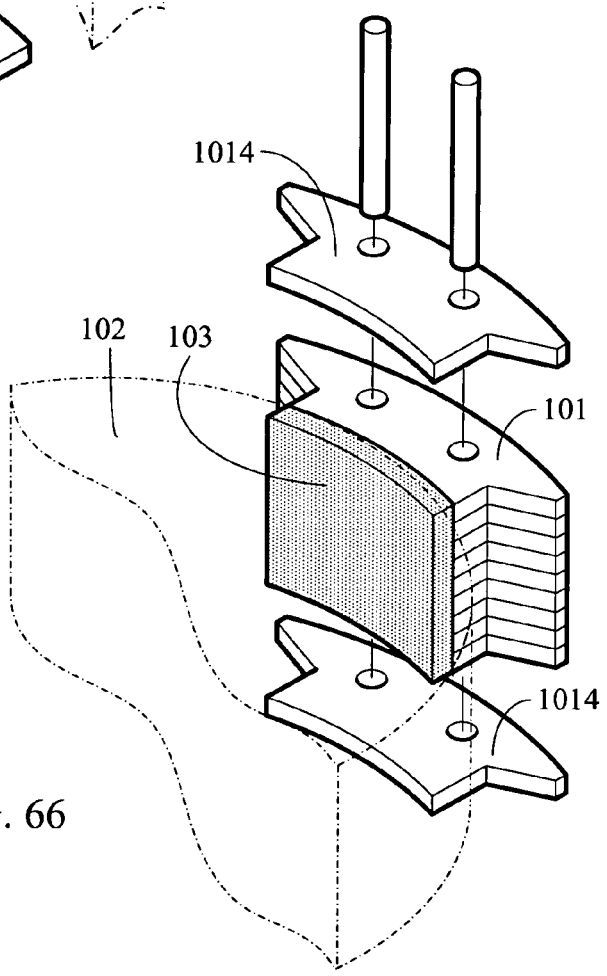
FIG. 66 is a schematic view showing an embodiment of the present invention applied in the inner layer electric machinery structure of a cylinder electric machinery structure, wherein a PM magnetic pole is sandwiched between a magnetic pole constituted by permeable laminated sheets and a magnetic circuit whereof one or both sides of the PM magnetic pole are disposed with a permeable protective cap.

FIG. 66 is a schematic view showing an embodiment of the present invention applied in the inner layer electric machinery structure of a cylinder electric machinery structure, wherein a PM magnetic pole is sandwiched between a magnetic pole constituted by permeable laminated sheets and a magnetic circuit whereof one or both sides of the PM magnetic pole are disposed with a permeable protective cap.

As illustrated in FIG. 66 is the present invention to be applied in the inner layer electric machinery structure of the cylinder electric machinery structure, wherein at where between the magnetic pole 101 constituted by permeable laminated sheets and the magnetic circuit 102 is disposed with a PM magnetic pole 103 in chosen geometric shape as needed, and one or both sides of the PM magnetic pole 103 is further provided with a protective cap 1014 made of permeable material whereof the length of the protective cap 1014 is selectable from at least covering across two magnetic poles of different polarities of the PM magnetic pole 103 to being the same length as the combined length of the magnetic pole 101 and the PM magnetic pole 103.

Figure 67:
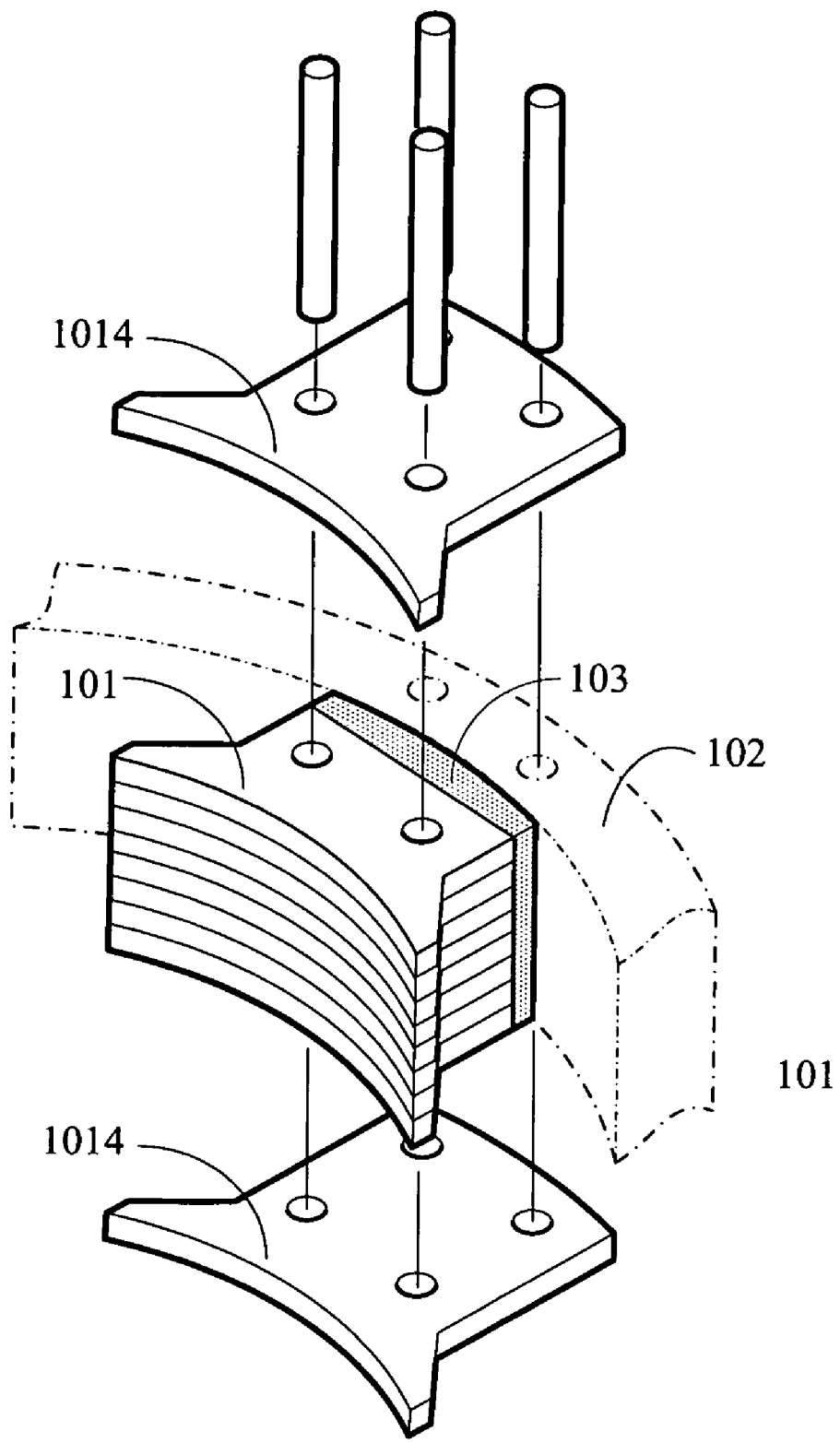
FIG. 67 is a schematic view showing an embodiment of FIG. 65 applied in the outer layer electric machinery structure of a cylinder electric machinery structure, wherein a PM magnetic pole is sandwiched between the magnetic pole constituted by permeable laminated sheets and the magnetic circuit, and a protective cap, extending at the direction facing the magnetic circuit to connect with the magnetic circuit, is provided to one or both sides of the PM magnetic pole for clamping the magnetic pole constituted by the permeable laminated sheets.

FIG. 67 is a schematic view showing an embodiment of FIG. 65 applied in the outer layer electric machinery structure of a cylinder electric machinery structure, wherein a PM magnetic pole is sandwiched between the magnetic pole constituted by permeable laminated sheets and the magnetic circuit, and a protective cap, extending at the direction facing the magnetic circuit to connect with the magnetic circuit, is provided to one or both sides of the PM magnetic pole for clamping the magnetic pole constituted by the permeable laminated sheets.

As illustrated in FIG. 67 is FIG. 65 to be applied in the outer layer electric machinery structure of the cylinder electric machinery structure, wherein at where between the magnetic pole 101 constituted by the permeable laminated sheets and the magnetic circuit 102 is disposed with a PM magnetic pole 103 with chosen geometric shape as needed; one or both sides of the PM magnetic pole 103 is further provided with a protective cap 1014 made of permeable material for clamping the magnetic pole 101 constituted by permeable laminated sheets whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 68:
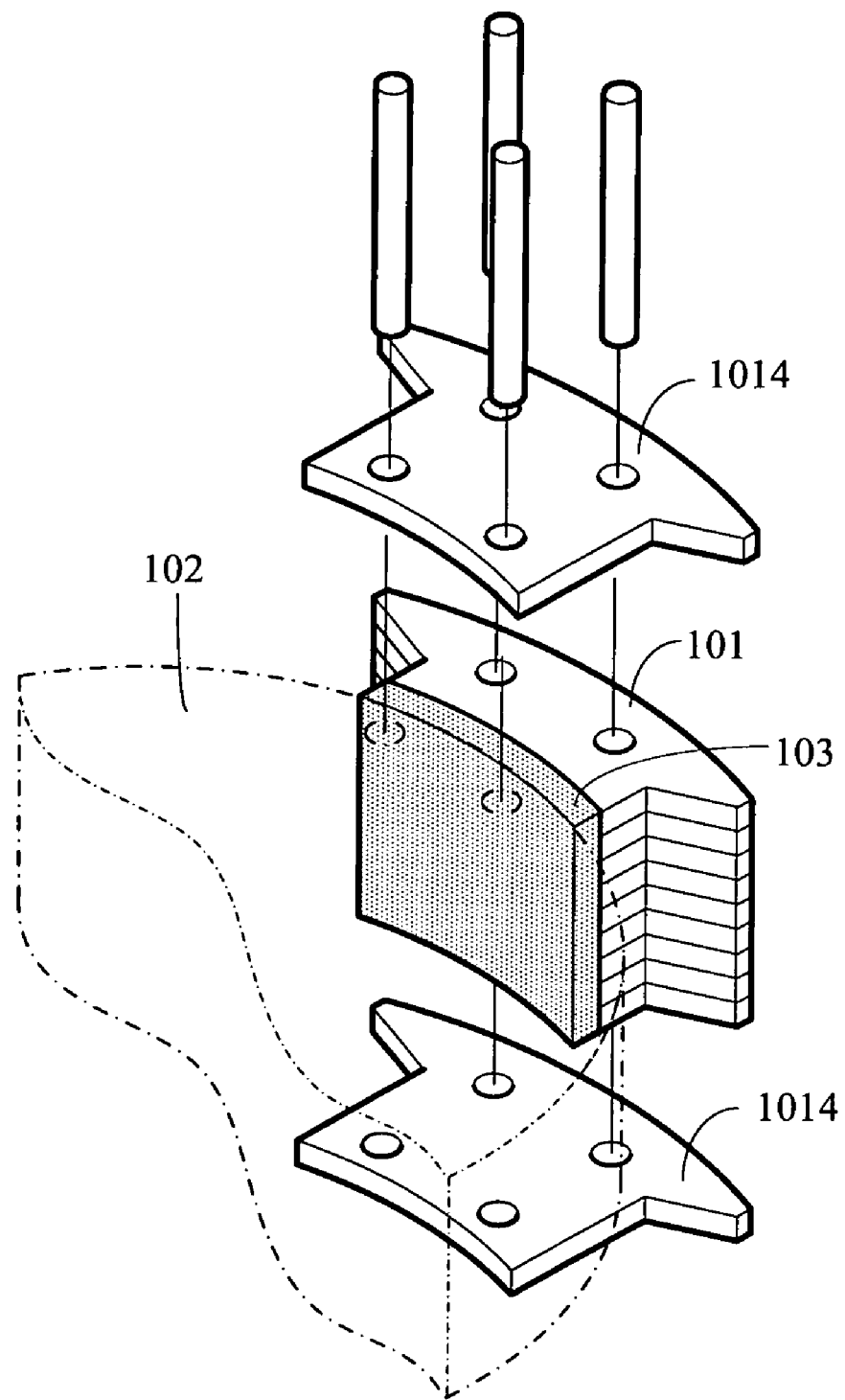
FIG. 68 is a schematic view showing an embodiment of FIG. 66 applied in the inner layer electric machinery structure of a cylinder electric machinery structure, wherein a PM magnetic pole is sandwiched between the magnetic pole constituted by permeable laminated sheets and the magnetic circuit, and a protective cap, extending at the direction facing the magnetic circuit to connect with the magnetic circuit, is provided to one or both sides of the PM magnetic pole for clamping the magnetic pole constituted by the permeable laminated sheets.

FIG. 68 is a schematic view showing an embodiment of FIG. 66 applied in the inner layer electric machinery structure of a cylinder electric machinery structure, wherein a PM magnetic pole is sandwiched between the magnetic pole constituted by permeable laminated sheets and the magnetic circuit, and a protective cap, extending at the direction facing the magnetic circuit to connect with the magnetic circuit, is provided to one or both sides of the PM magnetic pole for clamping the magnetic pole constituted by the permeable laminated sheets.

As illustrated in FIG. 68 is FIG. 66 to be applied in the inner layer electric machinery structure of the cylinder electric machinery structure, wherein at where between the magnetic pole 101 constituted by the permeable laminated sheets and the magnetic circuit 102 is disposed with a PM magnetic pole 103 with chosen geometric shape as needed; one or both sides of the PM magnetic pole 103 is further provided with a protective cap 1014 made of permeable material for clamping the magnetic pole 101 constituted by permeable laminated sheets whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 69:
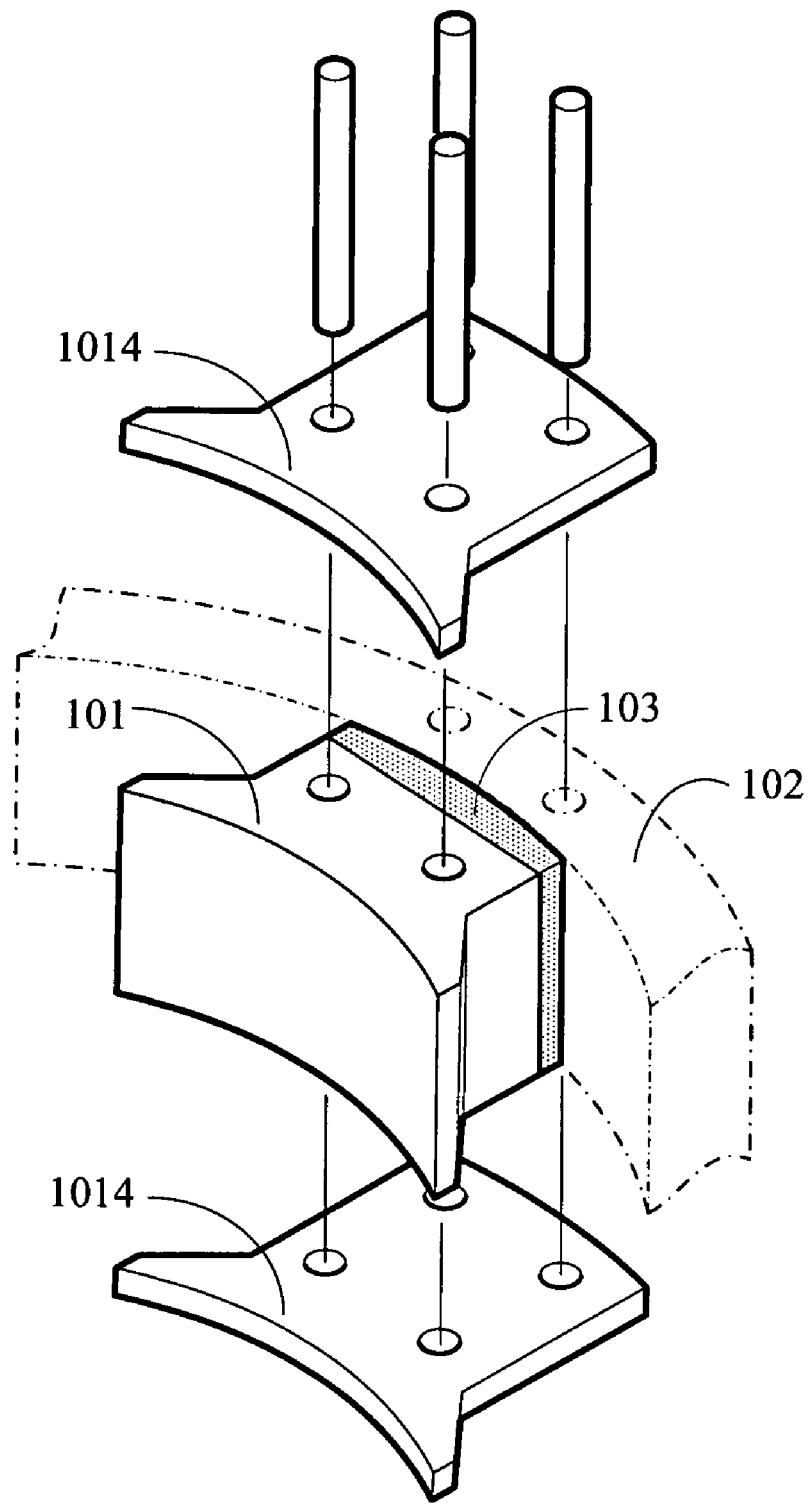
FIG. 69 is a schematic view showing an embodiment of FIG. 65 applied in the outer layer electric machinery structure of a cylinder electric machinery structure, wherein a PM magnetic pole is sandwiched between the magnetic pole constituted by blocks and the magnetic circuit, and a protective cap, extending at the direction facing the magnetic circuit to connect with the magnetic circuit, is provided to one or both sides of the PM magnetic pole for clamping the block-shaped magnetic pole.

FIG. 69 is a schematic view showing an embodiment of FIG. 65 applied in the outer layer electric machinery structure of a cylinder electric machinery structure, wherein a PM magnetic pole is sandwiched between the magnetic pole constituted by blocks and the magnetic circuit, and a protective cap, extending at the direction facing the magnetic circuit to connect with the magnetic circuit, is provided to one or both sides of the PM magnetic pole for clamping the block-shaped magnetic pole.

As illustrated in FIG. 69 is FIG. 65 to be applied in the outer layer electric machinery structure of the cylinder electric machinery structure, wherein at where between the magnetic pole 101 constituted by blocks and the magnetic circuit 102 is disposed with a PM magnetic pole 103 with chosen geometric shape as needed; one or both sides of the PM magnetic pole 103 is further provided with a protective cap 1014 made of permeable material for clamping the block-shaped magnetic pole 101 whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 70:
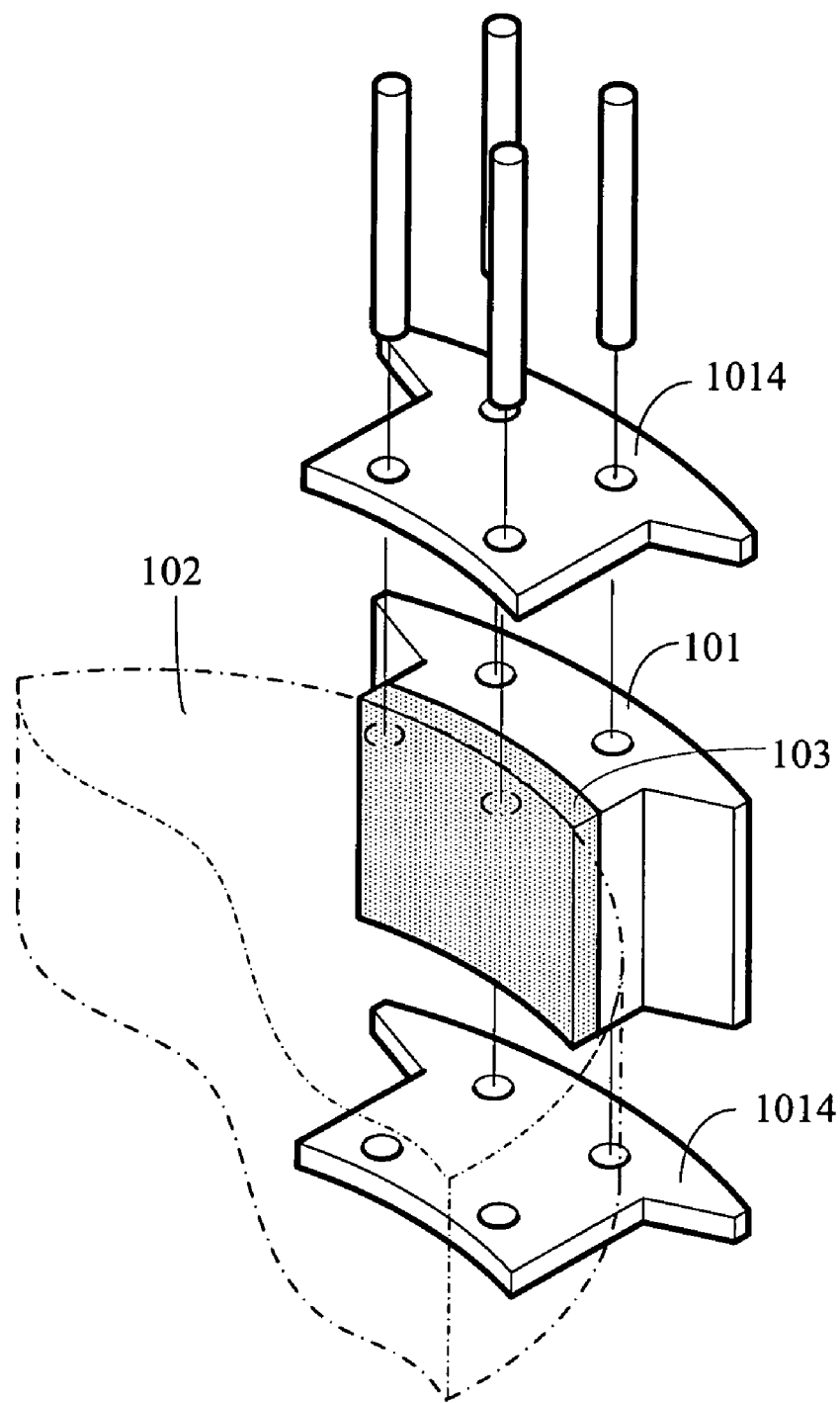
FIG. 70 is a schematic view showing an embodiment of FIG. 66 applied in the inner layer electric machinery structure of a cylinder electric machinery structure, wherein a PM magnetic pole is sandwiched between the magnetic pole constituted by blocks and the magnetic circuit, and a protective cap, extending at the direction facing the magnetic circuit to connect with the magnetic circuit, is provided to one or both sides of the PM magnetic pole for clamping the block-shaped magnetic pole.

FIG. 70 is a schematic view showing an embodiment of FIG. 66 applied in the inner layer electric machinery structure of a cylinder electric machinery structure, wherein a PM magnetic pole is sandwiched between the magnetic pole constituted by blocks and the magnetic circuit, and a protective cap, extending at the direction facing the magnetic circuit to connect with the magnetic circuit, is provided to one or both sides of the PM magnetic pole for clamping the block-shaped magnetic pole.

As illustrated in FIG. 70 is FIG. 66 to be applied in the inner layer electric machinery structure of the cylinder electric machinery structure, wherein at where between the magnetic pole 101 constituted by blocks and the magnetic circuit 102 is disposed with a PM magnetic pole 103 with chosen geometric shape as needed; one or both sides of the PM magnetic pole 103 is further provided with a protective cap 1014 made of permeable material for clamping the block-shaped magnetic pole 101 whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 71:
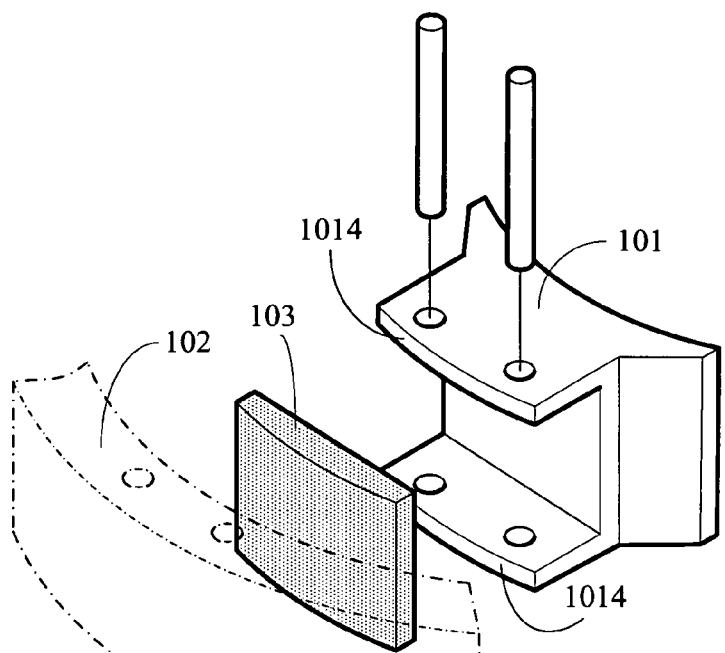
FIG. 71 is a schematic view showing an embodiment of FIG. 65 applied in the outer layer electric machinery structure of a cylinder electric machinery structure, wherein a PM magnetic pole is sandwiched between the magnetic pole constituted by a block integrally and the magnetic circuit whereof one or both sides of the integrally block-shaped magnetic pole by means of extending at the direction facing the magnetic circuit serves as a permeable protective cap.

FIG. 71 is a schematic view showing an embodiment of FIG. 65 applied in the outer layer electric machinery structure of a cylinder electric machinery structure, wherein a PM magnetic pole is sandwiched between the magnetic pole constituted by a block integrally and the magnetic circuit whereof one or both sides of the integrally block-shaped magnetic pole by means of extending at the direction facing the magnetic circuit serves as a permeable protective cap.

As illustrated in FIG. 71 is FIG. 65 to be applied in the outer layer electric machinery structure of the cylinder electric machinery structure, wherein at where between the magnetic pole 101 constituted by a block integrally and the magnetic circuit 102 is disposed with a PM magnetic pole 103 with chosen geometric shape as needed whereof one or both sides of the integrally block-shaped magnetic pole 101 extends at the direction facing the magnetic circuit 102 for constituting a protective cap 1014 on one or both sides of the PM magnetic pole 103 whereof the protective cap 1014 is provided to connect with the magnetic circuit 102.

Figure 72:
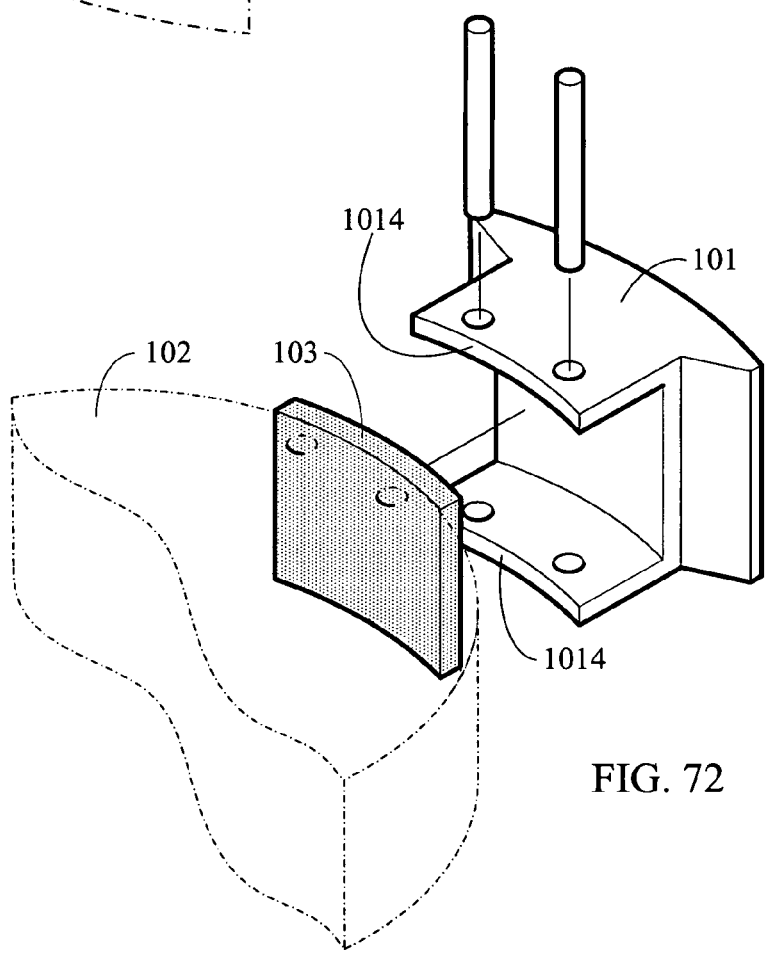
FIG. 72 is a schematic view showing an embodiment of FIG. 66 applied in the inner layer electric machinery structure of a cylinder electric machinery structure, wherein a PM magnetic pole is sandwiched between the magnetic pole constituted by a block integrally and the magnetic circuit whereof one or both sides of the integrally block-shaped magnetic pole by means of extending at the direction facing the magnetic circuit serves as a permeable protective cap.

FIG. 72 is a schematic view showing an embodiment of FIG. 66 applied in the inner layer electric machinery structure of a cylinder electric machinery structure, wherein a PM magnetic pole is sandwiched between the magnetic pole constituted by a block integrally and the magnetic circuit whereof one or both sides of the integrally block-shaped magnetic pole by means of extending at the direction facing the magnetic circuit serves as a permeable protective cap.

As illustrated in FIG. 72 is FIG. 66 to be applied in the inner layer electric machinery structure of the cylinder electric machinery structure, wherein at where between the magnetic pole 101 constituted by a block integrally and the magnetic circuit 102 is disposed with a PM magnetic pole 103 with chosen geometric shape as needed whereof one or both sides of the integrally block-shaped magnetic pole 101 extends at the direction facing the magnetic circuit 102 for constituting a protective cap 1014 on one or both sides of the PM magnetic pole 103 whereof the protective cap 1014 is provided to connect with the magnetic circuit 102.

The electric machinery provided with a PM magnetic pole wrapped by the magnetic pole or the magnetic circuit can be further disposed with at least one transverse rabbet on one side of the polar axis of the magnetic pole at where near the EME coupling aspect, wherein the transverse rabbet indicates a linear or arcuate or any required geometric shape, or is in a form of parallel along the EME coupling aspect for disposing the PM magnetic pole with corresponding quantity and shape whereof the PM magnetic pole wrapped by the transverse rabbet on the magnetic pole and the polar axis of the magnetic pole are having electric phase angle difference, so as to form the distribution of the magnetic line of force of required magnetic field.

Figure 73:
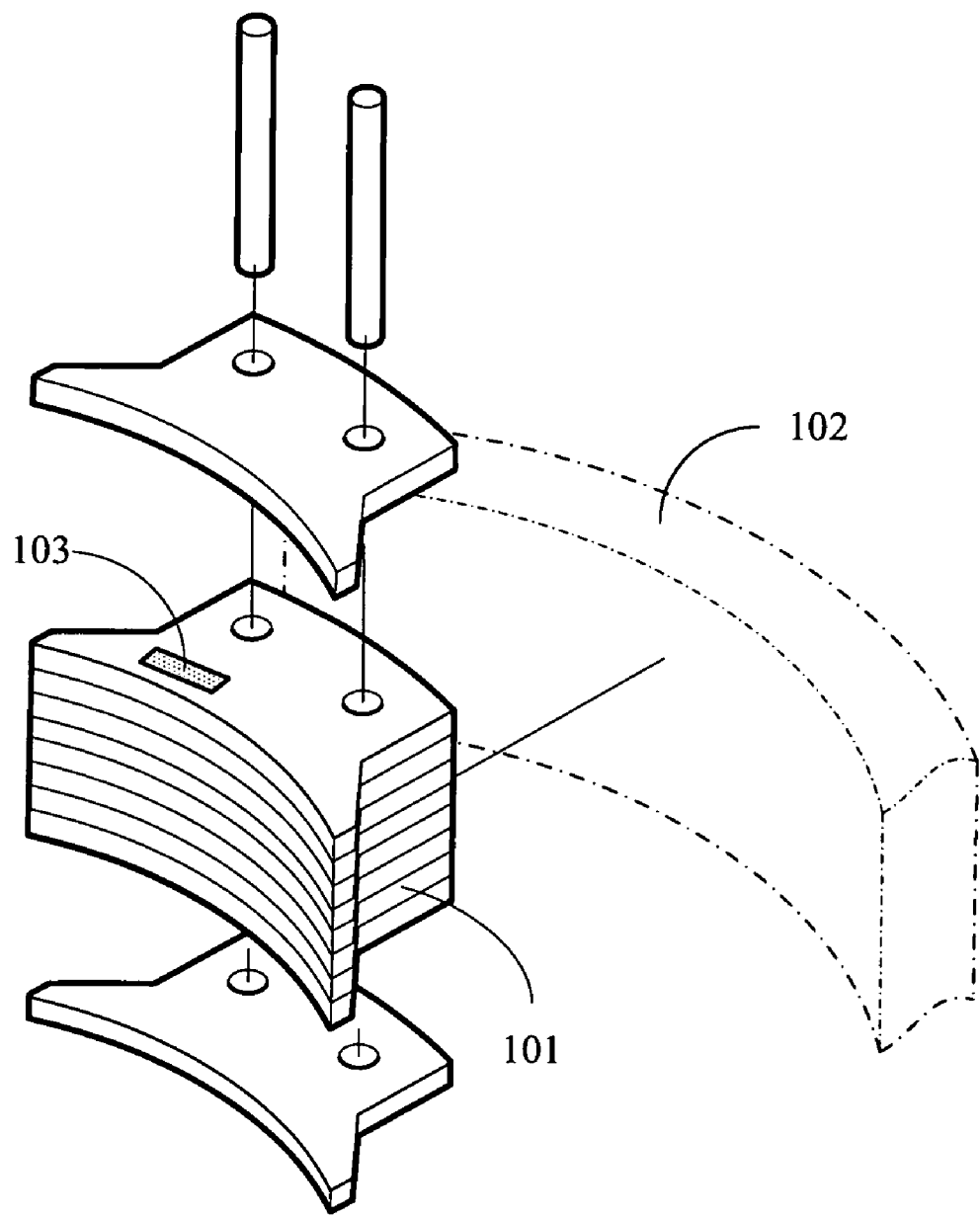
FIG. 73 is a schematic view showing an embodiment of the present invention applied in the outer layer electric machinery structure of a cylinder electric machinery structure, wherein a PM magnetic pole having electric phase angle difference to the polar axis of the magnetic pole is wrapped by one side of the polar axis of the magnetic pole at where near the EME coupling aspect to form the distribution of the magnetic line of force of required magnetic field.

FIG. 73 is a schematic view showing an embodiment of the present invention applied in the outer layer electric machinery structure of a cylinder electric machinery structure, wherein a PM magnetic pole having electric phase angle difference to the polar axis of the magnetic pole is wrapped by one side of the polar axis of the magnetic pole at where near the EME coupling aspect to form the distribution of the magnetic line of force of required magnetic field.

As illustrated in FIG. 73 is the present invention to be applied in the outer layer electric machinery structure of the cylinder electric machinery structure, wherein one side of the polar axis of the magnetic pole 101 at where near the EME coupling aspect is disposed with at least one transverse rabbet, which indicates a linear or arcuate or any required geometric shape, or is in a form of parallel along the EME coupling aspect, for placing a PM magnetic pole 103 with corresponding quantity and shape whereof the PM magnetic pole 103 wrapped by the transverse rabbet on the magnetic pole and the polar axis of the magnetic pole are having electric phase angle difference, so as to form the distribution of the magnetic line of force of required magnetic field.

Figure 74:
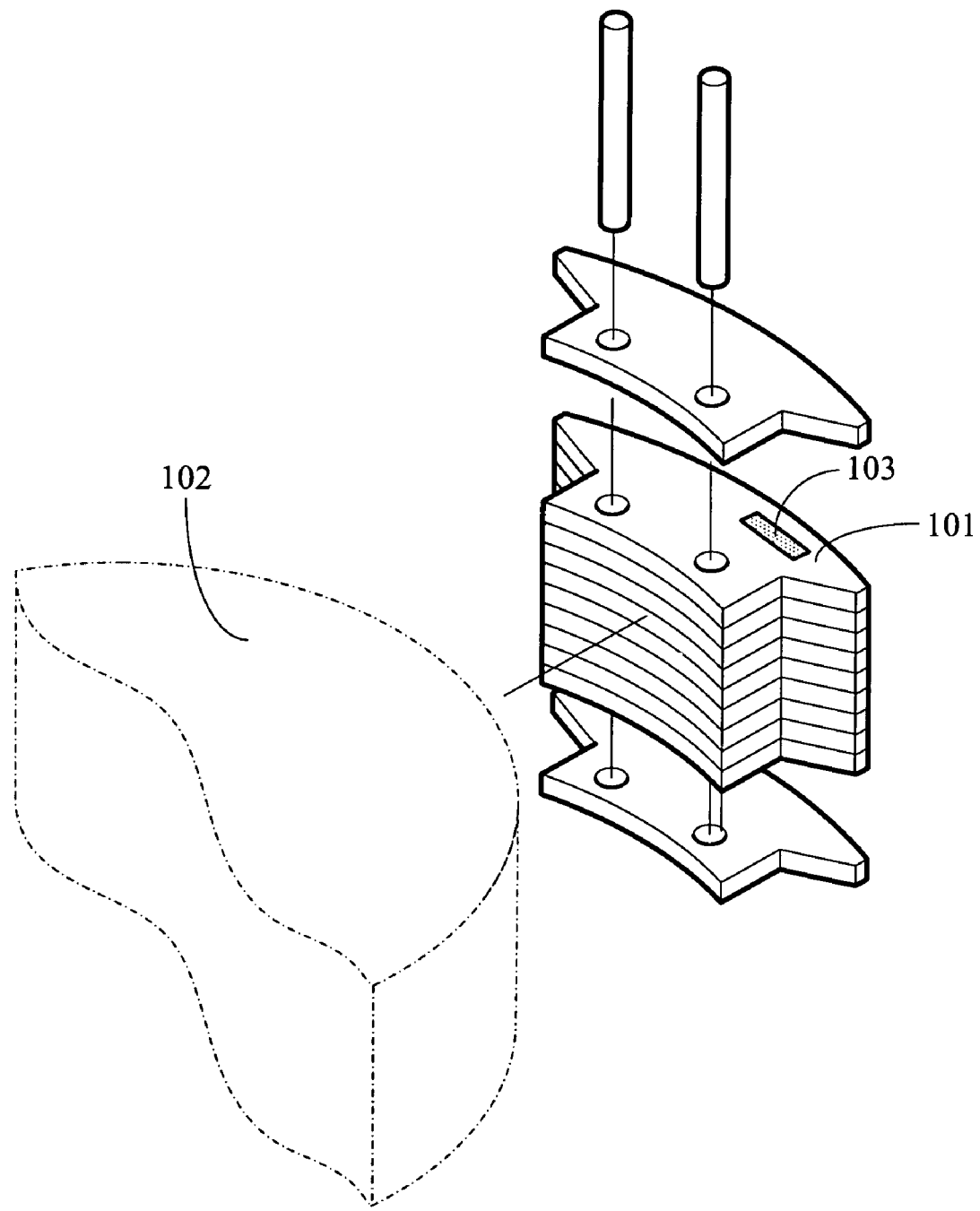
FIG. 74 is a schematic view showing an embodiment of the present invention applied in the inner layer electric machinery structure of a cylinder electric machinery structure, wherein a PM magnetic pole having electric phase angle difference to the polar axis of the magnetic pole is wrapped by one side of the polar axis of the magnetic pole at where near the EME coupling aspect to form the distribution of the magnetic line of force of required magnetic field.

FIG. 74 is a schematic view showing an embodiment of the present invention applied in the inner layer electric machinery structure of a cylinder electric machinery structure, wherein a PM magnetic pole having electric phase angle difference to the polar axis of the magnetic pole is wrapped by one side of the polar axis of the magnetic pole at where near the EME coupling aspect to form the distribution of the magnetic line of force of required magnetic field.

As illustrated in FIG. 74 is the present invention to be applied in the inner layer electric machinery structure of the cylinder electric machinery structure, wherein one side of the polar axis of the magnetic pole 101 at where near the EME coupling aspect is disposed with at least one transverse rabbet, which indicates a linear or arcuate or any required geometric shape, or is in a form of parallel along the EME coupling aspect, for placing a PM magnetic pole 103 with corresponding quantity and shape whereof the PM magnetic pole 103 wrapped by the transverse rabbet on the magnetic pole and the polar axis of the magnetic pole are having electric phase angle difference, so as to form the distribution of the magnetic line of force of required magnetic field.

The specific structure as aforementioned in the embodied examples of FIG. 73 and FIG. 74 that one side of the polar axis of the magnetic pole 101 at where near the EME coupling aspect disposed with at least one transverse rabbet, which indicates a linear or arcuate or any required geometric shape, or is in a form parallel along the EME coupling aspect, for installing the PM magnetic pole 103 with corresponding quantity and shape, whereof the PM magnetic pole 103 wrapped by the transverse rabbet on the magnetic pole and the polar axis of the magnetic pole are having electric phase angle difference so as to form the distribution of the magnetic line of force of required magnetic field can also be applied in plate or linear electric machinery structures according to the same operation principle; in addition, an optional protective cap made of either permeable material or non-permeable material can be disposed to one or both sides of the magnetic pole 103 as needed, whereof ways to disposed the protective cap include:

(1) the protective cap is not provided; or
(2) the protective cap is added on one or both sides of the PM magnetic pole 103, whereof the length of the protective cap is the same as the combined length of the magnetic pole 101 and the PM magnetic pole 103; or
(3) the protective cap is added on one or both sides of the magnetic pole 101 constituted by blocks or permeable laminated sheets for clamping the magnetic pole 101 constituted by permeable laminated sheets, whereof the protective cap extends at the direction facing the magnetic circuit 102 to connect with the magnetic circuit 102; or
(4) a PM magnetic pole 103 which is thinner than the thickness of the magnetic pole 101 is disposed into the transverse rabbet, whereby a protective cap is stuffed into or a filler is added into one or both ends of the transverse rabbet.

The electric machinery provided with a PM magnetic pole wrapped by the magnetic pole or the magnetic circuit can be further disposed with at least one transverse rabbet on both sides of the polar axis at where near the EME coupling aspect on the magnetic pole, wherein the transverse rabbet indicates a linear or arcuate or any required geometric shape, or is in a form of parallel along the EME coupling aspect for disposing two or above two PM magnetic poles with corresponding quantity and shape, whereof the PM magnetic pole wrapped by the rabbet on the magnetic pole and the polar axis on the magnetic pole are having electrical phase angle difference, so as to form the distribution of the magnetic line of force of required magnetic field.

Figure 75:
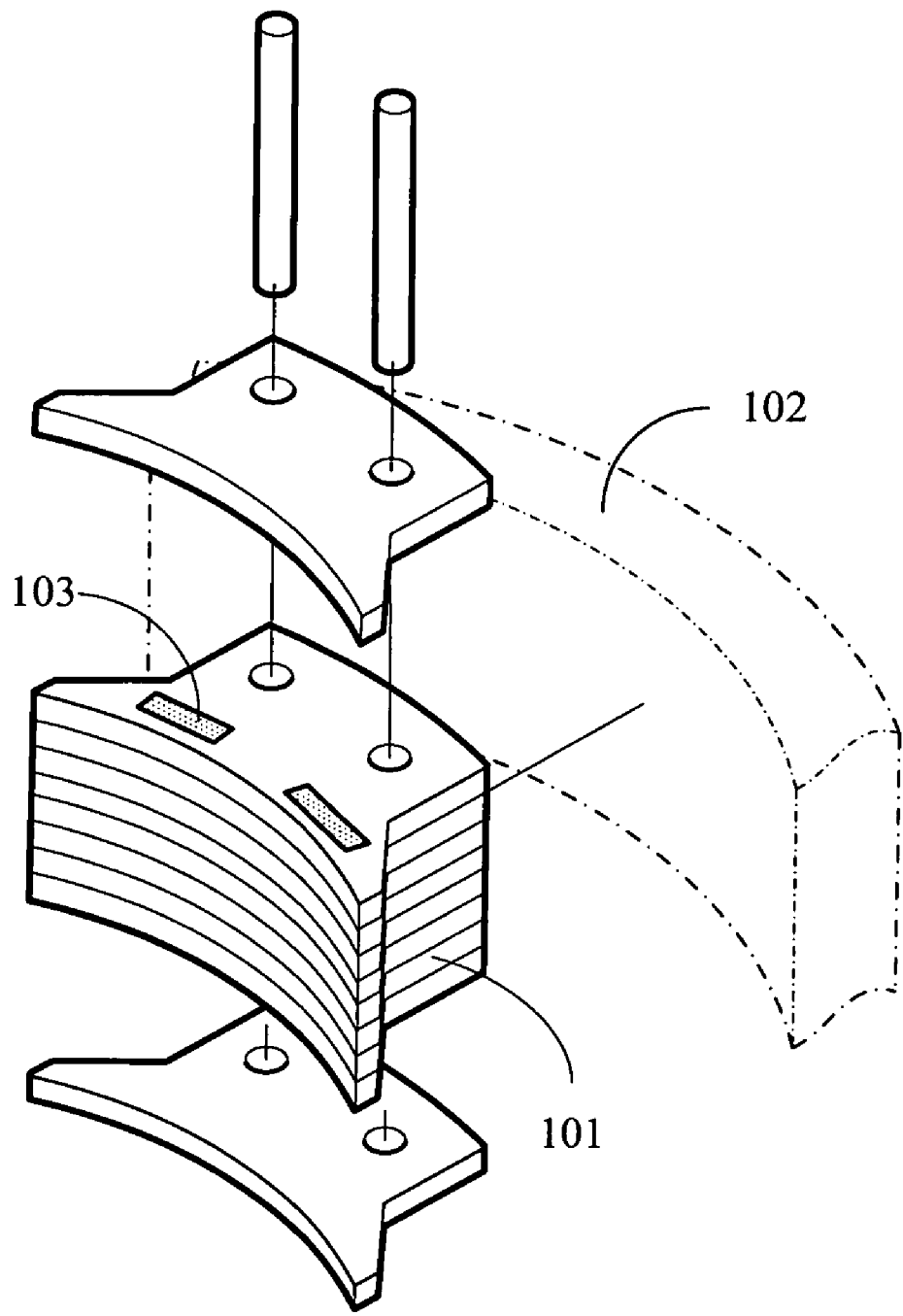
FIG. 75 is a schematic view showing an embodiment of the present invention applied in the outer layer electric machinery structure of a cylinder electric machinery structure, wherein each of both sides of the polar axis of the magnetic pole at where near the EME coupling aspect is disposed with at least one transverse rabbet whereof the position of the transverse rabbet indicates a distribution of electrical phase angle difference to the polar axis of the magnetic pole for wrapping two or above two PM magnetic poles with corresponding quantity and shape to form the distribution of the magnetic line of force of required magnetic field.

FIG. 75 is a schematic view showing an embodiment of the present invention applied in the outer layer electric machinery structure of a cylinder electric machinery structure, wherein each of both sides of the polar axis of the magnetic pole at where near the EME coupling aspect is disposed with at least one transverse rabbet whereof the position of the transverse rabbet indicates a distribution of electrical phase angle difference to the polar axis of the magnetic pole for wrapping two or above two PM magnetic poles with corresponding quantity and shape to form the distribution of the magnetic line of force of required magnetic field.

As illustrated in FIG. 75 is the present invention to be applied in the outer layer electric machinery structure of the cylinder electric machinery structure, wherein each of the both sides of the polar axis on the magnetic pole 101 at where near the EME coupling aspect is disposed with at least one transverse rabbet, which indicates a linear or arcuate or any required geometric shape, or is in a form of parallel along the EME coupling aspect whereof the position of the transverse rabbet indicates a distribution of electrical phase angle difference to the polar axis of the magnetic pole 101 for wrapping two or above two PM magnetic poles 103 with corresponding quantity and shape, so as to form the distribution of the magnetic line of force of required magnetic field.

Figure 76:
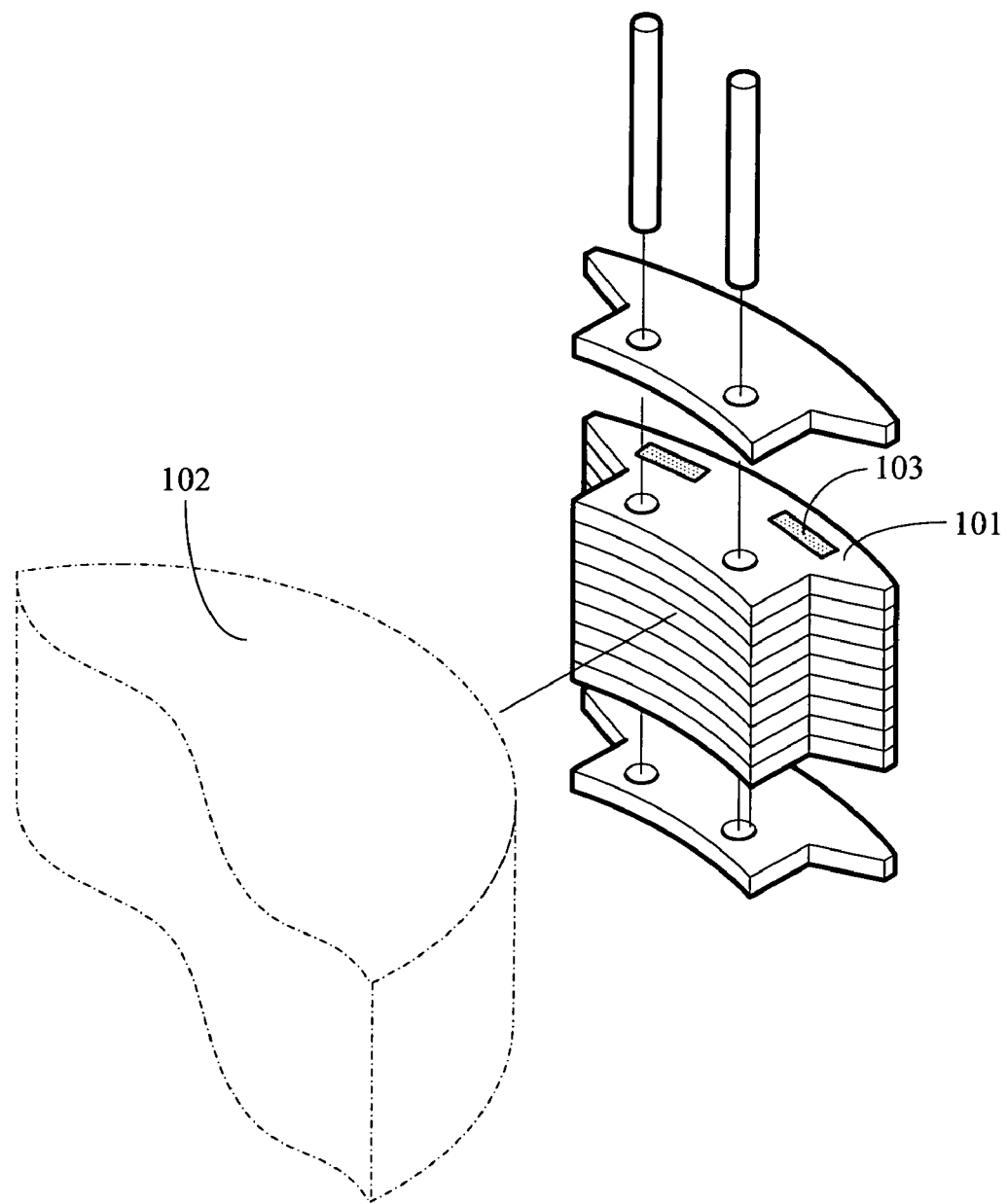
FIG. 76 is a schematic view showing an embodiment of the present invention applied in the inner layer electric machinery structure of a cylinder electric machinery structure, wherein each of both sides of the polar axis of the magnetic pole at where near the EME coupling aspect is disposed with at least one rabbet whereof the position of the transverse rabbet indicates a distribution of electrical phase angle difference to the polar axis of the magnetic pole for wrapping two or above two PM magnetic poles with corresponding quantity and shape to form the distribution of the magnetic line of force of required magnetic field.

FIG. 76 is a schematic view showing an embodiment of the present invention applied in the inner layer electric machinery structure of a cylinder electric machinery structure, wherein each of both sides of the polar axis of the magnetic pole at where near the EME coupling aspect is disposed with at least one rabbet whereof the position of the transverse rabbet indicates a distribution of electrical phase angle difference to the polar axis of the magnetic pole for wrapping two or above two PM magnetic poles with corresponding quantity and shape to form the distribution of the magnetic line of force of required magnetic field.

As illustrated in FIG. 76 is the present invention to be applied in the inner layer electric machinery structure of the cylinder electric machinery structure, wherein each of the both sides of the polar axis on the magnetic pole 101 at where near the EME coupling aspect is disposed with at least one transverse rabbet, which indicates a linear or arcuate or any required geometric shape, or is in a form of parallel along the EME coupling aspect whereof the position of the transverse rabbet indicates a distribution of electrical phase angle difference to the polar axis of the magnetic pole 101 for wrapping two or above two PM magnetic poles 103 with corresponding quantity and shape, so as to form the distribution of the magnetic line of force of required magnetic field.

The method as aforementioned in the embodied examples as shown in FIG. 75 and FIG. 76 that each of both sides of the polar axis of the magnetic pole at where near the EME coupling aspect is disposed with at least one transverse rabbet for wrapping two or above two PM magnetic poles 103 that having electrical phase angle difference to the polar axis of the magnetic pole 101 so as to form the distribution of the magnetic line of force of required magnetic field can be applied in both plate or linear electric machinery structure according to the same operation principle; in addition, an optional protective cap made of either permeable material or non-permeable material can be disposed to one or both sides of the magnetic pole 103 as needed, whereof ways to disposed the protective cap include:

(1) the protective cap is not provided; or
(2) the protective cap is added on one or both sides of the PM magnetic pole 103, whereof the length of the protective cap is the same as the combined length of the magnetic pole 101 and the PM magnetic pole 103; or
(3) the protective cap is added on one or both sides of the magnetic pole 101 constituted by blocks or permeable laminated sheets for clamping the magnetic pole 101 constituted by permeable laminated sheets, whereof the protective cap extends at the direction facing the magnetic circuit 102 to connect with the magnetic circuit 102; or
(4) a PM magnetic pole 103 which is thinner than the thickness of the magnetic pole 101 is disposed into the transverse rabbet, whereby a protective cap is stuffed into or a filler is added into one or both ends of the transverse rabbet.

The embodied examples as shown in FIG. 41~FIG. 76 are various ways to wrap the PM magnetic pole 103 applied in the double layer type cylinder electric machinery structure or coaxial 3-ring type electric machinery structure, whereof it can be applied in the double layer type plate electric machinery structure or coaxial 3-layer type plate electric machinery structure and double layer type linear electric machinery structure or 3-layer type linear electric machinery structure according to the same operation principle, and ways to add the protective cap and selections of the permeability of the material of the protective cap are the same as illustrated in FIG. 41~FIG. 76.

Accordingly, the electric machinery provided with a PM magnetic pole wrapped by a magnetic pole or a magnetic circuit of the present invention by having disposed the PM magnetic pole wrapped between the individual magnetic pole and the magnetic circuit is characterized in that it avoids its magnetic force of the PM magnetic pole from being weakened by inverse excitation during the operation when compared to the conventional electric machinery having adhered a PM magnetic pole to a pole-face.

The invention claimed is:
1. An electric machinery, comprising:
a coil-less stator having a permanent magnet only magnetic pole (PM magnetic pole) wrapped by a magnetic pole or a magnetic circuit;
an armature having a conductor or conductive coil that carries a current to produce a magnetic flux;
wherein the PM magnetic pole is wrapped by forming one or more than one side of the magnetic circuits made of permeable material between two magnetic poles of different polarities of the PM magnetic pole after the combination of the magnetic pole and the magnetic circuit, whereof the magnetic circuit covering across the two magnetic poles of different polarities on the PM magnetic poles constitute a permeable magnetic circuit on at least one side or wrapped overall for passing through partial magnetic line of force on the PM magnetic pole while the PM magnetic pole remains to form partial strength of the magnetic field on the pole-face of the magnetic pole, such that when the PM magnetic pole is inversely excited in the course of operation, two magnetic poles of different polarities on the PM magnetic pole keeps closed magnetic circuit to maintain the magnetic line of force so as to enhance the property to against inverse excitation.

2. The electric machinery as claimed in claim 1, wherein the magnetic pole is disposed on the individual magnetic pole to wrap the PM magnetic pole jointly with the magnetic circuit to constitute magnetic pole; the magnetic circuit and the magnetic pole are comprised of a material of silicon steel sheets, steel, or iron providing good permeability and made in an integral part or a stack of multiple sheets by lamination, or made by metallurgy from the dust of permeable material; a pole-face of the magnetic pole faces a structure of another electric machinery that interacts with the magnetic pole to execute EME; and the pole-face of the magnetic pole may be selected to indicate a convex, concave or flat surface or may be further disposed with a groove to indicate protrusion and indention pattern or a specific geometric form as applicable.

3. The electric machinery as claimed in claim 1, wherein the individual magnetic pole can be further constituted by using the neck section of the magnetic circuit of magnetic pole and the magnetic pole to jointly wrap a PM magnetic pole; the magnetic circuit, the neck section of the magnetic circuit of magnetic pole, and the magnetic pole are comprised of a material of silicon steel sheets, steel, or iron providing good permeability and made in an integral part or a stack of multiple sheets by lamination, or made by metallurgy from the dust of permeable material; a pole-face of the magnetic pole faces a structure of another electric machinery that interacts with the magnetic pole to execute EME; and the pole-face of the magnetic pole may be selected to indicate a convex, concave, or flat surface, or may be further disposed with a groove to indicate protrusion and indention pattern or a specific geometric form as applicable.

4. The electric machinery as claimed in claim 1, wherein the electric machinery is related to a cylinder electric machinery in a construction comprised of an inner layer electric machinery structure and an outer layer electric machinery, including an inner layer electric machinery structure and an outer layer electric machinery structure and is characterized as having:
　a) an EME coupling aspect of the outer layer electric machinery structure in a direction facing the inner layer electric machinery structure to execute EME coupling with the inner layer electric machinery structure; or
　b) an EME coupling aspect of the inner layer electric machinery structure in a direction facing the outer layer electric machinery structure to execute EME coupling with the outer layer electric machinery structure;
　the EME coupling aspects of above items a) and b) are disposed with an PM magnetic pole wrapped between the magnetic pole and the magnetic circuit from the individual magnetic pole, thus to constitute a cylinder electric machinery provided with a PM magnetic pole being wrapped between the magnetic pole and the magnetic circuit from the individual magnetic pole.

5. The electric machinery as claimed in claim 1, wherein the electric machinery is related to a coaxial 3-ring type electric machinery to engage coaxial operation by insertion of an inner ring, a mid ring, and an outer ring electric machinery structures including an inner ring electric machinery structure, a mid ring electric machinery structure, and an outer ring electric machinery structure and is characterized as having:
　a) an EME coupling aspect of the outer ring electric machinery structure in a direction facing the mid ring electric machinery structure to execute EME coupling with the mid ring electric machinery structure; or
　b) an EME coupling aspect of the mid ring electric machinery structure in a direction facing the outer ring electric machinery structure to execute EME coupling with the outer ring electric machinery structure; or
　c) an EME coupling aspect of the mid ring electric machinery structure in a direction facing the inner ring electric machinery structure to execute EME coupling with the inner ring electric machinery structure; or
　d) an EME coupling aspect of the inner ring electric machinery structure in a direction facing the mid ring electric machinery structure to execute EME coupling with the mid ring electric machinery structure;
　the EME coupling aspects of above items a), b), c) and d) are disposed with an PM magnetic pole wrapped between the magnetic pole and the magnetic circuit from the individual magnetic pole, and the type of the electric machinery structure between other respective electric machinery structures is selected upon its EME property thus to constitute a coaxial 3-ring type electric machinery provided with a PM magnetic pole being wrapped between the magnetic pole and the magnetic circuit from the individual magnetic pole.

6. The electric machinery as claimed in claim 1, wherein the electric machinery is related to a coaxial 3-ring type electric machinery to engage coaxial operation by insertion of an inner ring, a mid ring, and an outer ring electric machinery structures including an inner ring electric machinery structure, a mid ring electric machinery structure, and an outer ring electric machinery structure and is characterized as having:
　a) an EME coupling aspect of the inner ring electric machinery structure in a direction facing the mid ring electric machinery structure to execute EME coupling with the mid ring electric machinery structure and an EME coupling aspect of the mid ring electric machinery structure in a direction facing the outer ring electric machinery structure to execute EME coupling with the outer ring electric machinery structure; or
　b) an EME coupling aspect of the outer ring electric machinery structure in a direction facing the mid ring electric machinery structure to execute EME coupling with the mid ring electric machinery structure and an EME coupling aspect of the mid ring electric machinery structure in a direction facing the inner ring electric machinery structure to execute EME coupling with the inner ring electric machinery structure; or
　c) an EME coupling aspect of the outer ring electric machinery structure in a direction facing the mid ring electric machinery structure to execute EME coupling with the mid ring electric machinery structure and an EME coupling aspect of the inner ring electric machinery structure in a direction facing the mid ring electric machinery structure to execute EME coupling with the mid ring electric machinery structure; or
　d) two EME coupling aspects of the mid ring electric machinery structure in a direction facing the outer ring electric machinery structure and in another direction facing the inner ring electric machinery structure to respectively execute EME coupling with the mid ring electric machinery structure;
　the EME coupling aspects of above items a), b), c) and d) are disposed with an PM magnetic pole wrapped between the magnetic pole and the magnetic circuit from the individual magnetic pole thus to constitute a coaxial 3-ring type electric machinery provided with a PM magnetic pole being wrapped between the magnetic pole and the magnetic circuit from the individual magnetic pole.

7. The electric machinery as claimed in claim 1, wherein the electric machinery is related to a coaxial 3-ring type electric machinery to engage coaxial operation by insertion of an inner ring, a mid ring, and an outer ring electric machinery structures including an inner ring electric machinery structure, a mid ring electric machinery structure, and an outer ring electric machinery structure, and wherein the mid ring electric machinery structure for respectively executing EME coupling with the inner ring electric machinery structure and the outer ring electric machinery structure provided on both sides of the mid ring electric machinery structure is arranged to wrap the PM magnetic pole by a permeable body to constitute magnetic pole, so as to form two permeable pole-faces respectively on pole-faces at both ends of the PM magnetic pole; through the permeable pole-faces, the magnetic poles at both ends of the PM magnetic pole respectively execute bilateral coupling with the inner ring electric machinery structure and the outer ring electric machinery structure for executing EME interaction, thus to constitute a coaxial 3-ring type electric machinery with two permeable pole-faces each being formed on pole-faces at both ends of the PM magnetic pole.

8. The electric machinery provided with a PM magnetic pole wrapped by a magnetic pole or a magnetic circuit as claimed in claim 1, wherein the electric machinery is related to a coaxial double layer type plate electric machinery comprised of two layers of electric machinery structure laminated to engage in coaxial operation includes an inner layer plate electric machinery structure (31) and an outer layer plate electric machinery structure (32), and wherein the PM magnetic pole (103) wrapped between the magnetic pole (101) and the magnetic circuit (102) from the individual magnetic pole is disposed on an EME coupling aspect of the inner layer plate electric machinery structure (31) in a direction facing the outer layer plate electric machinery structure (32) to execute EME interaction with the outer layer plate electric machinery structure (32); or the PM magnetic pole (103) wrapped between the magnetic pole (101) and the magnetic circuit (102) from the individual magnetic pole is disposed on an EME coupling aspect of an outer layer plate electric machinery structure (32) in a direction facing an inner layer plate electric machinery structure (31) to execute EME interaction with the inner layer plate electric machinery structure (31), thus to constitute a double layer type plate electric machinery provided with the PM magnetic pole wrapped between the magnetic pole (101) and the magnetic circuit (102) from the individual magnetic pole.

9. The electric machinery provided with a PM magnetic pole wrapped by a magnetic pole or a magnetic circuit as claimed in claim 1, wherein the electric machinery is related to a coaxial 3-layer type plate electric machinery comprised of an inner layer, a mid layer, and an outer layer electric machinery structures laminated to engage coaxial operation includes an inner layer plate electric machinery structure (41), a mid layer plate electric machinery structure (42), and an outer layer plate electric machinery structure (43) and is characterized as having:
   a) an EME coupling aspect of the inner layer plate electric machinery structure (41) in a direction facing the mid layer plate electric machinery structure (42); or
   b) an EME coupling aspect of the mid layer plate electric machinery structure (42) in a direction facing the inner layer plate electric machinery structure (41); or
   c) an EME coupling aspect of the outer layer plate electric machinery structure (43) in a direction facing the mid layer plate electric machinery structure (42); or
   d) an EME coupling aspect of the mid layer plate electric machinery structure (42) in a direction facing the outer layer plate electric machinery structure (43);
   the EME coupling aspects of above items a), b), c) and d) are disposed with an PM magnetic pole (103) wrapped between the magnetic pole (101) and the magnetic circuit (102) from the individual magnetic pole, and the type of the electric machinery structure between other respective electric machinery structures is selected upon its EME property thus to constitute a coaxial 3-layer type plate electric machinery provided with a PM magnetic pole (103) being wrapped between the magnetic pole (101) and the magnetic circuit (102) from the individual magnetic pole.

10. The electric machinery provided with a PM magnetic pole wrapped by a magnetic pole or a magnetic circuit as claimed in claim 1, wherein the electric machinery is related to a coaxial 3-layer type plate electric machinery comprised of an inner layer, a mid layer, and an outer layer electric machinery structures laminated to engage coaxial operation includes an inner layer plate electric machinery structure (41), a mid layer plate electric machinery structure (42), and an outer layer plate electric machinery structure (43) and is characterized as having:
   a) an EME coupling aspect of the inner layer plate electric machinery structure (41) in a direction facing the mid layer plate electric machinery structure (42) and an EME coupling aspect of the mid layer plate electric machinery structure (42) in a direction facing the outer layer plate electric machinery structure (43); or
   b) an EME coupling aspect of the outer layer plate electric machinery structure (43) in a direction facing the mid layer plate electric machinery structure (42) and an EME coupling aspect of the mid layer plate electric machinery structure (42) in a direction facing the inner layer plate electric machinery structure (41); or
   c) an EME coupling aspect of the inner layer plate electric machinery structure (41) in a direction facing the mid layer plate electric machinery structure (42) and an EME coupling aspect of the outer layer plate electric machinery structure (43) in a direction facing the mid layer plate electric machinery structure (42); or
   d) two EME coupling aspects on both sides of the mid layer plate electric machinery structure (42) in a direction facing the inner layer plate electric machinery structure (41) and in another direction facing the outer layer plate electric machinery structure (43);
   the EME coupling aspects of above items a), b), c) and d) are disposed with an PM magnetic pole (103) wrapped between the magnetic pole (101) and the magnetic circuit (102) from the individual magnetic pole thus to constitute a coaxial 3-layer type plate electric machinery provided with a PM magnetic pole (103) being wrapped between the magnetic pole (101) and the magnetic circuit (102) from the individual magnetic pole.

11. The electric machinery provided with a PM magnetic pole wrapped by a magnetic pole or a magnetic circuit as claimed in claim 1, wherein the electric machinery is related to a coaxial 3-layer type plate electric machinery comprised of an inner layer, a mid layer, and an outer layer electric machinery structures laminated to engage coaxial operation includes an inner layer plate electric machinery structure (41), a mid layer plate electric machinery structure (42), and an outer layer plate electric machinery structure (43), and wherein the mid layer plate electric machinery structure (42)

for respectively executing EME coupling with the inner layer plate electric machinery structure (41) and the outer layer plate electric machinery structure (43) provided on both sides of the mid layer plate electric machinery structure (42) is arranged to wrap the PM magnetic pole (103) by a permeable body to constitute magnetic pole (101), so as to form two permeable pole-faces respectively on pole-faces at both ends of the PM magnetic pole (103); through the permeable pole-faces, the magnetic poles at both ends of the PM magnetic pole respectively execute bilateral coupling with the inner layer plate electric machinery structure (41) and the outer layer plate electric machinery structure (43) for executing EME interaction, thus to constitute a coaxial 3-layer type plate electric machinery with two permeable pole-faces each being formed on pole-faces at both ends of the PM magnetic pole.

12. The electric machinery provided with a PM magnetic pole wrapped by a magnetic pole or a magnetic circuit as claimed in claim 1, wherein the electric machinery is related to a linearly coupled double layer type linear electric machinery comprised of two layers of linear electric machinery structures includes an inner layer linear electric machinery structure (51) and an outer layer linear electric machinery structure (52), and is characterized as having:

the PM magnetic pole (103) wrapped between the magnetic pole (101) and the magnetic circuit (102) from the individual magnetic pole is disposed on an EME coupling aspect of the inner layer linear electric machinery structure (51) in a direction facing the outer layer linear electric machinery structure (52) to execute EME interaction with the outer layer linear electric machinery structure (52); or the PM magnetic pole (103) wrapped between the magnetic pole (101) and the magnetic circuit (102) from the individual magnetic pole is disposed on an EME coupling aspect of an outer layer linear electric machinery structure (52) in a direction facing an inner layer linear electric machinery structure (51) to execute EME interaction with the inner layer linear electric machinery structure (51), thus to constitute a double layer type linear electric machinery provided with the PM magnetic pole wrapped between the magnetic pole (101) and the magnetic circuit (102) from the individual magnetic pole.

13. The electric machinery provided with a PM magnetic pole wrapped by a magnetic pole or a magnetic circuit as claimed in claim 1, wherein a linearly coupled 3-layer type linear electric machinery comprised of a inner layer, a mid layer, and an outer layer linear electric machinery structures includes an inner layer linear electric machinery structure (61), a mid layer linear electric machinery structure (62), and an outer layer linear electric machinery structure (63) and is characterized as having:
 a) an EME coupling aspect of the inner layer linear electric machinery structure (61) in a direction facing the mid layer linear electric machinery structure (62); or
 b) an EME coupling aspect of the mid layer linear electric machinery structure (62) in a direction facing the inner layer linear electric machinery structure (61); or
 c) an EME coupling aspect of the outer layer linear electric machinery structure (63) in a direction facing the mid layer linear electric machinery structure (62); or
 d) an EME coupling aspect of the mid layer linear electric machinery structure (62) in a direction facing the outer layer linear electric machinery structure (63);
 the EME coupling aspects of above items a), b), c) and d) are disposed with an PM magnetic pole (103) wrapped between the magnetic pole (101) and the magnetic circuit (102) from the individual magnetic pole, and the type of the electric machinery structure between other respective electric machinery structures is selected upon its EME property thus to constitute a coaxial 3-layer type plate electric machinery provided with a PM magnetic pole (103) being wrapped between the magnetic pole (101) and the magnetic circuit (102) from the individual magnetic pole.

14. The electric machinery provided with a PM magnetic pole wrapped by a magnetic pole or a magnetic circuit as claimed in claim 1, wherein a linearly coupled 3-layer type linear electric machinery comprised of a inner layer, a mid layer, and an outer layer linear electric machinery structures includes an inner layer linear electric machinery structure (61), a mid layer linear electric machinery structure (62), and an outer layer linear electric machinery structure (63) and is characterized as having:
 a) an EME coupling aspect of the mid layer linear electric machinery structure (62) in a direction facing the outer layer linear electric machinery structure (63) and an EME coupling aspect of the inner layer linear electric machinery structure (61) in a direction facing the mid layer linear electric machinery structure (62); or
 b) an EME coupling aspect of the outer layer linear electric machinery structure (63) in a direction facing the mid layer linear electric machinery structure (62) and an EME coupling aspect of the mid layer linear electric machinery structure (62) in a direction facing the inner layer linear electric machinery structure (61); or
 c) an EME coupling aspect of the inner layer linear electric machinery structure (61) in a direction facing the mid layer linear electric machinery structure (62) and an EME coupling aspect of the outer layer linear electric machinery structure (63) in a direction facing the mid layer linear electric machinery structure (62); or
 d) two EME coupling aspects on both sides of the mid layer linear electric machinery structure (62) in a direction facing the inner layer linear electric machinery structure (61) and in another direction facing the outer layer linear electric machinery structure (63);
 the EME coupling aspects of above items a), b), c) and d) are disposed with an PM magnetic pole (103) wrapped between the magnetic pole (101) and the magnetic circuit (102) from the individual magnetic pole thus to constitute a 3-layer type linear electric machinery provided with a PM magnetic pole (103) being wrapped between the magnetic pole (101) and the magnetic circuit (102) from the individual magnetic pole.

15. The electric machinery provided with a PM magnetic pole wrapped by a magnetic pole or a magnetic circuit as claimed in claim 1, wherein a linearly coupled 3-layer type linear electric machinery comprised of a inner layer, a mid layer, and an outer layer linear electric machinery structures includes an inner layer linear electric machinery structure (61), a mid layer linear electric machinery structure (62), and an outer layer linear electric machinery structure (63), and wherein the mid layer linear electric machinery structure (62) for respectively executing EME coupling with the inner layer linear electric machinery structure (61) and the outer layer linear electric machinery structure (63) provided on both sides of the mid layer linear electric machinery structure (62) is arranged to wrap the PM magnetic pole (103) by a permeable body to constitute magnetic pole (101), so as to form two permeable pole-faces respectively on pole-faces at both ends of the PM magnetic pole (103); through the permeable pole-faces, the magnetic poles at both ends of the PM magnetic pole respectively execute bilateral coupling with the inner layer linear electric machinery structure (61) and the outer layer linear electric machinery structure (63) for executing EME interaction, thus to constitute a coaxial 3-layer type linear electric machinery with two permeable pole-faces each being formed on pole-faces at both ends of the PM magnetic pole.

16. The electric machinery as claimed in claim 1, wherein the magnetic pole and the wrapped PM magnetic pole includes to be disposed to the coaxial 3-ring type electric machinery structure, the coaxial 3-layer type plate electric machinery structure, the 3-layer type linear electric machinery structure or other electric machinery structure of mid electric machinery structure from 3-piece electric machinery structure to execute EME interaction, and wherein the mid electric machinery structure for disposing the PM magnetic pole serves as the static portion of the electric machinery or the mobile portion of the electric machinery.

17. The electric machinery as claimed in claim 1, wherein the operation types of two electric machinery components interacting with each other by means of EME of the electric machinery disposed with a PM magnetic pole wrapped by a permeable polar face and a magnetic circuit in case of the cylinder electric machinery, or the double layer type plate electric machinery, or the double layer type linear electric machinery for producing function of a generator, a motor, both a generator and a motor, an EME vortex coupling transmission, or EME vortex braking function include:

a) either electric machinery structural component serves as a static portion of the electric machinery while another electric machinery structural component serves as a mobile portion of the electric machinery; or b) both electric machinery structural components function as the mobile portions of the electric machinery.

18. The electric machinery as claimed in claim 1, wherein the coaxial 3-ring type electric machinery, the coaxial 3-layer type plate electric machinery, the 3-layer type linear electric machinery, or other electric machinery structure of mid electric machinery structure from 3-piece electric machinery structure to execute EME interaction that provided with three electric machinery components interacting by EME for producing function of a generator, a motor, both a generator and a motor, an EME vortex coupling transmission, or EME vortex braking function provide the following composition functions:

a) one EM structural component serves as a static portion of the electric machinery while the other two EM structural components function as two mobile portions of the electric machinery; or b) two EM structural components serve as two static portions of the electric machinery while the third EM structural component serves as a mobile portion of the electric machinery; or c) all three EM structural components each serves as a mobile portion of the electric machinery.

19. The electric machinery as claimed in claim 1, wherein selection and layout of electric machinery structure and windings for the electric machinery structural component of the PM magnetic pole wrapped between a magnetic pole and a magnetic circuit and other electric machinery structural components executing EME coupling interaction are determined according to the property of the assembly of the entire electric machinery, nature of the power inputted, control function, control mode, and output performance requirements; according to the selection of its EME interaction property, the electric machinery provided with a PM magnetic pole wrapped by a magnetic pole or a magnetic circuit to constitute the assembly of the electric machinery includes those for operating in DC or AC revolution or linear electric machinery are comprised of commutator brush, brushless, ring-brush, synchronous, asynchronous, internal revolving, external revolving, mid electric machinery structure revolving, double-acting, multi-layer, multi-ring, linear, DC brushless, or inverter electric machinery, or an electric machinery functioning as a generator or as a motor or as both a generator and a motor, coupling transmission device, as an EME vortex coupling transmission device, or an EME vortex braking device.

20. The electric machinery provided with a PM magnetic pole wrapped by a magnetic pole or a magnetic circuit as claimed in claim 1, when applied in the cylinder electric machinery structure with inner and outer layers, or the coaxial 3-ring type electric machinery structure, or double layer type plate electric machinery structure, or coaxial 3-layer type plate electric machinery structure, or double layer type linear electric machinery structure, or 3-layer type linear electric machinery structure, a transverse rabbet, which indicates a linear or arcuate or any required geometric shape, or is in a form of parallel along the EME coupling aspect, is disposed to the magnetic pole (101) of a block shape or constituted by permeable laminated sheets at where near the edge of the EME coupling aspect for installing the PM magnetic pole (103) with corresponding shape, and an optional protective cap (1011), made of either permeable material or non-permeable material, is further provided to one or both sides of the magnetic pole (101) as needed; constitution of the protective cap (1011) includes:

a) a protective cap (1011) with the same length as the magnetic pole is disposed to one or both sides of the magnetic pole (101) of a block shape or constituted by permeable laminated sheets for clamping the magnetic pole (101) of a block shape or constituted by permeable laminated sheets and wrapping the PM magnetic pole (103); or b) a protective cap (1011) is disposed to one or both sides of the magnetic pole (101) for clamping the magnetic pole (101) constituted by permeable laminated sheets and wrapping the PM magnetic pole (103) whereof the protective cap (1011) extends in a direction facing the magnetic circuit (102) to connect with the magnetic circuit (102); or c) a protective cap (1011) is disposed to one or both sides of the magnetic pole (101) of a block structure for clamping the block-shaped magnetic pole (101) and wrapping the PM magnetic pole (103) whereof the protective cap (1011) extends in a direction facing the magnetic circuit (102) to connect with the magnetic circuit (102); or d) a PM magnetic pole (103) which is thinner than the thickness of the magnetic pole (101) is disposed into the transverse rabbet, whereof a protective cap is stuffed into or a filler is added into one or both ends of the transverse rabbet.

21. The electric machinery provided with a PM magnetic pole wrapped by a magnetic pole or a magnetic circuit as claimed in claim 1, when applied in the cylinder electric machinery structure with inner and outer layers, or the coaxial 3-ring type electric machinery structure, or double layer type plate electric machinery structure, or coaxial 3-layer type plate electric machinery structure, or double layer type linear electric machinery structure, or 3-layer type linear electric machinery structure, the magnetic pole (101) of a block shape or constituted by permeable laminated sheets at where near the edge of the magnetic circuit (102) is disposed with an axial notch structure, whereof the concave bottom of the axial notch is a flat or curved surface or any required geometric shape, or in a form of parallel along the EME coupling aspect for installing the PM magnetic pole (103) with corresponding shape, and an optional protective cap (1012), made of either permeable material or non-permeable material, is further disposed to one or both sides of the magnetic pole (101) as needed; constitution of the protective cap (1012) includes:

a) A protective cap is not disposed; or b) A protective cap (1012) is disposed to one or both sides of the magnetic pole (101) constituted by permeable laminated sheets for clamping the magnetic pole (101) constituted by permeable laminated sheets whereof the protective cap (1012) extends in the direction of the magnetic circuit (102) to connect with the magnetic circuit (102); or c) A protective cap (1012) is disposed to one or both sides of the block-shaped magnetic pole (101) for clamping the block-shaped magnetic pole (101) whereof the protective cap (1012) extends in the direction of the magnetic circuit (102) to connect with the magnetic circuit (102); or d) One or both sides of the integrally block-shaped magnetic pole (101) extends in a direction of the magnetic circuit (102) to connect with the magnetic circuit (102) so as to form a protective cap (1012) on one or both sides of the PM magnetic pole (103).

22. The electric machinery provided with a PM magnetic pole wrapped by a magnetic pole or a magnetic circuit as claimed in claim 1, when applied in the cylinder electric machinery structure with inner and outer layers, or the coaxial 3-ring type electric machinery structure, or double layer type plate electric machinery structure, or coaxial 3-layer type plate electric machinery structure, or double layer type linear electric machinery structure, or 3-layer type linear electric machinery structure, wherein the magnetic pole (101) of a block shape or constituted by permeable laminated sheets at where near the edge of the magnetic circuit (102) is disposed with an axial notch structure, whereof the concave bottom of the axial notch is a flat or curved surface or any required geometric shape, or in a form of parallel along the EME coupling aspect for installing the PM magnetic pole (103) with corresponding shape, and an optional protective cap (1013), made of either permeable material or non-permeable material, is further disposed to one or both sides of the magnetic pole (101) as needed; constitution of the protective cap (1013) includes:

a) A protective cap (1013) is disposed to one or both sides of the magnetic pole (101) for clamping the magnetic pole (101) constituted by permeable laminated sheets and sandwiching the PM magnetic pole (103); or b) A protective cap (1013) is disposed to one or both sides of the magnetic pole (101) constituted by permeable laminated sheets for clamping the magnetic pole (101) constituted by permeable laminated sheets and sandwiching the PM magnetic pole (103) whereof the protective cap (1013) extends in the direction of the magnetic circuit (102) to connect with the magnetic circuit (102); or c) A protective cap (1013) is disposed to one or both sides of the magnetic pole (101) for clamping the block-shaped magnetic pole (101) and sandwiching the PM magnetic pole (103) whereof the protective cap (1013) extends in the direction of the magnetic circuit (102) to connect with the magnetic circuit (102); or d) One side of the magnetic pole (101) constituted by a block integrally and the magnetic circuit (102) is disposed with a concave socket for installing the PM magnetic pole (103) with chosen geometric shape as needed whereof a protective cap (1014) on one or both sides of the integrally block-shaped magnetic pole (101) extends in the direction of the magnetic circuit (102) to connect with the magnetic circuit (102).

23. The electric machinery provided with a PM magnetic pole wrapped by a magnetic pole or a magnetic circuit as claimed in claim 1, when applied in the cylinder electric machinery structure with inner and outer layers, or the coaxial 3-ring type electric machinery structure, or double layer type plate electric machinery structure, or coaxial 3-layer type plate electric machinery structure, or double layer type linear electric machinery structure, or 3-layer type linear electric machinery structure, wherein at where between the magnetic pole (101) of a block shape or constituted by permeable laminated sheets and the magnetic circuit (102) is sandwiched with a PM magnetic pole (103) in chosen geometric shape as needed, and one or both sides of the PM magnetic pole (103) is further provided with a protective cap (1014) made of either permeable material or non-permeable material; constitution of the protective cap (1014) includes:

a) A protective cap (1014), made of permeable material, is disposed to one or both sides of the PM magnetic pole (103) whereof the length of the protective cap (1014) is selectable from at least covering across two magnetic poles of different polarities of the PM magnetic pole (103) to being the same length as the combined length of the magnetic pole (101) and the PM magnetic pole (103); or b) A protective cap (1014), made of permeable material, is disposed to one or both sides of the magnetic pole (101) constituted by permeable laminated sheets for clamping the magnetic pole (101) constituted by permeable laminated sheets the length of the protective cap (1014) is selectable from at least covering across two magnetic poles of different polarities of the PM magnetic pole (103) to covering the combined length of the magnetic pole (101) and the PM magnetic pole (103) that extending at the direction facing the magnetic circuit (102) to connect with the magnetic circuit (102); or c) A protective cap (1014), made of permeable material, is disposed to one or both sides of the PM magnetic pole (103) for clamping the block-shaped magnetic pole (101) whereof the length of the protective cap (1014) is selectable from at least covering across two magnetic poles of different polarities of the PM magnetic pole (103) to covering the combined length of the magnetic pole (101) and the PM magnetic pole (103) that extending at the direction facing the magnetic circuit (102) to connect with the magnetic circuit (102); or d) At where between the magnetic pole (101) constituted by a block integrally and the magnetic circuit (102) is disposed with a PM magnetic pole (103) with chosen geometric shape as needed whereof one or both sides of the integrally block-shaped magnetic pole (101) extends in the direction facing the magnetic circuit (102) so as to form a protective cap (1014) on one or both sides of the PM magnetic pole (103) to connect with the magnetic circuit (102).

24. The electric machinery provided with a PM magnetic pole wrapped by a magnetic pole or a magnetic circuit as claimed in claim 1, when applied in the cylinder electric machinery structure with inner and outer layers, or the coaxial 3-ring type electric machinery structure, or double layer type plate electric machinery structure, or coaxial 3-layer type plate electric machinery structure, or double layer type linear electric machinery structure, or 3-layer type linear electric machinery structure, is further disposed with at least one transverse rabbet, which indicates a linear or arcuate or any required geometric shape, or is in a form of parallel along the EME coupling aspect, on one side of the polar axis of the magnetic pole (101) of a block shape or constituted by permeable laminated sheets at where near the EME coupling aspect for disposing the PM magnetic pole (103) with corresponding quantity and shape whereof the PM magnetic pole wrapped by the transverse rabbet on the magnetic pole and the polar axis of the magnetic pole are having electrical phase angle difference, so as to form the distribution of the magnetic line of force of required magnetic field; in addition, an optional protective cap made of either permeable material or non-permeable material can be disposed to one or both sides of the magnetic pole (103) as needed, whereof ways to disposed the protective cap include:

a) the protective cap is not provided; or
   b) the protective cap is added on one or both sides of the PM magnetic pole (103), whereof the length of the protective cap is the same as the combined length of the magnetic pole (101) and the PM magnetic pole (103); or
   c) the protective cap is added on one or both sides of the magnetic pole (101) constituted by a block shape or permeable laminated sheets for clamping the magnetic pole (101) constituted by permeable laminated sheets, whereof the protective cap extends at the direction facing the magnetic circuit (102) to connect with the magnetic circuit (102); or
   d) a PM magnetic pole (103) which is thinner than the thickness of the magnetic pole (101) is disposed into the transverse rabbet, whereby a protective cap is stuffed into or a filler is added into one or both ends of the transverse rabbet.

25. The electric machinery provided with a PM magnetic pole wrapped by a magnetic pole or a magnetic circuit as claimed in claim 1, when applied in the cylinder electric machinery structure with inner and outer layers, or the coaxial 3-ring type electric machinery structure, or double layer type plate electric machinery structure, or coaxial 3-layer type plate electric machinery structure, or double layer type linear electric machinery structure, or 3-layer type linear electric machinery structure, is further disposed with at least one transverse rabbet, which indicates a linear or arcuate or any required geometric shape, or is in a form of parallel along the EME coupling aspect, on each of both sides of the polar axis of the magnetic pole (101) of a block shape or constituted by permeable laminated sheets at where near the EME coupling aspect for disposing the PM magnetic pole (103) with corresponding quantity and shape whereof the PM magnetic pole wrapped by the transverse rabbet on the magnetic pole and the polar axis of the magnetic pole are having electrical phase angle difference, so as to form the distribution of the magnetic line of force of required magnetic field; in addition, an optional protective cap made of either permeable material or non-permeable material can be disposed to one or both sides of the magnetic pole (103) as needed, whereof ways to disposed the protective cap include:

a) the protective cap is not provided; or
   b) the protective cap is added on one or both sides of the PM magnetic pole (103), whereof the length of the protective cap is the same as the combined length of the magnetic pole (101) and the PM magnetic pole (103); or
   c) the protective cap is added on one or both sides of the magnetic pole (101) constituted by blocks or permeable laminated sheets for clamping the magnetic pole (101) constituted by permeable laminated sheets, whereof the protective cap extends at the direction facing the magnetic circuit (102) to connect with the magnetic circuit (102); or
   d) a PM magnetic pole (103) which is thinner than the thickness of the magnetic pole (101) is disposed into the transverse rabbet, whereby a protective cap is stuffed into or a filler is added into one or both ends of the transverse rabbet.

* * * * *